(12) United States Patent
Shattil

(10) Patent No.: US 12,526,141 B1
(45) Date of Patent: Jan. 13, 2026

(54) POLYNOMIAL NETWORK CODING

(71) Applicant: Tybalt, LLC, Boulder, CO (US)

(72) Inventor: Steve Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 0 days.

(21) Appl. No.: 17/722,614

(22) Filed: Apr. 18, 2022

Related U.S. Application Data

(60) Provisional application No. 63/176,207, filed on Apr. 16, 2021.

(51) Int. Cl.
*H04L 9/30* (2006.01)
*H04L 9/32* (2006.01)

(52) U.S. Cl.
CPC .......... *H04L 9/3026* (2013.01); *H04L 9/3218* (2013.01)

(58) Field of Classification Search
CPC ............................ H04L 9/3026; H04L 9/3218
See application file for complete search history.

(56) References Cited

U.S. PATENT DOCUMENTS

| | | | | |
|---|---|---|---|---|
| 7,529,198 B2 * | 5/2009 | Jain | ......................... | H04L 45/02 370/476 |
| 7,743,253 B2 * | 6/2010 | Lauter | ................... | H04L 9/3073 713/170 |
| 7,965,761 B2 * | 6/2011 | Shattil | ................. | H04J 14/0298 375/147 |
| 8,068,426 B2 * | 11/2011 | Sundararajan | .......... | H04L 47/10 370/235 |
| 8,451,756 B2 | 5/2013 | Lucani et al. | | |
| 8,516,344 B2 * | 8/2013 | Kim | ..................... | H04L 27/3488 714/776 |
| 8,553,784 B2 | 10/2013 | Huang et al. | | |
| 8,670,390 B2 * | 3/2014 | Shattil | .................. | H04B 1/0003 455/452.2 |
| 8,711,978 B2 * | 4/2014 | Kim | ................... | H03M 13/6306 375/295 |
| 8,780,693 B2 * | 7/2014 | Kim | ...................... | H04W 40/00 370/231 |
| 8,942,082 B2 * | 1/2015 | Shattil | .................... | H04B 7/026 370/335 |
| 8,953,612 B2 * | 2/2015 | Liu | ......................... | H04L 69/22 370/473 |
| 8,958,309 B2 * | 2/2015 | Kim | ...................... | H04L 1/0026 370/242 |
| 9,088,351 B2 * | 7/2015 | Liu | ......................... | H04B 15/00 |
| 9,112,916 B2 | 8/2015 | Summerson et al. | | |

(Continued)

OTHER PUBLICATIONS

US 10,673,758 B2, 06/2020, Shattil (withdrawn)*

(Continued)

*Primary Examiner* — Gary S Gracia
(74) *Attorney, Agent, or Firm* — Steven J Shattil

(57) ABSTRACT

Vector network coding, such as linear network coding, is used to compute a plurality of coded data parts from original data, wherein each coded data part is computed from a cryptographic hash function of a previous coded data part. A recipient of the coded data parts can compute the cryptographic hash functions of the coded data to reproduce a system of linear equations, which can be solved to recover the original data. A cryptographic key that employs a polynomial over a finite field can have polynomial coefficients that comprise a function of vector network coding coefficients.

20 Claims, 19 Drawing Sheets

(56) References Cited

U.S. PATENT DOCUMENTS

| | | | |
|---|---|---|---|
| 9,165,013 B2 | 10/2015 | Medard et al. | |
| 9,185,529 B2 | 11/2015 | Medard et al. | |
| 9,191,371 B2* | 11/2015 | Chang | H04L 63/18 |
| 9,225,471 B2* | 12/2015 | Shattil | H04L 27/2601 |
| 9,270,421 B2* | 2/2016 | Shattil | H04L 1/0077 |
| 9,325,805 B2* | 4/2016 | Shattil | H04L 67/101 |
| 9,402,209 B1* | 7/2016 | Vivanco | H04L 1/0076 |
| 9,439,077 B2* | 9/2016 | Gupta | H04L 63/1416 |
| 9,537,759 B2* | 1/2017 | Calmon | H04L 45/24 |
| 9,602,246 B2* | 3/2017 | Mendes Alves Da Costa H03M 13/615 | |
| 9,641,615 B1* | 5/2017 | Robins | G06F 3/0604 |
| 9,647,800 B2* | 5/2017 | Lucani | H04L 1/0065 |
| 9,722,776 B2* | 8/2017 | Nguyen | H04L 9/008 |
| 9,749,388 B2* | 8/2017 | Mahdaviani | H03M 13/1108 |
| 9,768,842 B2 | 9/2017 | Shattil | |
| 9,787,614 B2 | 10/2017 | Heide et al. | |
| 9,819,449 B2* | 11/2017 | Shattil | H04B 7/026 |
| 9,860,022 B2 | 1/2018 | Krigslund et al. | |
| 9,941,996 B2* | 4/2018 | Yang | H03M 13/373 |
| 9,954,859 B2* | 4/2018 | Niset | H04L 9/0825 |
| 10,014,882 B2* | 7/2018 | Sen | H04B 1/38 |
| 10,034,200 B2* | 7/2018 | Narasimha | H03M 13/373 |
| 10,069,746 B2 | 9/2018 | Anderson et al. | |
| 10,237,782 B2 | 3/2019 | Yang et al. | |
| 10,355,720 B2* | 7/2019 | Shattil | H04B 1/0003 |
| 10,366,378 B1* | 7/2019 | Han | G06Q 20/204 |
| 10,389,568 B1* | 8/2019 | Shattil | H04L 5/0035 |
| 10,425,135 B2* | 9/2019 | Shattil | H04B 7/0452 |
| 10,452,621 B2* | 10/2019 | Medard | H04N 21/2312 |
| 10,484,171 B2* | 11/2019 | Hu | H04L 9/0861 |
| 10,516,617 B2 | 12/2019 | Anderson et al. | |
| 10,530,574 B2* | 1/2020 | Shi | H04L 9/0819 |
| 11,025,312 B2 | 6/2021 | Shattil | |
| 11,075,786 B1* | 7/2021 | Shattil | H04L 5/0007 |
| 11,108,705 B2 | 8/2021 | Fouli et al. | |
| 11,223,508 B1 | 1/2022 | Shattil | |
| 11,297,657 B2 | 4/2022 | Lahouti et al. | |
| 11,533,127 B1* | 12/2022 | Yu | H04L 9/50 |
| 11,791,914 B2* | 10/2023 | Cella | G05B 23/0229 702/188 |
| 2005/0152391 A1* | 7/2005 | Effros | H04L 67/565 370/432 |
| 2006/0224760 A1* | 10/2006 | Yu | H04L 67/108 709/231 |
| 2006/0235895 A1* | 10/2006 | Rodriguez | H04N 21/631 |
| 2006/0282677 A1* | 12/2006 | Rodriguez | H04L 9/3236 713/181 |
| 2010/0260189 A1* | 10/2010 | Ansari | H04L 67/06 370/400 |
| 2011/0051729 A1* | 3/2011 | Wei | H04L 25/03343 370/392 |
| 2011/0142141 A1* | 6/2011 | Huang | H04L 47/10 375/242 |
| 2012/0096124 A1* | 4/2012 | Medard | H04L 67/1095 709/219 |
| 2012/0163588 A1* | 6/2012 | Kobayashi | H04L 9/3073 380/28 |
| 2012/0236763 A1* | 9/2012 | Lucani | H04L 1/1671 370/276 |
| 2013/0230058 A1* | 9/2013 | Summerson | H04L 69/22 370/474 |
| 2013/0232397 A1* | 9/2013 | Summerson | H04L 1/0076 714/807 |
| 2014/0016469 A1* | 1/2014 | Ho | H04L 1/0041 370/235 |
| 2014/0036657 A1* | 2/2014 | Suter | H04L 1/0076 370/216 |
| 2014/0185797 A1* | 7/2014 | Yasuda | H04L 9/008 380/44 |
| 2014/0269485 A1 | 9/2014 | Medard et al. | |
| 2014/0269503 A1 | 9/2014 | Medard et al. | |
| 2014/0269505 A1* | 9/2014 | Medard | H04W 4/06 370/328 |
| 2014/0328342 A1* | 11/2014 | Berman | H04L 45/24 370/392 |
| 2015/0146615 A1* | 5/2015 | Yu | H04W 36/0069 370/328 |
| 2015/0358118 A1* | 12/2015 | Krigslund | H04L 45/24 370/254 |
| 2016/0134546 A1* | 5/2016 | Anderson | H04L 47/25 370/235 |
| 2016/0154970 A1* | 6/2016 | Calmon | H04L 9/065 713/165 |
| 2016/0182088 A1* | 6/2016 | Sipos | G06F 3/064 714/764 |
| 2016/0191402 A1* | 6/2016 | Anderson | H04L 47/25 370/236 |
| 2016/0359770 A1* | 12/2016 | Heide | H04L 1/004 |
| 2017/0118674 A1* | 4/2017 | Narasimha | H04W 72/04 |
| 2017/0127463 A1* | 5/2017 | Narasimha | H04L 47/32 |
| 2017/0155514 A1* | 6/2017 | Schulz | G06F 21/57 |
| 2017/0195914 A1* | 7/2017 | Yang | H04W 28/06 |
| 2017/0317986 A1* | 11/2017 | Hu | H04L 63/0428 |
| 2018/0034630 A1* | 2/2018 | Rietman | H04L 9/0869 |
| 2018/0046815 A9 | 2/2018 | Calmon et al. | |
| 2018/0074889 A1* | 3/2018 | Resch | H04L 67/60 |
| 2018/0212764 A1* | 7/2018 | Shi | H04N 21/6377 |
| 2019/0045333 A1* | 2/2019 | Serbetci | H04L 1/0011 |
| 2019/0149320 A1* | 5/2019 | Keselman | H04L 9/0891 380/279 |
| 2019/0297649 A1* | 9/2019 | Lahouti | H04L 1/0045 |
| 2020/0028624 A1* | 1/2020 | Fouli | H04L 1/0061 |
| 2020/0028674 A1* | 1/2020 | Bao | H04L 9/0637 |
| 2020/0145201 A1* | 5/2020 | Shim | H04L 9/0825 |
| 2020/0351220 A1* | 11/2020 | Fouli | H04L 49/3009 |
| 2020/0382625 A1* | 12/2020 | Medard | H04L 1/0001 |
| 2021/0105342 A1* | 4/2021 | Ballif | H04L 69/08 |
| 2022/0069987 A1* | 3/2022 | Medard | H04L 9/0858 |

OTHER PUBLICATIONS

S. Dasgupta, et al.; "Design of a polynomial ring based symmetric homomorphic encryption scheme"; Perspectives in Science (2016) 8, 692-695.

D. Charles, et al.; "Signatures for Network Coding"; International Journal of Information and Coding Theory 2006(1): 25; Mar. 2006.

N. Cai, et al.; "Secure Network Code for Adaptive and Active Attacks with No-Randomness in Intermediate Nodes"; IEEE Transactions on Information Theory ( vol. 66, Issue: 3, Mar. 2020).

K. Chu, et al.; "Practical Random Linear Network Coding on GPUs"; International Conference on Research in Networking, 2009, pp. 573-585.

M.N. Krohn, et al.; "On-the-Fly Verification of Rateless Erasure Codes for Efficient Content Distribution"; IEEE Symposium on Security and Privacy, 2004. Proceedings. May 2004.

M. Adeli, et al.; "Secure Network Coding with Minimum Overhead Based on Hash Functions"; IEEE Comm Letters, vol. 13, No. 12. Dec. 2009.

A. Kirsch, et al.; "Hash-Based Techniques for High-Speed Packet Processing"; Algorithms for Next Generation Networks, 2010; 181-218.

R. Dougherty, et al.; "Insufficiency of Linear Coding in Network Information Flow"; IEEE Transactions on Information Theory, vol. 51, No. 8, Aug. 2005.

T. Ho and D.S. Lun; "Network Coding: An Introduction"; Cambridge University Press; 1st edition (Apr. 14, 2008).

S-Y.R. Li, et al.; "Linear Network Coding"; IEEE Transactions on Information Theory, vol. 49, No. 2, Feb. 2003.

Y. Liu and Y. Morgan; "Security against Passive Attacks on Network Coding System—A Survey"; Computer Networks (2018), doi: 10.1016/j.comnet.2018.03.013.

C. Gkantsidis, et al.; "Network Coding for Large Scale Content Distribution"; Proceedings IEEE 24th Annual Joint Conference of the IEEE Computer and Communications Societies. Mar. 2005.

(56) References Cited

OTHER PUBLICATIONS

C. Fragouli and E. Soljanin; "Network Coding Applications"; Foundations and Trends in Networking, vol. 2, No. 2 (2007) 135-269.
J. Katz, B. Waters; "Compact Signatures for Network Coding"; International Association for Cryptologic Research http://eprint.iacr.org/2008/316, Oct. 2009.
E. Yilmaz, R. Knopp; "Hash-and-Forward Relaying for Two-Way Relay Channel"; 2011 IEEE International Symposium on Information Theory Proceedings; Jul. 31, 2011—Aug. 5, 2011.
Y. Liu and Y. Morgan; "Security Analysis of Subspace Network Coding"; Journal of Information Security, 2018, 9, 85-94. Jan. 23, 2018.
S. Katti, et al.; "XORs in The Air: Practical Wireless Network Coding"; IEEE/ACM Transactions on Networking Year: 2008 | vol. 16, Issue: 3.

\* cited by examiner

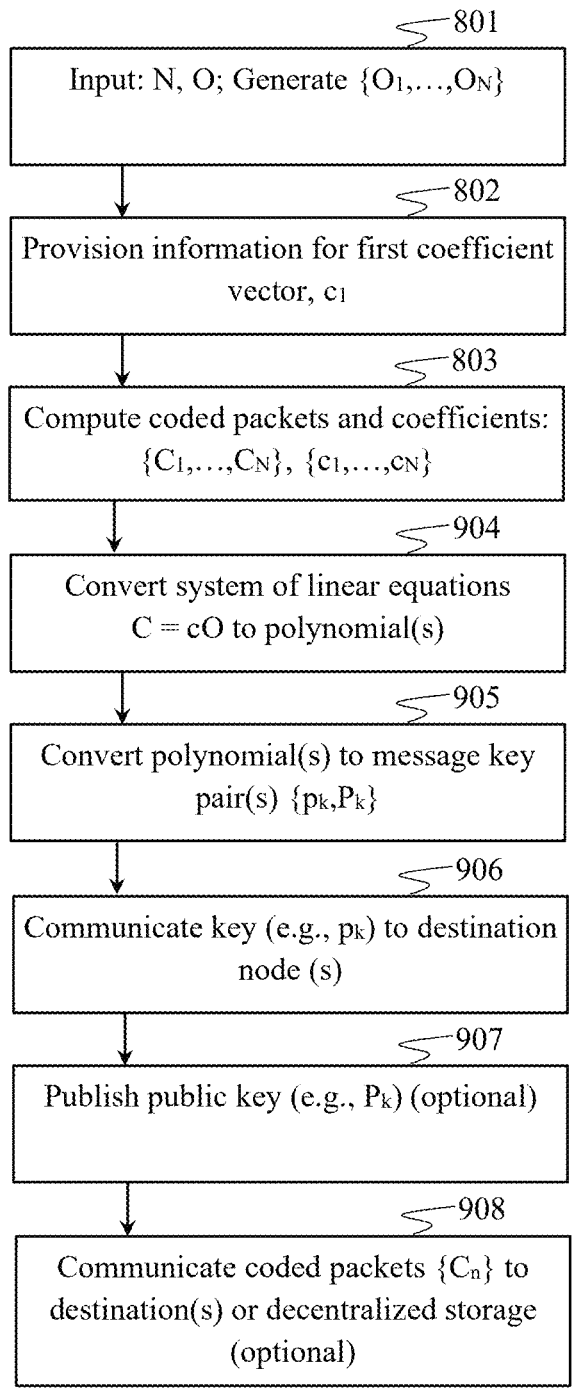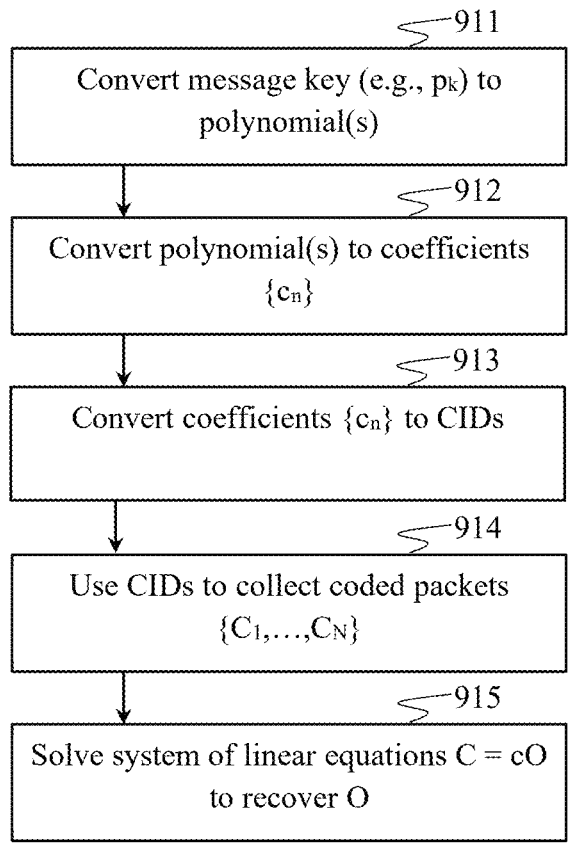
FIG. 9A
FIG. 9B

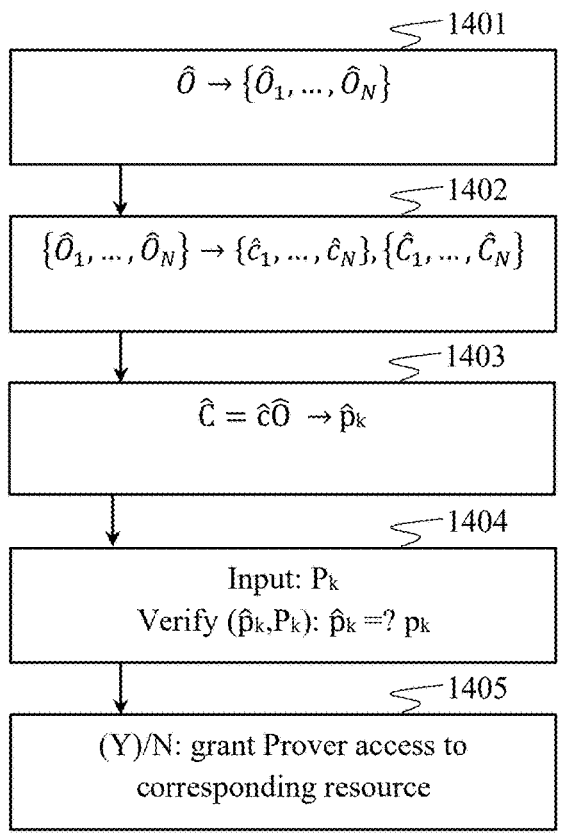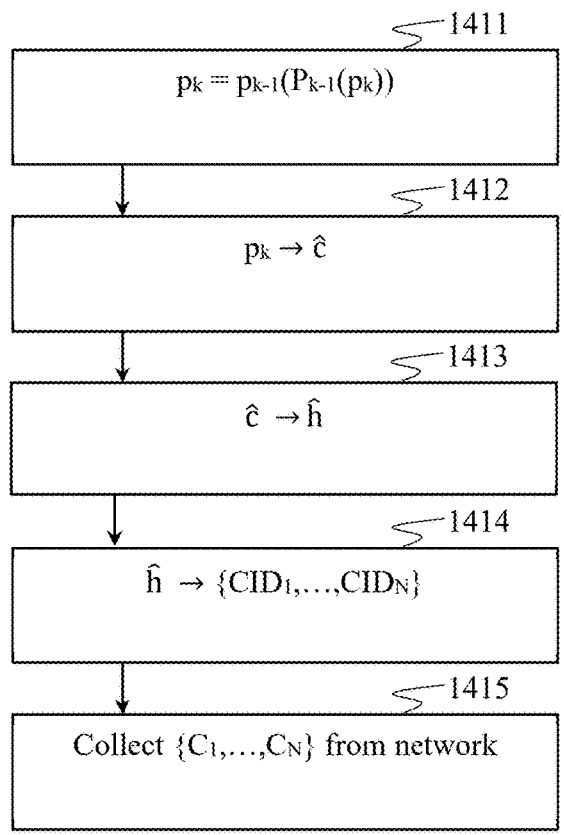
FIG. 14A
FIG. 14B

POLYNOMIAL NETWORK CODING

CROSS REFERENCE TO PRIOR APPLICATIONS

This application claims the priority benefit of U.S. Provisional Pat. Appl. No. 63/176,207, filed on Apr. 16, 2021; which is expressly incorporated by reference herein in its entirety.

INTRODUCTION

I. Field

Aspects of the present disclosure relate to vector network coding. Disclosed aspects can relate to transmitting and/or receiving data over data networks, storing and/or accessing data in decentralized file-sharing networks, Cloud storage, encryption, and/or data storage in blockchain networks.

II. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiplexing (SC-FDM) systems, discrete Fourier transform spread orthogonal division multiplexing (DFT-s-OFDM) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

Blockchains allow a network of users to make a digital ledger of data and share the data among the other users in the network. Unlike previous database structures, the blockchain database is maintained by a multitude of independent nodes spread across a large distributed network. When a transaction is recorded into the blockchain database, it is very difficult, if not impossible, to change or remove that data from the database since the data is stored in more than one node in the distributed network. Therefore, data is added into the blockchain database by multiple users and changing the recorded data would require each of these users (or a majority of the users) to agree to the change. This distribution of control to add, edit, and remove data from the blockchain database creates trust amongst users in the network, especially when users are not familiar with one another.

InterPlanetary File System (IPFS) is a protocol for sharing and storing data centered around a decentralized peer-to-peer network. This allows for content-addressable storage (CAS), which means that content itself can be hashed (cryptographically encoded) and referenced. Theoretically, media stored using CAS via a protocol like IPFS can be completely decentralized while still being verifiable and inalterable. But reality isn't that simple. Files hosted on IPFS must be hosted intentionally by a node in the IPFS network. Major, centralized NFT markets utilizing IPFS for storage currently act as the node intentionally hosting those files through their own private gateways. This means that even if an NFT references directly to media stored on IPFS, that media still might be reliant on a specific centralized marketplace's IPFS node staying online.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One aspect provides for configuring a processor to compute at least one cryptographic key from a plaintext; and configuring the processor to encrypt the plaintext using one of the at least one cryptographic key.

Another aspect provides for configuring a processor to employ vector network coding to compute a plurality of coded data parts from original data; wherein each of the plurality of coded data parts is computed from a previous one of the plurality of coded data parts.

Another aspect provides for configuring a processor to employ vector network coding coefficients to compute a plurality of coded data parts from original data; and configuring the processor to compute a cryptographic key pair that employs a polynomial over a finite field, wherein coefficients of the polynomial comprise a function of the vector network coding coefficients.

Another aspect provides for configuring a processor to compute at least one content identifier associated with original data; and configuring a processor to compute a cryptographic key pair that employs a polynomial over a finite field, wherein coefficients of the polynomial comprise a function of the at least one content identifier. The at least one content identifier might comprise a plurality of content identifiers that are each associated with one of a plurality of coded data parts, such as wherein the plurality of coded data parts are produced by performing vector network coding on the original data.

Disclosed aspects might further comprise generating a proof of knowledge of the private key, associating a public key with the original data O(k), encrypting the original data O(k) with the public key, encrypting an AONP with the public key, encoding the private key in an AONP, encrypting the coded data parts with the public key, and/or employing one of the cryptographic keys to encrypt a next original data O(k+1).

Some aspects relate to network coding, data storage, file sharing, content delivery, multi-network path communications, decentralized wireless communication services, and/or decentralized signal processing in wireless communication systems.

Some aspects of the present disclosure relate to provisioning data for storage on a blockchain network, file-sharing network, Cloud network, fog network, mesh network, multi-hop network, and/or any of various decentralized data networks. Some aspects can provision distribution and/or retrieval of the data in a decentralized network in a manner that reduces the need for redundancy in data storage. For example, instead of storing an entire data file, each network node might store one or a few coded data parts, each being a small fraction of the entire data file. The data can comprise media, computer programs, or other data types. This substantially reduces the storage required on each node and can also substantially reduce the communication bandwidth overhead needed for full data-storage redundancy across the network. Thus, disclosed aspects can facilitate blockchain implementations in networks in which the nodes are both storage-constrained and bandwidth-constrained, such as user devices (e.g., UEs) in wireless networks.

Some aspects of the disclosure include techniques to store and provide access to information an owner intends to keep private, but in a public ledger that can be seen and audited by authorized entities or individuals. There are privacy laws that require information to be kept private. Various aspects of the disclosure can ensure compliance with those privacy laws by ensuring the data is stored in correct formats and only accessible in compliant manners. As another example, there are businesses and governments that do not want their private information, knowledge, or trade secrets to become known. The ability to keep data confidential, yet provide unrestricted access to authorized entities is especially useful in many circumstances. Disclosed aspects that reduce the memory footprint of the on-chain data while ensuring that only authorized users can access the data enable blockchains to be a viable means for storing and facilitating access to confidential data.

In some aspects, data may be set to private (not viewable by users without access), public (viewable by everyone), or a hybrid of the two (some information is public and some information is private). There are circumstances that a public blockchain should be used and can be totally transparent for everyone to see. There are also some cases where some privacy for at least some of the information is desirable.

Some aspects may use multiple layers of encryption so that portions of the data can be limited and accessible to certain users. In a hybrid mode of operation, some of the information can be public or transparent, while other information can be obfuscated or private.

Some aspects, via disclosed coding, can reduce storage overhead for nodes storing the blocks in a blockchain. In a blockchain-type ledger, as services continue to increase, the quantity of data blocks in the ledger continues to increase, which is a burden on storage resources.

Incorporation by reference, as used herein, is intended to be interpreted under 37 CFR 1.57 and MPEP 2163.07(b), and not ignored or disregarded, particularly during the examination of the claims. Instead of repeating information contained in another document, this disclosure incorporates the content of the noted documents by reference to those documents. The information incorporated is as much a part of this disclosure as if the text was repeated in the disclosure, and should be treated as part of the text of the disclosure.

Contrary to the standard by which the USPTO is now examining some patent applications, it is Applicant's intent that any patent document that is incorporated by reference herein not be disqualified from being incorporated by reference simply because it does not appear in the priority claim.

Specifically, in Applicant's Remarks filed on Aug. 5, 2020 regarding application Ser. No. 16/265,599 ('599), Applicant pointed out that each of Ser. No. 14/168,466 ('466) and Ser. No. 11/187,107 ('107) incorporates by reference US Pub. No. 20030147655 ('346) in its entirety. Applicant then argued that since '346 satisfies the enablement and written description requirements of 35 U.S.C. 112, first paragraph, so does each of '466 and '107. Therefore, each patent application in the priority chain to Ser. No. 10/145,854 ('854) presents adequate written description for the claims in order to satisfy the statutory conditions of 35 U.S.C. Section 112, and thus each of the claims in '599 should be entitled to the priority benefit of '854. The Office Action of Oct. 26, 2020 states, "after careful review of the current Remarks filed Aug. 5, 2020, this application is still (and has been) examined with the priority date benefited from Dec. 31, 2016 (provisional application Ser. No. 15/396,567). For example, the newly mentioned application Ser. No. 10/360, 346 (US Pub. No. 20030147655) is not in the list above for claiming benefit from priority date."

Contrary to whatever standard was used to disqualify incorporation by reference in the Office Action of Oct. 26, 2020 for '599, Applicant intends that 37 CFR 1.57(c) or MPEP 2163.07(b) provide the basis for incorporation by reference, including how incorporation by reference pertains to the written description in order to satisfy the statutory conditions of 35 U.S.C. Section 112. Accordingly, Applicant reserves the right to amend this written description to include some or all of the material in the patent applications and/or other documents incorporated by reference herein.

If any terminology in this Specification is defined more broadly than its extrinsic definition or its definition in any document incorporated by reference herein, the terminology is to be interpreted according to its broader definition.

Any later-filed patent application(s) filed by Applicant which claims priority to this application is intended to have the benefit of priority claim under 35 U.S.C. 120 and 35 U.S.C. 112. Specifically, regarding '599, the Office Action dated Jun. 29, 2020 stated, "For an application to claim benefit from the filing date of parent application(s), a same or substantially same disclosure (i.e., specification and drawings) with the subject matters of the application that are clearly disclosed in the parent application(s) must be filed." Applicant intends for such later patent application(s) to have the benefit of priority claim under 35 U.S.C. 120 and 35 U.S.C. 112 instead of whatever standard was used to reject the priority claim in '599.

Applicant advises the reader that features disclosed in different parts of the instant disclosure can be connected or combined, particularly when the disclosure mentions that such feature can be connected or combined. Contrary to the interpretation of "person of ordinary skill in the art" asserted by the Office Action of Jun. 29, 2020, wherein the person skilled in the art is unable to fit the teachings in a single patent application together, Applicant intends that the reader be able to fit together teachings in the instant disclosure, as well as to fit together teachings from any other sources that are incorporated by reference herein. Specifically, the Applicant intends that a person of ordinary skill in the art be defined as in KSR Int'l Co. v. Teleflex Inc., 550 U.S. 398 (2007): "[I]n many cases a person of ordinary skill will be able to fit the teachings of multiple patents together like pieces of a puzzle."

The reader is advised that descriptions of at least one of the claimed features may occur throughout the disclosure, possibly in multiple portions of the disclosure, and that at least one claimed feature may be explained in more than one sentence and in more than one paragraph without constituting "hopping from one place to another in the effort to show a claimed feature". The reader is specifically instructed to consider that multiple portions and/or paragraphs of the disclosure that describe any particular claimed feature should be regarded as constituting disclosure(s) of that feature. Furthermore, even if there are intervening sentences and/or paragraphs between descriptions of any given feature, it does not obviate or disqualify the disclosure of the feature as "hopping from one place to another in the effort to show a claimed feature".

Any of the claimed features may be shown in more than one Figure of the disclosure. The reader is specifically instructed to consider that since multiple Figures might disclose any particular claimed feature, and descriptions of those Figures might occur in different paragraphs of the disclosure, it does not obviate or disqualify the disclosure of the feature as "hopping from one place to another in the effort to show a claimed feature", even though the corresponding "paragraphs, figures, and portions (are) scattered".

A claimed feature may be shown and/or described with respect to one or more other features with which it may interoperate, and/or with one or more other features which perform an inverse or complementary function of the claimed feature. The reader is specifically instructed to consider that any description of such one or more other features may include a description of the claimed feature. The reader is specifically advised that any description of a claimed feature as it pertains to any other feature does not obviate or disqualify the disclosure of the claimed feature on the basis of "hopping from one place to another in the effort to show a claimed feature", even though the corresponding "paragraphs, figures, and portions (are) scattered".

All patent applications and patents mentioned in this disclosure are hereby incorporated by reference in their entireties, including: U.S. Pat. Nos. 8,670,390, 9,225,471, 9,270,421, 9,325,805, 9,473,226, 8,929,550, 7,430,257, 6,331,837, 7,076,168, 7,965,761, 8,098,751, 7,787,514, 9,673,920, 9,628,231, 9,485,063, patent application Ser. No. 10/145,854, patent application Ser. No. 14/789,949, Pat. Appl. No. 62/197,336, patent application Ser. No. 14/967,633, Pat. Appl. No. 60/286,850, patent application Ser. No. 14/709,936, patent application Ser. No. 14/733,013, patent application Ser. No. 14/789,949, patent application Ser. No. 13/116,984, patent application Ser. No. 15/218,609, patent application Ser. No. 15/347,415, patent application Ser. No. 15/988,898, patent application Ser. No. 16/021,001, patent application Ser. No. 16/307,039, patent application Ser. No. 16/751,946, patent application Ser. No. 16/712,954, patent application Ser. No. 16/157,615, Pat. Appl. No. 62/510,987, Pat. Appl. No. 62/527,603, Pat. Appl. No. 62/686,083, Pat. Appl. No. 62/778,894, Pat. Appl. No. 62/853,051, Pat. Appl. No. 62/662,140, Pat. Appl. No. 62/536,955, PCT/US20/45773, PCT/US20/14862, PCT/US20/34071, PCT/US19/37399, and PCT/US16/43852, Pat. Appl. No. 63/295,334, and Pat. Appl. No. 63/295,326.

All publications disclosed herein are incorporated by reference in their entireties, including: LTE: Evolved Universal Terrestrial Radio Access (E-UTRA); Physical channels and modulation (3GPP TS 36.211 version 8.7.0 Release 8), June 2009; LTE: Evolved Universal Terrestrial Radio Access (E-UTRA); Multiplexing and channel coding (3GPP TS 36.212 version 8.8.0 Release 8), January 2010; 3GPP TR 21.914 version 0.8.0 Release 14: Technical Specification Group Services and Systems Aspects; and 3GPP TR 21.915 version 15.0.0 Release 15.

Some aspects of the present disclosure provide an encoding solution, which may employ vector network coding. Linear network coding is a type of vector network coding. The encoding solution might be used for various applications, such as data communications, decentralized data storage, content delivery networks, and the like. Disclosed aspects might relate to blockchain applications, such as encoding blockchain-based data.

In one aspect, a service party encodes original data by configuring an operator to partition original data into a first plurality of original data parts (the first plurality being based on the size of the original data, a predetermined value, or a selectable, for example); and configures an operator to generate a second plurality (the second plurality can be equal to or greater than the first plurality, for example) of coded data parts that each comprises a unique linear combination of the original data parts.

In one example, the service party might configure at least one cryptographic key that is a function (e.g., the function might be a system of linear equation) of the coded data, linear combining coefficients, and/or original data. Thus, the at least one cryptographic key is derived from, and might be configured to be unique to, the message (i.e., the original data). Configuring the key(s) to be unique to the message might comprise employing randomness (e.g., scrambling, inserting nonce(s), and/or other applications of randomness or pseudo-randomness) such that messages with the same information are made different by the randomness. At least one of the at least one cryptographic key (e.g., a public key) might be published. At least one cryptographic key (e.g., a private key) might be securely conveyed to a recipient. It is understood herein that the at least one cryptographic key might be a key pair. It is understood herein that a key pair might comprise a public key and a private key.

In one instance, the recipient (i.e., the prover) uses the private key to prove to a verifier that they have knowledge of the original data to which their key corresponds to.

In one instance, the prover delivers or indicates to the verifier the original data or coded data corresponding to the prover's key, and the verifier derives the prover's key from the original or coded data.

In another instance, prover retrieves and/or decodes the coded data. For example, the prover might derive, from the private key, a set of content addresses (e.g., CIDs) corresponding to at least some of the coded data, and the prover might use the content addresses to retrieve the at least some of the coded data. In some instances, the prover might use the private key, the CIDs, and/or hashes of the coded data to derive the linear-coefficient matrix corresponding to the system of equations that characterizes the coded data. By solving the system of equations, the prover can decode the coded data to recover the original data.

The service party might distribute the coded data to multiple parties such that no one of the parties has a sufficient amount of the coded data to recover the original data. In one example, the service party partitions the coded data parts into a first number (at least one) $N_s$ of coded data parts and at least a second number $N_L$ (more than one) of coded data parts, where $N_s<N_L$ (e.g., $N_s \ll N_L$); and configures the $N_s$ coded data part(s) to be stored on a blockchain or some other form of public ledger, or delivers the $N_s$ coded data part(s) to a recipient. The $N_L$ coded data parts might be stored in a decentralized storage (e.g., file-sharing network, Cloud, fog, etc.) and/or kept by the service party. The $N_s$ coded data parts can be regarded as a small key, which might be stored on a service (e.g., blockchain) where storage is expensive. The $N_L$ coded data parts can be regarded as a large key, which might be delivered to the recipient, provided to a decentralized storage, or might be partitioned into multiple keys, each one being distributed to a different party (for example).

A prover might use the small key to prove ownership of the large key, such as by providing the large key to a verifier or using the small and large keys to decode the coded data.

The service party might configure an operator to narrow the solution space of the coded data part(s), such as by employing a function of the original data that imposes one or more constraints in the solution space. In one instance, the function of the original data comprises at least one previous coded data part. The operator might employ a one-way function, such as a cryptographic hash, that operates on the previous coded data part(s) to generate linear-combining coefficients for the original data to produce at least a next coded data part. In this manner, each set of linear-combining coefficients is made from a one-way function of at least one previous mixture of the original data parts. A mixture is a coded data part. In one example, linear-combining coefficients derived from a previous mixture might be used to produce the current mixture, and a function of the current mixture can produce linear-combining coefficients which can be used to produce the next mixture.

Each coded data part (or set of coded data parts) can be provided with a checksum and/or error correction/detection code. A recipient of the coded data verifies error-free reception (or corrects any errors) by employing the checksum and/or error correction/detection code. In some communications (e.g., wireless), checksums and/or other error correction/detection may be built into the format of the communication protocol.

In the above examples, each of the coded data parts represents a reduced-dimensionality data set, or subspace. Thus, given fewer than a sufficient number of coded data parts to solve the system of equations, there is an infinite number of counterfeit solutions. However, coding that uses the one-way functions as disclosed herein provides a constrained solution space, which makes counterfeit solutions computationally difficult to produce. This provides a high degree of confidence that a solution is the correct solution.

In some aspects, the decoded data might be processed for verification. For example, principle component analysis (and/or kurtosis, skewness, higher-moment analysis), cyclostationary analysis, correlation analysis, covariance analysis, and/or other analyses might be performed to verify that the restored data has structure that distinguishes it from unstructured data.

Aspects disclosed herein may be implemented using smart contracts. The smart contract is a computer protocol intended to be deployed on a blockchain and applied to propagate, verify, or execute the contract in a digital manner. By declaring a service logic in the smart contract, corresponding operations may be performed. The smart contract allows trusted transactions without a third party. These transactions are traceable and irreversible.

One aspect provides for network code design (which can be used for multicasting information at rate h to N receivers, for example) using vector communication. A source transmits h vectors of length L, where the elements of the vectors are over a fixed finite field $F_q$ (e.g., GF(q) or the binary field $F_2$). Intermediate network nodes perform coding operations over vectors, namely, multiply their incoming vectors with L×L code matrices and then add them to create the coded vectors, which are then transmitted towards the destination(s). Specifically, intermediate nodes linearly combine their incoming vectors using the code matrices, where the code matrices play the same role as scalar coding coefficients in traditional network coding. The code design can comprise performing cryptographic hashes on previous coded vectors, and computing the code matrices therefrom. The code matrices can be provisioned to be invertible and full rank. The code design can involve selecting the length L and the L×L code matrices so that each receiver receives information at rate h. Scalar network coding over a field of size $F_q$ can be viewed as a special case of vector network coding with L=1.

Vector network coding can provide a generalization of network coding, and thus offers a larger space of choices for optimizing cost parameters, such as the operational complexity, or the communication block length.

Disclosed techniques can be configured for either or both vector network coding or scalar network coding. The terminology "linear network coding" used herein can mean vector network coding or scalar network coding.

The term "configure" or "configuring" or "configured" conveys one or more steps or processes that cause one or more configurable elements to perform a disclosed function. This might include making the one or more configurable elements. By way of example, configurable elements, such as hardware, firmware, and/or software, can be configured to perform the disclosed function(s). A configurable element might be a circuit, a computer processor, software and/or firmware, a system, or combination thereof. Making the one or more configurable elements might comprise designing, manufacturing, assembling, connecting (e.g., physically connecting or communicatively connecting), and/or instructing the one or more configurable elements to perform the disclosed function(s). In one instance, an electronic circuit is configured to perform the disclosed function(s) by designing the circuit, manufacturing the circuit, and/or connecting circuit components. Such an electronic circuit might be an application-specific integrated circuit (ASIC), microprocessor, digital signal processor, computer processing unit, graphics processing unit, field programmable gate array, microcontroller, or some other electronic circuit. In one instance, one or more computer processors might be configured to perform the disclosed function(s), which might include one or more steps or processes, such as writing instructions in computer program code, assembling pre-written code modules, linking to a library of software functions and/or objects, storing the code in memory, reproducing computer program code, distributing the code over a network, compiling the code into an executable program, storing the executable program in memory, linking to another executable program, loading the executable program into a processing system, causing the executable program to run, and/or provisioning hardware, network, and/or software resources to run the executable program. The one or more computer processors might include a computer processing unit (CPU), a graphics processing unit (GPU), a digital signal processor (DSP), a baseband unit (BBU), a modem, a microprocessor, a microcontroller, a general purpose processor (GPP), and/or a field-programmable gate array (FPGA).

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9A illustrates method and apparatus aspects that can be configured for communicating data in a decentralized communication network. A cryptographic key (or key pair) can be derived from the plaintext (e.g., "original") data to be encrypted. Thus, the cryptographic key(s) can contain some attributes of the plaintext. In one example, this can enable a recipient to verify the authenticity and/or integrity of the decrypted plaintext by comparing attributes of the plaintext to attributes of the key(s). In another example, data is encoded (e.g., via linear network coding), and attributes of the coded data are used for both content addressing and cryptographic key generation. This can enable a recipient of a cryptographic key to use the key to find the content addresses of the coded data, retrieve the coded data, and/or decode the coded data.

FIG. 9B illustrates method and apparatus aspects that can be configured for receiving coded data in a decentralized communication network. A device can receive a cryptographic key (e.g., a private key) that is particular to a message. The device might use the key to locate coded data, such as by determining each coded data's address (e.g., the cryptographic hash function's digest, which is generated from the coded data, and which is used to identify that data part in a content addressable storage system) from polynomial coefficients in the key. The key's polynomial coefficients might include the linear network coding coefficients (or a function of the linear network coding coefficients) used to produce the coded data. Thus, the device might use the key's polynomial coefficients to solve a system of linear equations comprising the coded packets. The key's polynomial coefficients might include the cryptographic hash digest of the original data. Thus, the device might use the key's polynomial coefficients to verify the authenticity or integrity of the original data. A public key corresponding to the private key might encrypt the coded packets (which is regarded as plaintext in this case).

FIG. 14A illustrates method and apparatus aspects that can be configured for verifying a proof of knowledge.

FIG. 14B illustrates method and apparatus aspects that can be configured for employing a message key to collect coded packets from a CAS.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1A:
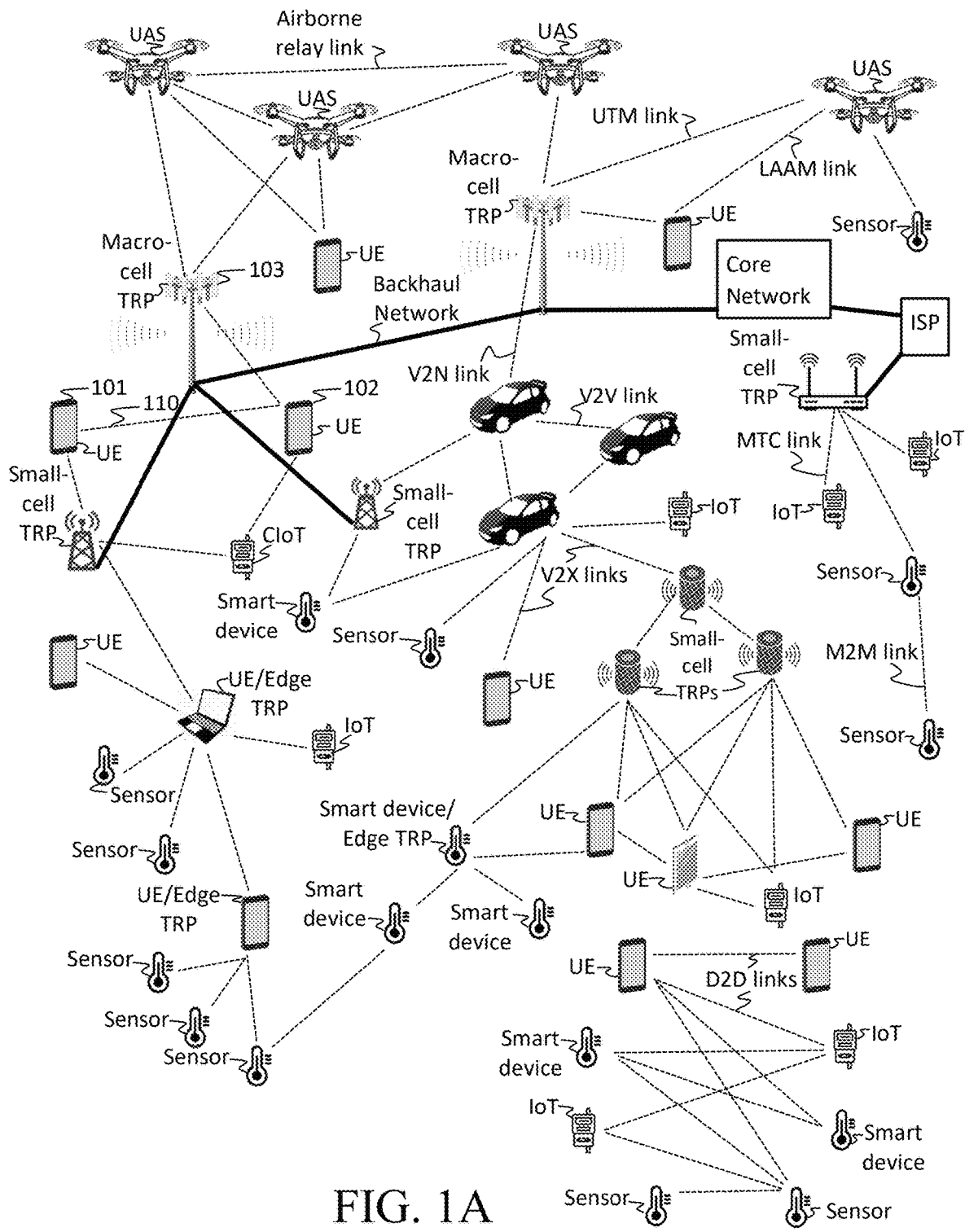
FIG. 1A is a block diagram conceptually illustrating an example telecommunications system, in accordance with certain aspects of the present disclosure.

Aspects of the present disclosure include apparatus, methods, processing systems, and computer readable mediums for encoding data, encrypting data, transmitting data, distributing, receiving data, storing data, retrieving data from storage, decrypting data, decoding data, proving knowledge of original data, verifying knowledge of original data, among other applications. Aspects of the present disclosure can be configured for numerous applications and use cases, including NR (new radio access technology or 5G technologies), beyond-5G communications, edge communications, edge computing, peer-to-peer communications, device-to-device (e.g., D2D) communications and applications, decentralized file sharing, Cloud storage, decentralized data storage, decentralized software applications, distributed ledger, and/or blockchain, among other applications and use cases.

Some aspects can employ blockchains in a peer-to-peer, mobile-ad-hoc, and/or cellular network to provision decentralized network control and management. In one example, UEs might provision low-latency scheduling of physical and/or virtual resources (e.g., PRBs), for D2D communication links (for example), without having to go through a TRP, such as a gNodeB. A local blockchain might be associated with a particular cell or other geographically bounded region, and record transactions of PRBs (or Bandwidth Parts) between UEs inside the cell or region. Periodically, the transactions of the local blockchain might be bundled or "rolled up" into a rollup to provision a state for the rollup and/or the local blockchain, and the state(s) might then be stored (e.g., anchored) in a global blockchain. This geographic "sharding" of a blockchain via provisioning resource-scheduling transactions into multiple local blockchains keeps network bandwidth overhead and blockchain node storage overhead low. In some aspects, there might be limited utility in keeping a long history of transactions. When blocks have aged by a certain amount, they might be discarded by most nodes.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). Some aspects may relate to D2D signal processing, such as for relay transmissions, peer-to-peer transmissions, cooperative transmissions, proximity services, and wireless personal area network transmissions. These services may include latency and/or reliability requirements. These services may include security, privacy, authentication, and/or attribution requirements.

Aspects of the present disclosure can relate to 1) reducing data bandwidth overhead for linear network coding, 2) creating a small footprint of data for storage in memory, 3) encrypting and/or encoding data for transmission and/or storage, 4) controlling and/or provisioning access to stored data, and/or 5) verifying/validating the content of stored data.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1A illustrates an example wireless communication network in which aspects of the present disclosure may be performed. The wireless network may be a new radio (NR) or 5G network. As described herein, a UE 102 can perform uplink signal processing and downlink signal processing while communicating with a base station (e.g., transmit-receive point, TRP 103). The base station 103 performs uplink signal processing and downlink signal processing while communicating with the UE 102. UEs 102 may be configured to perform signal processing for communicating with other UEs (e.g., UE 101), and possibly other devices.

As illustrated in FIG. 1A, the wireless network may include a number of base stations and other network entities. A base station may be a station that communicates with UEs. Each base station 103 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes in the wireless communication network through various types of backhaul interfaces, such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. A base station may support one or multiple cells.

The wireless communication network may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs. In the example shown in FIG. 1A, a relay station 110*r* may communicate with the base station and a UE in order to facilitate communication between the base station and the UE. A relay station may also be referred to as a relay base station, a relay, etc.

The wireless network may be a heterogeneous network that includes base stations of different types, e.g., macro, pico, femto, relays, etc. These different types of base stations may have different transmit power levels, different coverage areas, and different impact on interference in the wireless network. For example, macro base station may have a high transmit power level (e.g., 20 Watts) whereas pico base stations, femto base stations, and relays may have a lower transmit power level (e.g., 1 Watt).

The wireless communication network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operation.

A network controller may couple to a set of base stations and provide coordination and control for these base stations. The network controller may communicate with the base station 103 via a backhaul. The base stations may also communicate with one another, e.g., directly or indirectly via wireless or wireline backhaul.

The UEs 101, 102, etc. may be dispersed throughout the wireless network, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

In the downlink, NR uses cyclic-prefix OFDM (CP-OFDM) with multi-numerologies. In the uplink, NR has the option to use CP-OFDM or DFT-spread-OFDM (i.e., basic Carrier Interferometry) with multi-numerologies. 5G and beyond mobile networks are envisioned to have the flexibility to support heterogeneous services. These services have been broadly categorized into three main usage scenarios: enhanced mobile broadband (eMBB), ultra-reliable and low-latency communications (uRLLC), and massive machine type communications (mMTC). Each of these scenarios has distinct quality of service (QOS) requirements, such as throughput, latency, reliability, and the number of connected users, which calls for a higher degree of flexibility in the physical layer network designs.

Figure 1B:
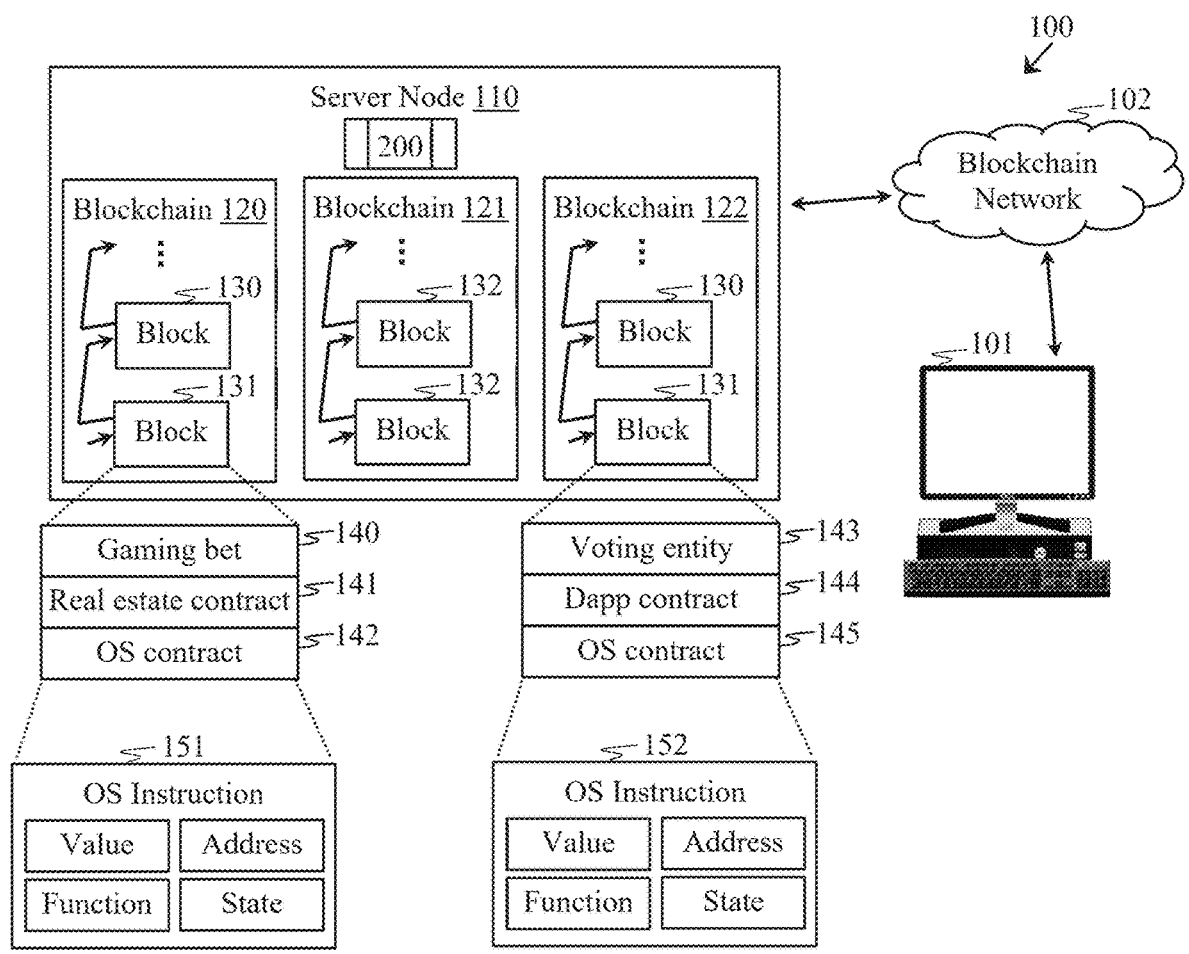
FIG. 1B illustrates an operational architecture for implementing an enhanced blockchain operating system.

Referring to the drawings, FIG. 1 illustrates an example of an operational architecture 100 related to processing operations for management of an exemplary enhanced system with which aspects of the present disclosure may be practiced. As illustrated in the embodiments shown in FIG. 1, operational architecture 100 can include user device 101 and blockchain network 102. Blockchain network 102 can includes one or more server nodes 110 which employ a blockchain operating system process 200 in the context of storing, retrieving, and executing coding and decoding instructions. Blockchain network 102 may include various hardware and software elements in a supporting architecture suitable for performing blockchain coding and/or encryption processes.

Server node 110 can include one or more servers and devices capable of running a blockchain application. User devices 101 interacting with server node 110 may include, but are not limited to, personal computers, mobile phones, handheld device, tablet computers, desktop computers, laptop computers, wearable computing devices, dedicated specialized devices (e.g., gaming machines, set top boxes, etc.) or any other form factor, including any combination of computers or variations thereof. Blockchains 120-122 represent digital ledgers that are open for a user to enter and record data into blocks 130-135 of blockchains 120-122. Blockchains 120-122 may be added by multiple users and recorded by multiple server nodes, such as server node 110 in the distributed network.

As illustrated in FIG. 1, blocks 130-135 include block entries 140-146. Block entries 140-146 may include gaming bets, inventory records, medical records, employment records, banking and financial records, real estate or title contract, DApps code stored as a smart contract, operating system code stored as a smart contract, and any other type of block entry of smart contract combination or variation thereof. For instance, the user may create block entry 140 by entering into a gaming bet with another user and then storing the contract as block entry 140 in blockchain 120 on server node 110 in the distributed network environment.

Block entries 140-145 can also each include data portions. In some aspects, data portions include encoded data in accordance with disclosed aspects. In some aspects, data portions comprise program code (e.g., smart contracts, DApps, etc.). The program code can comprise software instructions, that when executed on at least one processor, cause the processor to perform methods disclosed herein. The program code might connect to off-blockchain program code to effect the disclosed operations. In some instances, the program code encodes original data into coded data pieces, which comprises a small key (one or a few coded data pieces) and a large key (comprising the remaining number, i.e., a large number, of the coded data pieces). The program code may store the small key in a block. The program code may perform a checksum or error correction on the small key and/or the large key. The program code may provision distribution and/or storage of the large key (such as the individual coded pieces that comprise the large key). The program code may perform a zero-knowledge proof operation with a user purporting to be a key-bearer in order to verify that the user has the large key or a portion thereof. The program code may cause decoding of the original data. The program code may perform validation of the decoded data, and possibly return a confidence measure.

The program code instructions 151-152 can comprise components which make up each of block entries 142 and 145 and may be broken into code segments based on a transaction request authorization and a set of conditions which must be met to access and/or execute the instructions. For example, instructions 151-152 may each include a value, function, address, and state.

In operation, blockchain network 102 can receive a transactional request to generate a block of the blockchain comprising coded data, and possibly instructions and a set of conditions. The transactional request may include program code which may be used to execute various coding and/or decoding functionalities. In some aspects, the instructions may include scripts to authenticate access to the coding or decoding functionality. In other aspects, the instructions may include scripts to schedule resources for functionalities required to execute an application. In yet another aspect, the instructions may include scripts used to perform communications with other user accounts or scripts interacting with the blockchain network 102. In some embodiments, the instructions may include scripts which may be executed by one or more nodes in blockchain network 102, such as server node 110.

In a next operation, blockchain network 102 can authenticate the transactional request in the distributed network of nodes based on data associated with the transactional request. The transactional request may be generated using a key-pay or encrypted code verifying the identity and authorized privileges of the user transferring the transactional request. Next, blockchain network 102 can store the coded data (and possibly, program code) in the block of the blockchain. The program code can be executed when a set of conditions are met. A blockchain database may be maintained by a multitude of independent users spread across blockchain network 102 of server node 110. In this example scenario, the coded data and corresponding program code instructions can be stored in block entry 142 of block 131. The set of instructions may include terms of the smart contract which would need to be met in order to produce and/or execute the program code instructions. For example, program code instructions to decode the coded data may only be executed when a user is authorized and when an instruction from a DApp is received.

In a next operation, blockchain network 102 can authenticate the transactional request in the distributed network of nodes based on data associated with the transactional request. Similar to when the coded data and instructions were entered into a block entry in a blockchain of blockchain network 102, the transactional request to later execute the instructions to decode the data may also require that the transactional request be authenticated from user device 101. In some aspects, the authentication of the transactional request for the decoding instructions may generate an additional block entry in a block of the blockchain. However, in other aspects, the authentication of the transactional request may include an access code and/or conditions which allow the user to access the instructions for later use.

In a next operation, blockchain network 102 can evaluate the blockchain for one or more scripts associated with the transactional request. The one or more scripts may include scripts to execute various functionalities for a DApp. For example, the one or more scripts may include code, which when executed, may schedule resources for the DApp application or authenticate the user account for the DApp. In other example scenarios, the one or more scripts may include code which when executed may enable one DApp to transfer and receive communications with another DApp, coordinate user account information and authentication data, and other functionalities which may be executed on blockchain network 102 using shared protocols.

The blockchain network 102 can decode coded data based on the one or more scripts. In some example scenarios, the instructions can include APIs which may be used to execute functionalities of a DApp or other system process. However, in other example scenarios, the instructions may comprise customized kernel instructions. For example, the customized kernel instructions may enable a kernel to be compatible with various protocols used by the DApps in blockchain network 102. In other embodiments, the customized kernel instructions may be generated by the blockchain network 102 to a less resource-intensive format. This may be accomplished by one or more server nodes of the blockchain network 102 executing the one or more scripts to generate the customized kernel instructions.

In one aspect, the block chain network 102 can transfer the decoded original data to the user device in the distributed network or nodes. The decoded data may be sent to user device 101 directly. In some aspects, the decoding may be executed by one or more server nodes in blockchain network 102 and may then execute additional instructions for one or more DApps to perform the DApp decoding and/or data analysis (e.g., verification) functionalities. It should be noted that various CPUs, memories, databases, and drivers may be used from various servers and devices included in blockchain network 102 and/or external to the blockchain network 102 to execute the instructions from the block entries in blockchain network 102.

Figure 2:
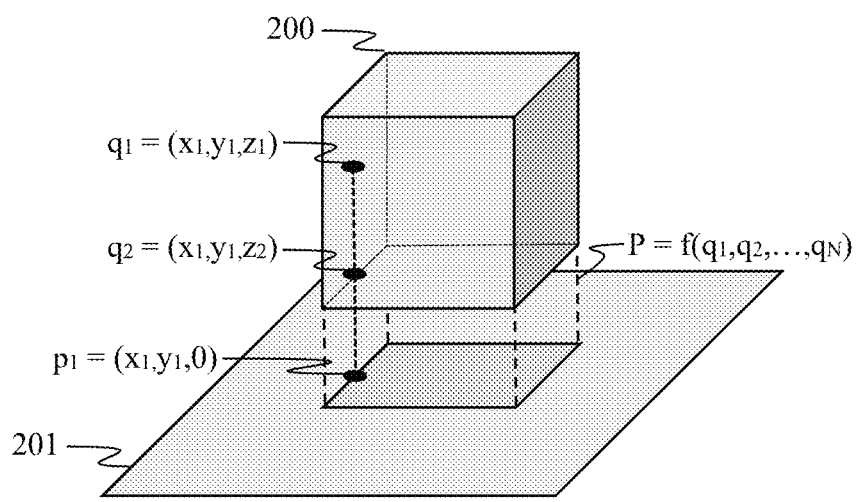
FIG. 2 depicts an operation that performs dimensionality reduction on a set of data points.

FIG. 2 depicts an operation that performs dimensionality reduction on a set of data points. In this example, a projection operator P projects points in three-dimensional space 200 (i.e., a volume) into a two-dimensional space 201 (i.e., a plane). Since the z-coordinate is set to zero, information is lost. This can result in ambiguity. For example, coordinates $q_1$ and $q_2$ both get transformed into the same point $p_1$. For any point in the reduced-dimensional space 201, the transform back to the full-dimensional space 200 presents an infinite number of possible solutions which lie on a line that is perpendicular to 201. If a projection to a different plane is performed, the projected images from both planes together provide sufficient information to recover the original data in the three-dimensional space 200. Separately, neither of the two-dimensional images is sufficient to recover the original data with a high degree of reliability.

Both of the two-dimensional images might represent keys to the original data, as the original data can be recovered when both keys are processed together. Due to the dimensionality of the solution space being greater than zero, given the first key, there is an infinite number of possible second keys that can match the first key, so there is low certainty that the key pair recovers the original data unless an additional constraint can be added to the problem. In some aspects, known relationships between the original data might be exploited to reduce the solution space, and thus increase the confidence that a given solution results in the original data. In one example, the projection operator might employ a function of the original data. The function might be a one-way function.

In one aspect, an operator is provisioned to transform (e.g., encrypt and/or encode) original data from a high-dimensional space into coded data parts that are each in a low-dimensional space. This provides an increased dimension of the solution space for each coded data part, i.e., the solution space of the transformed data has a higher dimensionality than the solution space of the original data (which might typically be dimension zero). The operator can be configured to employ a one-way function that imposes at least one constraint on the solution space in order to narrow the solution space down to a practically finite number of feasible solutions. The one-way function might comprise a function of the original data. Here, "practically finite number" means that it is computationally hard to fabricate alternative solutions that reside in the feasible-solutions space.

The operator might be employed multiple times to produce multiple keys, each being in the low-dimensional space. For example, a large number of keys may be made, the large number being equal to or greater than the difference between the dimension of the high-dimensional space and the dimension of the low-dimensional space. A small number (such as one) of the keys may be stored in a block of a blockchain to represent the original data. The rest of the keys may be stored elsewhere, e.g., off the blockchain.

A program, such as a smart contract or a DApp, might preform a reverse of the transform (e.g., decrypt, and/or decode) to recover the original data. For example, upon collecting the multiple keys (e.g., the small number of keys and the rest of the keys), the reverse transform might employ the one-way function during the reverse-transform process to produce recovered data. The program might further perform verification of the recovered data, possibly performing a decryption, checksum, and/or cryptographic hash operation on the recovered data, and possibly generating a confidence measure that the recovered data comprises the original data.

Figure 3A:
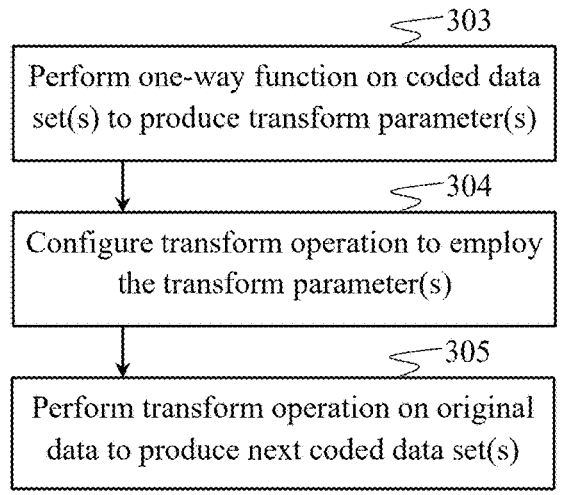
FIG. 3A illustrates a method that can be performed according to disclosed aspects wherein a transform operation is performed on original data to produce coded data.

FIG. 3A illustrates a method that can be performed according to disclosed aspects wherein a transform operation is performed on original data to produce coded data. First coded data is generated from a transform operation that operates on original data. A one-way function is performed 303 on the first coded data to produce one or more transform parameters, and the transform operation is then configured 304 to employ the one or more transform parameters when it operates 305 on the original data to produce second coded data. In some instances, the transform operation might operate 305 on the first coded data (and possibly other coded data) in addition to the original data to produce the second coded data.

In one aspect, the transform operation comprises a projection. In mathematics, a projection is a mapping of a set (or other mathematical structure) into a subset (or sub-structure). The term oblique projections can refer to non-orthogonal projections, which are performed in some disclosed aspects.

The restriction to a subspace of a projection is also called a projection, even if the idempotence property is lost. An everyday example of a projection is the casting of shadows onto a plane (paper sheet). The shadow of a three-dimensional sphere is a closed disk. For example, the mapping that takes a point (x, y, z) in three dimensions to the point (x, y, 0) in the plane is a projection. This type of projection naturally generalizes to any number of dimensions n for the source and k≤n for the target of the mapping. A linear subspace, also known as a vector subspace, is a vector space that is a subset of some larger vector space. For example, if vector V is the coordinate space $R^3$, and W is the set of all vectors in V with the z coordinate equal to zero, then W is a subspace of V.

Let the vectors $v_1, \ldots, v_k$ form a basis for the range of the projection, and assemble these vectors in an n×k matrix A. The range and the null space are complementary spaces, so the null space has dimension n−k.

The transform operation provides dimensionality reduction, or dimension reduction, which is the transformation of data from a high-dimensional space into a low-dimensional space so that the low-dimensional representation retains some meaningful properties of the original data. Methods may be linear or non-linear.

In random projection, the original d-dimensional data is projected to a k-dimensional (k<<d) subspace. $O_{d \times N}$ is the original data O that is partitioned into a set of N d-dimensional observations, then the projection matrix $R_{k \times d}$ is computed (such as from a one-way function that operates on previous coded data), and the projection of the original data is performed. $P_{k \times N} = R_{k \times d} O_{d \times N}$ is the projection of the data onto the lower k-dimensional subspace.

Quasi-orthogonal bases may be used to map large sets of vectors in a high-dimensional space to a space of much lower dimension n with approximate preservation of distances. There are exponentially large (in dimension n) sets of almost orthogonal vectors (i.e., with small value of inner products) in n-dimensional Euclidean space. In high dimensions, exponentially large numbers of randomly and independently chosen vectors from equidistribution on a sphere (or from many other distributions) are almost orthogonal with probability close to one. The vectors may be chosen based on the output of the one-way function (e.g., a cryptographic hash function). This implies that in order to represent an element of such a high-dimensional space by linear combinations of randomly and independently chosen vectors, it may often be necessary to generate samples of exponentially large length if we use bounded coefficients in linear combinations. On the other hand, if coefficients with arbitrarily large values are allowed, the number of randomly generated elements that are sufficient for approximation is even less than dimension of the data space. The randomly and independently chosen vectors may employ any of the techniques (or combinations thereof) disclosed herein for choosing the vectors. For example, a one-way function (an example is a cryptographic hash, although other examples may be used) generated (at least in part) from the original data or the projection(s) of original data as disclosed herein, may be used to choose the vectors.

The subspace of a projection may be restricted. This is important for performing the reverse, or inverse, of the operation to recover the original data with a high degree of confidence. For a function to have an inverse, it must be one-to-one (i.e., an injective function, also known as injection, or one-to-one function, is a function that maps distinct elements of its domain to distinct elements of its codomain. In other words, every element of the function's codomain is the image of at most one element of its domain). If a function $f$ is not one-to-one, it may be possible to define a partial inverse of $f$ by restricting the domain. The restriction of function $f$ is a new function obtained by selecting a smaller domain for the original function $f$. Although the decoding process recovers the original data when a sufficient number of keys is present, if the chain of custody of the large number of keys (e.g., from the creation of the keys to the decoding) is questionable, or the integrity of the keys is otherwise doubted, it is useful to have restricted the solution space. This can greatly reduce the likelihood that someone produces a counterfeit set of the large number of keys.

A solution space is the set of all possible points (sets of values of the choice variables) that satisfy the problem's constraints. This can be the initial set of candidate solutions to the problem before the set of candidates has been narrowed down. If Ax=b is a linear system, then every vector x which satisfies the system is said to be a solution vector of the linear system. The set of solution vectors of the system is called the solution space of the linear system.

Let Ax=0 be a homogenous linear system where A is an m×n matrix, that is, the system contains m linear equations of n unknowns, then the solution space W of the system is a subspace of $R^n$. If Ax=b is consistent, the set of solutions to is obtained by taking one particular solution p of Ax=b, and adding all solutions of Ax=0. In particular, if Ax=b is consistent, the solution set is a translate of a span.

Algorithms for solving various types of problems can narrow the set of candidate solutions down to a subset of the candidate solutions, which is called the feasible set, or the set of feasible solutions. A feasible set is all the solutions in a solution space that further satisfies all additional constraints. Constraint satisfaction is the process of finding a solution to a set of constraints that imposes conditions that the variables must satisfy. In the disclosed aspects, the one-way function(s) 303 employed with the transform operation 305 can narrow the set of candidate solutions down to the set of feasible solutions, and can be employed in constraint satisfaction in the decoding process.

Figure 3B:
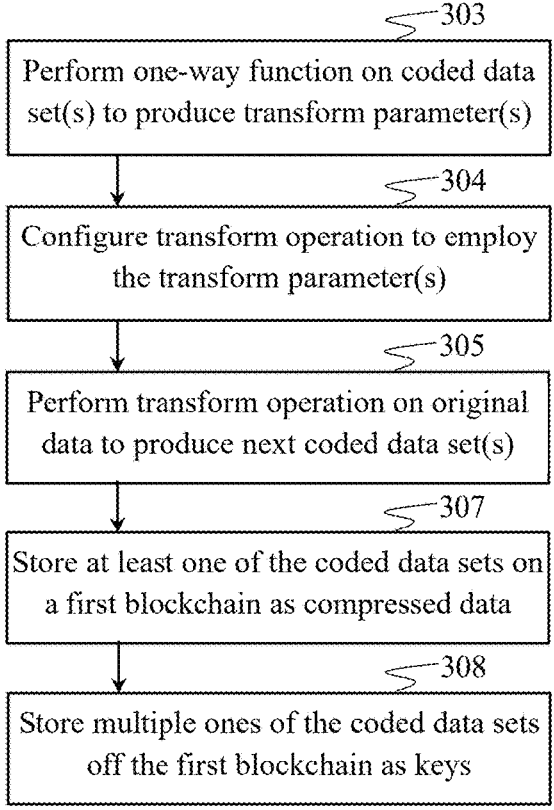
FIG. 3B illustrates a method that encodes original data, wherein a one-way function is performed on a previously coded data set to compute at least one transform parameter.

FIG. 3B illustrates a method that encodes original data, wherein a one-way function is performed 303 on a previously coded data set to compute at least one transform parameter, the transform operation is configured 304 to employ the at least one transform parameter, and the transform operation is performed 305 on original data to produce a next coded data set. In one example, the one-way function is a cryptographic hash that produces a hash value from the previously coded data set. A set of coefficients is selected based on the hash value. The set of coefficients is the transform parameter used by a linear coder transform operation to produce a linear combination of the original data. The linear combination is the next coded data set. At least N coded data sets may be produced, and each coded data set can comprise approximately 1/N of the size of the original data. One, or a small number, of the coded data sets may be stored 307 on a first blockchain. Each coded data set may be referred to as a key. The rest of the coded data sets, referred to as a large number of keys, may be stored 308 in memory off the first blockchain.

Figure 3C:
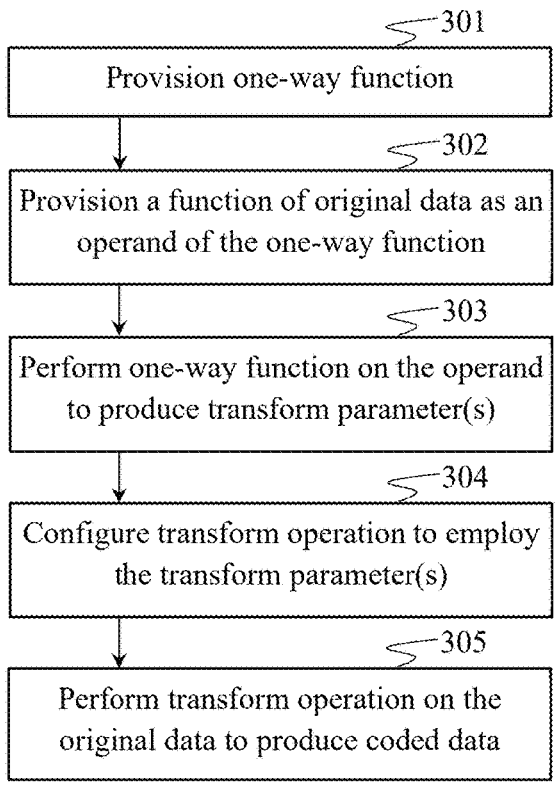
FIG. 3C illustrates a method for encoding data according to some aspects of the disclosure.

FIG. 3C illustrates a method for encoding data according to some aspects of the disclosure. A one-way function is provisioned 301. The one-way function might be a cryptographic hash function, for example. A function of original data is provisioned 302 as an operand for the one-way function. For example, the original data might be segmented into N blocks of original data, such as a vector of original data portions, and the data might be encrypted and/or encoded to produce at least one block of encrypted and/or encoded data. Original data, referred to in this disclosure, can comprise encrypted data and/or encoded data. In one example, the encryption can employ a private key or secret key. In a corresponding decoding method (e.g., FIG. 7C), the (assumed) original data is decrypted 408 to produce decrypted data. The encryption adds an additional constraint to the solution space, and thus can further ensure whether a candidate set of keys produces a solution that is the original data. A confidence measure to this effect can be computed in the decryption step 408 as part of a process to determine if the decrypted data is decrypted original data.

The one-way function is performed 303 on the operand to produce one or more transform parameters. In one example, the one-way function is a hash function that is performed on the at least one block of coded data to produce a hash value, which is then processed as part of 303 to select a set of linear-combining coefficients. The transform operation is configured 304 to employ the one or more transform parameters and performs 305 the transform operation on the original data to produce coded data. In one example, the transform operation multiplies a vector of the linear-combining coefficients with the vector of original data portions, and sums the products, such as to produce an inner product or dot product, which is coded data.

Figure 3D:
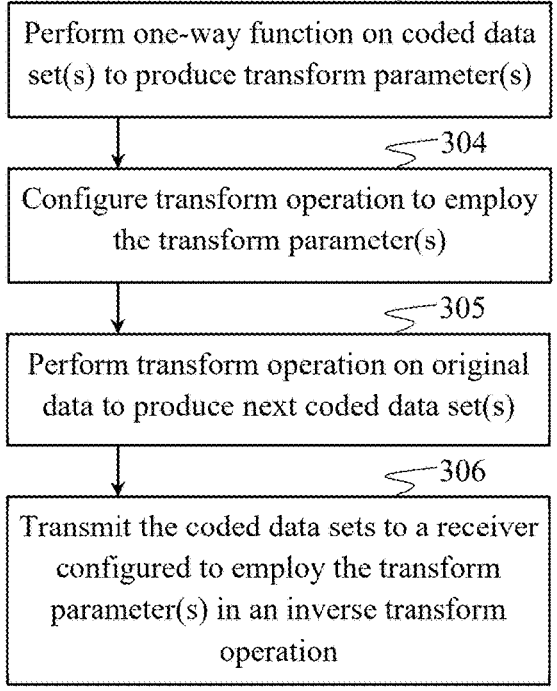
FIG. 3D illustrates a method that can provide linear network coding to original data.

In FIG. 3D, steps 303, 304, and 305 are part of a method that can provide linear network coding to original data. In step 306, the coded data sets are transmitted in a communication network to one or more receivers. Transmission can employ one or more network paths in each of one or more communication networks. Transmission can comprise distributing the coded data sets to multiple memory storage devices, such that the data is made available for later retrieval. The coded data sets may be distributed throughout a Cloud, a file-sharing network, a mesh network, an ad-hoc peer-to-peer network, a cooperative network of wireless terminals, and/or any other distributed or decentralized communication network.

In a linear network coding example according to some aspects of the disclosure, coded packets $X_k$ are generated, which are linear combinations of original packets, wherein the original packets $O_i$ are multiplied by coefficients $g^i_k$ chosen from a finite field, or Galois field:

$$X_k = \sum_{i=0}^{N-1} g_k^i O_i$$

The set of coded packets may be the same length as the set of original packets. Decoding can be performed by collecting the coded packets in a matrix and performing Gaussian elimination on the matrix. Other decoding techniques may be employed.

Random linear network coding (rLNC) is a simple yet powerful encoding scheme, which in broadcast transmission schemes can allow close to optimal throughput using a decentralized algorithm. Nodes can transmit random linear combinations of the packets they receive, with coefficients chosen from a Galois field. If the field size is sufficiently large, the probability that the receiver(s) will obtain linearly independent combinations (and therefore obtain innovative information) approaches 1. Although random linear network coding has excellent throughput performance, if a receiver obtains an insufficient number of packets, it is extremely unlikely that it can recover any of the original packets. This can be addressed by sending additional random linear combinations until the receiver obtains the appropriate number of packets. In some instances, constraints may be employed in the coding and/or the original data, which can facilitate recovery of the original data and/or authenticate the original data.

Some of the difficulties with RLNC are:
1) High transmission overhead due to attaching large coefficients vectors to encoded blocks; and
2) High decoding computational complexity due to using the Gauss-Jordan elimination method.

The large coefficient vectors also increase storage overhead. This can be remedied by using a function of the hash of the current coded packet as the code for the next coded packet. Packets can be indexed to indicate the order of coding, and thus, decoding. Upon receiving coded packets, the receiver can arrange the coded packets by index, such as in ascending order, and perform a predetermined hash function on each packet to determine the coefficient vector for the next packet.

High decoding computational complexity can be especially problematic when executed in a smart contract. Complex computations executed in a smart contract are typically very expensive, and so they are often kept as minimal as possible. In such aspects, it is important to identify which portions of the application need a trusted and decentralized execution platform. The other portions can be executed off-chain. A really large monolithic smart contract may cost a lot of gas to deploy and use. Therefore, some applications may have off-chain computation and an external data source. However, having the core logic of the DApp be dependent on external data means that users will have to trust these external resources.

Due to high gas costs and the currently low block gas limit, smart contracts are not well suited to storing or processing large amounts of data. Hence, most DApps utilize off-chain data storage services, meaning they store the bulky data off the Ethereum chain on a data storage platform. That data storage platform can be centralized (for example, a typical cloud database), or the data can be decentralized, stored on a P2P platform, such as IPFS or Swarm (or some other decentralized content-addressable storage system). Decentralized P2P storage is typically used for storing and distributing large static assets, such as images, videos, and the resources of the application's frontend web interface (HTML, CSS, JavaScript, etc.).

In some aspects, the disclosed smart contracts can be configured to exploit the high cost of on-chain computations to discourage hacking of the coded data. In one aspect, one of the coded data sets, comprising a linear combination of original data sets, is stored 307 on the blockchain. The rest of the coded data sets can be stored 308 elsewhere. The users of the smart contract do not need to trust the resources that store the rest of the coded data sets, because the smart contract authenticates those coded data sets.

The one of the coded data sets is an underdetermined system. A system of linear equations or a system of polynomial equations is considered underdetermined if there are fewer equations than unknowns. Each unknown can be seen as an available degree of freedom. Each equation introduced into the system can be viewed as a constraint that restricts one degree of freedom. The underdetermined case, by contrast, occurs when the system has been under-constrained—that is, when the unknowns outnumber the equations.

If an underdetermined system of t equations in n variables (t<n) has solutions, then the set of all complex solutions is an algebraic set that has dimension of at least n−t. If the underdetermined system is chosen at random the dimension is equal to n−t with probability one. In general, an underdetermined system of linear equations has an infinite number of solutions, if any. However, in optimization problems that are subject to linear equality constraints, only one of the solutions is relevant, namely the one giving the highest or lowest value of an objective function (e.g., a loss function or cost function). Some problems specify that one or more of the variables are constrained to take on integer values. An integer constraint leads to integer programming and Diophantine equations problems, which may have only a finite number of solutions. Aspects of the disclosure provision additional constraints in the underdetermined system in order to verify if a candidate set of keys (e.g., the other coded data sets) produces the valid solution—specifically, that the candidate set of keys, when combined with the one coded data set, recovers the original data, at least with a confidence measure that is above a predetermined threshold value.

Unlike the optimization problem, disclosed aspects in which one (or a small number) of a large number of coded data sets is stored as an identifier of the original data functions as an escrowed encryption mechanism. Thus, the coding and decoding has structure that distinguishes over the optimization, integer programming, and Diophantine equations problems.

The term "escrow," as used conventionally, implies that some item of value (e.g., a trust deed, money, real property, other physical object) is delivered to an independent trusted party that might be a person or an organization (i.e., an escrow agent) for safekeeping, and is accompanied by a set of rules provided by the parties involved in the transaction governing the actions of the escrow agent. Such rules typically specify what is to be done with the item, the schedule to be followed, and the list of other events that have to occur. The underlying notion is that the escrow agent is a secure haven for temporary ownership or possession of the item, is legally bound to comply with the set of rules for its disposition, functions as a disinterested extra-transaction party, and bears legal liability for malfeasance or mistakes.

Usually, the rules stipulate that when all conditions set forth in the escrow rules have been fulfilled, the item will eventually be delivered to a specified party (e.g., possibly the original depositing party, an estate, a judicial officer for custody, one or more individuals or organizations). In any event, the salient point is that all terms and conditions and functioning of an escrow process are, or can be, visible to the parties involved; moreover, the behavior and performance of formal escrow agents are governed by legally established obligations. In some aspects, a disclosed smart contract functions as an escrow agent, wherein the smart contract receives original data for safekeeping, encodes the data, stores the coded data on the blockchain for safekeeping, and delivers the key(s) to the coded data to one or more parties. The smart contract might employ a set of rules that specifies, for example, how the coded data is decoded. For example, the smart contract might verify a keyholder, a set of keys, or some secret that only the holder of a legitimate key would know. The smart contract might employs rules for transferring or disseminating the original data upon successful decoding.

In some aspects, the smart contract might perform secret sharing (also called secret splitting), which refers to methods for distributing a secret among a group of participants, each of whom is allocated a share of the secret. The secret can be reconstructed only when a sufficient number, of possibly different types, of shares are combined together; individual shares are of no use on their own. Typically, a secure secret sharing scheme distributes shares so that anyone with fewer than t shares has no more information about the secret than someone with zero shares.

However, due to the on-chain coded data being underdetermined, there are potentially an infinite number of false keys, and thus, false solutions. But constraints on the original data and/or coding can reduce the solution space such that false solutions are computationally difficult to produce. In such aspects, provisioning a smart contract that is expensive to execute can be an effective deterrent against hackers. Furthermore, if a false solution is produced, the solution is unlikely to comprise meaningful information. The smart contract might perform a randomness test to determine if the solution has patterns, i.e., non-random structure. Randomness tests can include measures based on statistical tests, transforms, information entropy, autocorrelation, spectral density, complexity, or any combination of these. The smart contract may compute a confidence measure based on the randomness test. Alternatively, the smart contract might perform some operation on the solution and compare the result to a known result of the same operation on the original data. Aspects disclosed herein provide for enabling the smart contract to quickly verify a solution to the problem, whereas there is no known way to quickly find a counterfeit solution (i.e., a solution that is not the original data). For example, the time required to compute a counterfeit solution to the problem increases rapidly as the size of the problem increases.

Typically, in unconditionally secure secret sharing schemes, each share of the secret must be at least as large as the secret itself. The disadvantage of unconditionally secure secret sharing schemes is that the storage and transmission of the shares requires an amount of storage and bandwidth resources equivalent to the size of the secret times the number of shares. Thus, disclosed aspects differ from unconditionally secure secret sharing schemes.

In some aspects, RLNC can be configured to employ an all-or-nothing transform (AONT), also known as an all-or-nothing protocol, which is an encryption mode that allows data to be understood only if all of it is known. AONTs are not encryption, but frequently make use of symmetric ciphers and may be applied before encryption. In exact terms, "an AONT is an unkeyed, invertible, randomized transformation, with the property that it is hard to invert unless all of the output is known." An AONT is a fixed public transform that usually anyone can perform on the message to obtain the pseudo-message, or invert, given the pseudo-message. As the disclosed aspects differ in nature from the optimization problem, they employ different structure for narrowing the solution space. Accordingly, an AONT can be employed as a constraint in the underdetermined case in order to narrow the solution space.

Figure 4A:
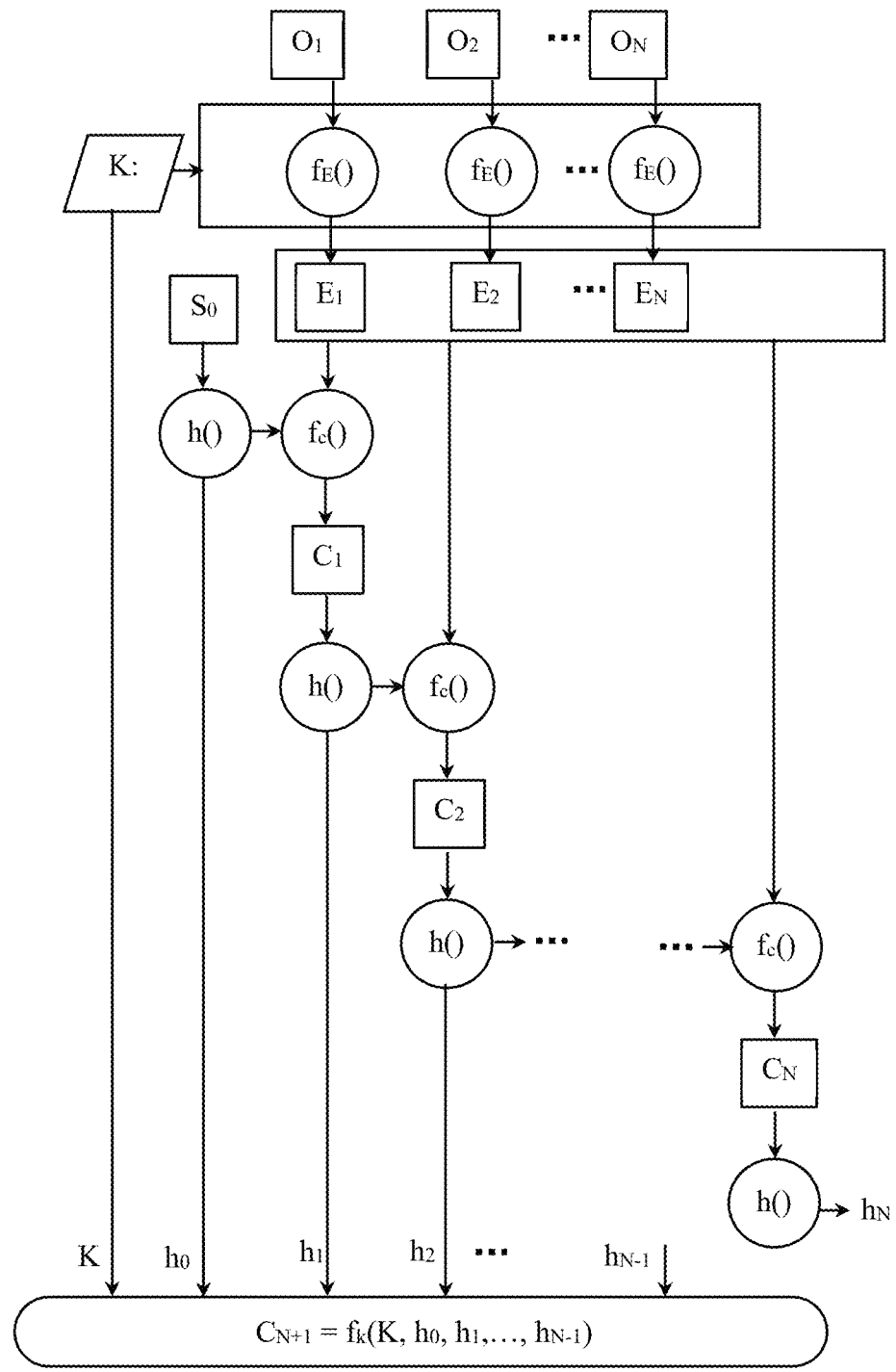
FIG. 4A illustrates a functional aspect of linear network coding that can employ an all-or-nothing transform.

FIG. 4A illustrates a functional aspect of linear network coding that employs an AONT. An original data file or stream is partitioned into N original data sets, or blocks, $O_1$, $O_2$, ..., $O_N$. The value N may denote a coding factor, and each of the N data sets $O_1$, $O_2$, ..., $O_N$ can be 1/N of the size of the original data file or portion of the original stream before it is partitioned. Each of the original data sets may comprise a data symbol, a block of data symbols, a packet, a slot, a frame, a file, or any other grouping or structure of data. Each of the original data sets may comprise a vector, a matrix, a tensor, or another data structure. While this functional aspect is described with respect to fixed-length input and output blocks, other types of blocks may be employed. In one example, a sliding block may be employed. A first block of coded data or a first pseudo-message may be computed from a first block of original data $O_1$, $O_2$, ..., $O_N$, and a subsequent block of coded data or a subsequent pseudo-message may be computed from a shifted block of original data $O_2$, $O_3$, ..., $O_{N+1}$ wherein at least one original data set (e.g., $O_1$) is removed from the block and at least one other original data set (e.g., $O_{N+1}$) is added to the block.

Each of the data sets $O_1$, $O_2$, ..., $O_N$ can be transformed into a pseudo-message $E_1$, $E_2$, ..., $E_N$ using an encryption and/or package transform function $F_E(\ )$ according to at least one key K, such as a random key. Any of the various types of keys disclosed herein may be employed. Other values may be employed in the transform function, such as the index value for each original data set. The package transform is an invertible transform. An encryption operation might encrypt pseudo-messages ($E_1$, $E_2$, ..., $E_N$) produced by the package transform. In some instances, it is advantageous if the data sets $O_1$, $O_2$, ..., $O_N$ are randomized such that a chosen or known message attack does not yield a known pseudo-message. An invertible randomizing operation might be performed on the original data before the package transform.

In one example, a random key K is selected. Then the transform $F_E(\ )$ expresses the operation $E_i=f(K,i) \oplus O_i$, where $E_i$ is the output sequence, $f(K,i)$ is a function of the random key K and index i=1, 2, ..., N. The pseudo-message can comprise $E_1$, $E_2$, ..., $E_N$, and block $C_{N+1}$ described below.

A data set $S_0$ can be operated upon by a cryptographic hash function $h(\ )$ to produce an initial hash value $h_0$. In some instances, the data set $S_0$ can comprise a function of the pseudo-message $E_1$, $E_2$, ..., $E_N$, or a function of one or more previously generated coded data sets, or some other information. The hash $h_0$ can be processed in a coding function $f_c(\ )$ which computes an NX1 coefficient vector $c_1$ from the hash $h_0$, and performs an inner product between the coefficient vector $c_1$ and the N pseudo-message data sets, $E_1$, $E_2$, ..., $E_N$, to produce a first coded data set, $C_1$. The first coded data set $C_1$ can be operated upon by cryptographic hash function $h(\ )$ to produce a hash value $h_1$, and coding function $f_c(\ )$ can generate an NX1 coefficient vector $c_2$ from the hash $h_1$, and perform an inner product between the coefficient vector $c_2$ and the pseudo-message data set $E_1$, $E_2$, ..., $E_N$ to produce a second coded data set, $C_2$. Each subsequent coded data set up to $C_N$ can be generated using the coefficient vector produced from the cryptographic hash of the previous coded data set. A hash $h_n$ of $C_N$ might be computed and used as the hash $h_0$ to encode a next pseudo message corresponding to a new block of original data. In one example, the hash function can be $h(K_0, E_i \oplus i)$, where $K_0$ is a public encryption key. Thus, $h_1 = h(K_0, E_i \delta i)$.

The hash values $h_0, h_1, \ldots, h_{N-1}$ and the key K are operated upon by a function $f_K(\ )$ to produce key-hash data $C_{N+1}$. In one example, $C_{N+1} = K \oplus h_1 \oplus h_2 \ldots \oplus h_N$. This transform is invertible. For example, a receiver can perform a function $f_K(\ )$ on $C_{N+1}$ and hash values $h_0, h_1, \ldots, h_{N-1}$ to recover the key K: $K = C_{N+1} \oplus h_1 \oplus h_2 \ldots \oplus h_N$, followed by function $f_E(\ )$ which operates on a function of K and i, and $E_i$ to produce $O_i = f(K,i) \oplus E_i$. If any block $\{C_1, C_2, \ldots, C_{N+1}\}$ is missing, then K cannot be computed, and thus it is infeasible to compute any original message block $O_1, O_2, \ldots, O_N$.

In some instances, more than N coded data sets may be produced for N pseudo-message data sets, $E_1, E_2, \ldots, E_N$. Thus, a set of N'>N coded data sets may provide for an over-determined system. In one example, each coded data set $C_i$ is provided with a corresponding checksum or error correction code. Before the key-hash data $C_{N+1}$ is computed, coded data sets $C_i$ are transmitted to at least one receiver, and the at least one receiver processes the corresponding checksum or error correction code to detect (and possibly correct) any errors in the transmitted signal. If a $C_i$ cannot be corrected by the receiver, the receiver notifies the transmitter, which can retransmit the $C_i$ or generate a new $C_i$ for transmission. Upon receiving acknowledgement of successful reception of at least N of the $C_i$, the key-hash data $C_{N+1}$ is computed. The $C_{N+1}$ may be computed using N'>N hash values, such as corresponding to N'-1 of the coded data $C_i$.

In one aspect, a small number n (e.g., 1) of the coded data sets (e.g., $C_1, C_2, \ldots, C_N$) can be stored on a blockchain, and thus function like a compressed version of the original data $O_1, O_2, \ldots, O_N$, and the remaining N-n coded data sets can be distributed and/or stored elsewhere. The N-n coded data sets can function as a key that can be used to decode the coded data set(s) on the blockchain at some later time. In this aspect, it is important to verify that a candidate key (i.e., N-n coded data sets) is the same key that was used to encode the original data, and not a counterfeit key. The constraints imposed by the all-or-nothing transform and the interrelatedness of the coded data sets make a counterfeit solution to the underdetermined system unlikely. Moreover, the constraints make a counterfeit solution that produces a set of decoded data that is intelligible (i.e., makes sense) is even less likely. This can enable a single (or small number n) one of the coded data sets, which comprises a linear combination of the original data, to provide memory-efficient storage of the original data in memory-constrained scenarios, such as blockchains. While it might be possible to fabricate a coded data set that has the same hash value as an authentic coded data set, the use of each hash to mix the original data in each subsequent coded data set can compound the counterfeiting difficulty exponentially relative to N. Embedding an AONT in the coded data further complicates any counterfeiting attempt. Encryption can further secure the original data. One way in which a cryptographic system may be attacked is by a brute-force search in which all possible keys are tested until the plaintext has some pattern that makes sense. As the above constraints make finding any solution by brute force computationally hard, the likelihood that such a solution would yield meaningful plaintext is extremely small.

In some instances, it is advantageous to allow, if not actually facilitate, a brute-force attack to decode the coded data $C_1, C_2, \ldots, C_N$ in a manner that reveals the original data, and can differentiate the original data over a false solution with a high degree of confidence, particularly if the original data is intended to be revealed publicly at some later date. The degree of concealment, and/or the usefulness of hints to aid such an attack that are made public can be carefully computed to limit the concealment of the original data to a predetermined amount of time. This can help substantiate an independent verification of the original data when it needs to be publicly revealed.

In one example, the work required to decipher a coded message can be computed, and then the time to decipher the coded message can then be estimated based on known or estimated computing resources available to an attacker(s). The encryption strength (e.g., of the cryptographic hashes, cryptographic key size, size of the key space, due to the type of encryption algorithm, etc.), work-factor expansion due to the message size in the AONT, degree of randomization in the AONT, N, n, and possibly one or more other factors can be provisioned to provide a high likelihood that the original data remain secure for a predetermined amount of time; or in some instances, that the original data be revealed via an attack by a certain time.

Figure 4B:
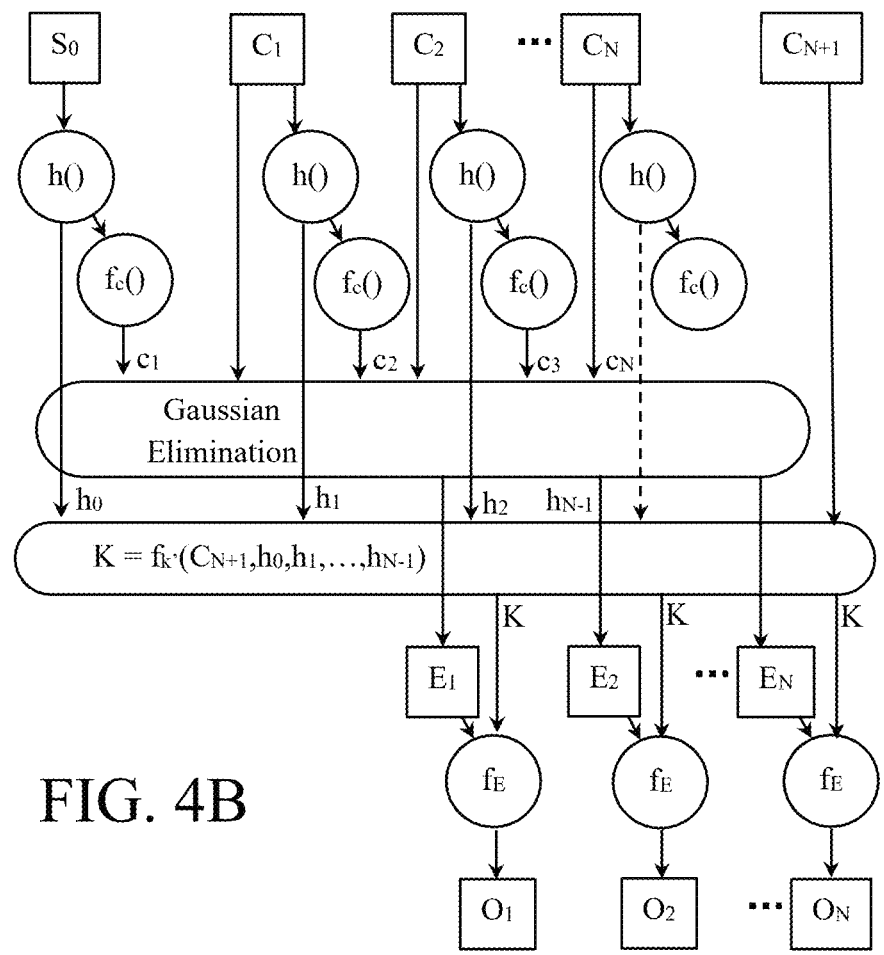
FIG. 4B illustrates a decoding implementation that corresponds to the coding shown in FIG. 4A, and may be implemented as a smart contract having at least some components that reside on a blockchain.

FIG. 4B illustrates a decoding implementation that corresponds to the coding shown in FIG. 4A, and may be implemented as a smart contract having at least some components that reside on a blockchain. The operations in FIG. 4B can effect an inverse, or complement, to the operations shown in FIG. 4A. At least some of the coded data $C_1, C_2, \ldots, C_N$, and $C_{N+1}$, are received or retrieved from memory. The decoder may validate the coded data via a checksum, and may correct errors in the coded data via an error-correction code. In some instances, the decoder can validate the coded data via its hash values if the hash values are previously known by the decoder. The decoder may may employ a zero-knowledge proof or zero-knowledge protocol to verify that a party presenting a key knows something about the original data or key K which only the legitimate keyholder(s) or creator of the original data would know. A hash function $h(\ )$ is performed on $S_0$ and on at least $C_1, C_2, \ldots, C_{N-1}$. If hash value $h_N$ was used to create $C_{N+1}$, then the hash function $h(\ )$ is performed on $C_N$. Function $f_c(\ )$ is performed on each hash value (at least $h_0, h_1, \ldots, h_{N-1}$) as in FIG. 4A to generate the at least N coefficient vectors $c_1, \ldots, c_N$. The coded data $C_1, C_2, \ldots, C_N$ and coefficient vectors $c_1, \ldots, c_N$ are processed in a linear network coding decoding process, such as a Gaussian elimination, to decode the coded data, which yields the pseudo-message parts, $E_1, E_2, \ldots, E_N$. The hash of $C_N$ may be performed, and the hash value operated upon by $f_c(\ )$ to produce an initial coefficient vector (e.g., a $c_1$) for a next set of coded data.

The $C_{N+1}$ and the hash values $h_0, h_1, \ldots, h_{N-1}$ can be operated upon by function $f_K(\ )$ to recover key K; e.g., $K = C_{N+1} \oplus h_1 \oplus h_2 \ldots \oplus h_N$. The decoder can employ function $f_E(\ )$ which operates on a function $f(\ )$ of K and i, and on $E_i$ to recover the original data, e.g., $O_i = f(K,i) \oplus E_i$.

Figure 5A:
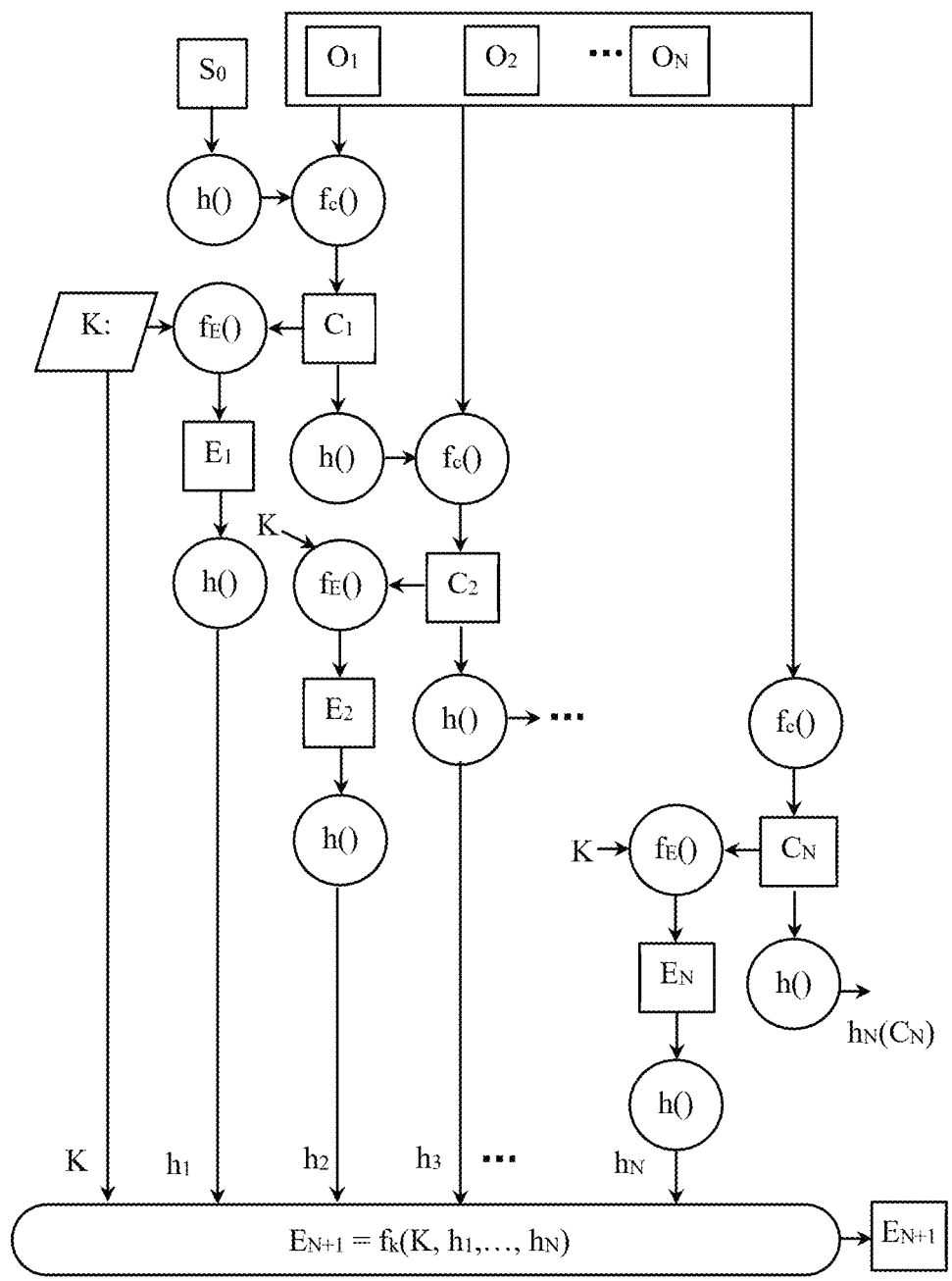
FIG. 5A illustrates a coding method according to some aspects of the disclosure.

FIG. 5A illustrates a coding method according to some aspects of the disclosure. A set of original data symbols, data blocks, data packets, data groups, or data files is represented by vector O. Vector O is divided, partitioned, or grouped into N original data symbols, streams, layers, data blocks, data packets, data groups, or data files represented by vectors $O_i$, $i = \{1, \ldots, N\}$, which can be referred to as original data sets. As described anywhere in this disclosure, original data (before and/or after it is partitioned into data sets) may be encrypted, such as on the transmitter/encoder side, and corresponding decryption can be performed on the receiver/decoder side.

Disclosed aspects include computing a coding matrix AN to encode the set of vectors $O_i$ to produce at least N coded data symbols, data blocks, data packets, data groups, or data files represented by coded vectors $C_j$, j={1, . . . ,M}, M≥N. In one instance, the code vectors $c_j$ in $A_N$ are generated from cryptographic hash functions h( ) For example, some of the hash functions h( ) may each comprise a hash of one or more the code vectors $c_j$ and possibly other information, such as a cryptographic key, index j, and/or other information. The coded data C produced by the linear network coding may be expressed as:

$$C = A_N^T O;$$

$$C = \begin{bmatrix} c_1 \\ \vdots \\ c_N \end{bmatrix}^T O = \begin{bmatrix} \langle O, c_1 \rangle \\ \vdots \\ \langle O, c_N \rangle \end{bmatrix}$$

where C is at least the set of vectors $C_j$, j={1, . . . ,M}, and M=N in this case; O is the set of vectors, $O_1, \ldots, O_N$; $C_1, \ldots, C_N$ are the column vectors (i.e., codes) of the code matrix $A_N$, and $^T$ denotes the transpose (or conjugate-transpose, in some instances). Thus, in one example, the $j^{th}$ row of $A_N^T$ is the $j^{th}$ column of $A_N$. Multiplying the code matrix $A_N^T$ by the set of original vectors O produces a column vector C in which the $j^{th}$ element $C_j$ is the inner product of the $j^{th}$ code $c_j$ with O, i.e., $$C_j = c_j^T O = \langle O, c_j \rangle.$$

Coded vectors $C_j$ may be transmitted (such as in a wireless communication network, a decentralized network, a peer-to-peer network, and/or other network type) to a receiver configured to decode the original vector O after a sufficient number of the coded vectors $C_j$ are received by the receiver. In some instances, the receiver may collect the coded vectors $C_j$ from multiple network paths, possibly from multiple network nodes. The coded vectors $C_j$ may reside on multiple network nodes until a software program at the receiver initiates collection of the coded vectors.

In FIG. 5A, additional processing may be provided to the coded vectors $C_1, \ldots, C_N$ and/or pseudo-message vectors $E_1, \ldots, E_{N+1}$ before they are transmitted or stored. As described anywhere in this disclosure, coded vectors $C_1, \ldots, C_N$ and/or pseudo-message vectors $E_1, \ldots, E_{N+1}$ may be encrypted, such as on the transmitter/encoder side, and corresponding decryption can be performed on the receiver/decoder side.

In FIG. 5A, a first data value, reference symbol, or other quantity or data structure $S_0$ can be processed by a hash function h( ) to produce an initial hash value $h_0'$. In one example, the hash function h( ) can produce hash value $h_0'=h(K_0, S_0)$. The hash value $h_0'$ can be processed by a linear coding function $f_c()$ which generates a first coefficient vector $c_1$ from the hash $h_0'$, and employs the coefficient vector $c_1$ to produce a first linear combination (e.g., coded vector $C_1$) of the original data $O_1, O_2, \ldots, O_N$. First coded vector $C_i$ is produced by the linear coding function $f_c()$. It should be appreciated that in any of the examples of the disclosure, the original data $O_1, O_2, \ldots, O_N$ may comprise encrypted original data and/or AONT original data (i.e., data that was processed with an all-or-nothing transform).

The first coded vector $C_i$ is processed by both a hash function h( ) and a transform function $f_E()$ In one example, a random key K is selected. Then the transform $f_E()$ may express the operation $E_i = f(K,i) \oplus C_i$, where $E_i$ is one of a plurality of data set components of a pseudo-message that comprises $E_1, E_2, \ldots, E_N$, and f(K,i) is a function of the random key K and index i=1, 2, . . . , N. The pseudo-message can comprise $E_1, E_2, \ldots, E_N$, and block $E_{N+1}$ described below.

The hash function h( ) operates on $C_i$ to produce a hash value $h_1'$, which is processed by a linear coding function $f_c()$ which generates a second coefficient vector $c_2$ from the hash $h_1'$, and employs the coefficient vector $c_2$ to produce a linear combination (e.g., coded vector $C_2$) of the original data $O_1, O_2, \ldots, O_N$. Each subsequent coded vector $C_3, \ldots, C_N$ is generated in a similar manner by exploiting the hash value of the previous coded vector.

Each coded vector $C_i$ is processed by transform function $f_E()$ (e.g., which may perform the operation $E_i = f(K,i) \oplus C_i$) to produce pseudo-message vector $E_i$. The transform function $f_E()$ is invertible, as a decoder can employ function $f_E'()$ which operates on a function of K and i, and $E_i$ to produce $C_i$ (e.g., $C_i = f(K,i) \oplus (E_i)$. Each of the pseudo-message vectors $E_1, E_2, \ldots, E_N$ can be hashed by a hash function h( ) resulting in a set of hash values, $h_1, \ldots, h_N$. The key K and the hash values, $h_1, \ldots, h_N$ are processed with a key transform function $f_k()$ to produce key-hash data $E_{N+1}$. In one example, $E_{N+1} = K \oplus h_1 \oplus h_2 \ldots \oplus h_N$. This transform is invertible. For example, a receiver can perform a function $f_k'()$ on $E_{N+1}$ and hash values $h_0, h_1, \ldots, h_{N-1}$ to recover the key K: $K = E_{N+1} \oplus h_1 \oplus h_2 \ldots \oplus h_N$. Similarly, by function $f_E'()$ which operates on a function of K and i, and $E_i$ to produce $C_i = f(K,i) \oplus E_i$. The pseudo-message comprising $E_1, E_2, \ldots, E_{N+1}$ can be transmitted to a receiver.

In one aspect, a first set $k_1$ and at least a second set $k_2$ may be selected from the pseudo-message vectors $E_1, E_2, \ldots, E_N$, wherein $k_1$ comprises at least one of the pseudo-message vectors $C_j$ and $k_2$ comprises multiple ones of the pseudo-message vectors. e.g., $$k_1 = \{E_j\}, k_2 = \{E_1, \ldots, E_{j-1}, E_{j+1}, \ldots, E_N\}$$

$k_1$ might be much smaller than $k_2$, and thus require less memory for storage. $k_1$ might be referred to as a small puzzle, and $k_2$ referred to as a key, or a large key. The first set $k_1$ and the second set $k_2$ may each be insufficient for decoding the set of original vectors O, but together, are sufficient for decoding O. In one example, the first set $k_1$ may be stored on a blockchain, wherein the at least one of the coded vectors $C_i$ comprises a linear combination of the original vectors, $O_1, \ldots, O_N$. The small puzzle can exploit the reduced dimensionality (and thus, the smaller size) of $k_1$ to store $E_j$, which is a coded version (via linear combination) of the original vectors, $O_1, \ldots, O_N$.

The set $k_1$ may be stored with a DApp, or smart contract program. The second set $k_2$ may be kept by a keyholder. For example, the keyholder might be the creator or originator of the original data O, or may be a proxy or escrow service, or some other intermediary. In one example, the DApp or some other program (any of these referred to as the program), upon activation, causes the first set $k_1$ and the second set $k_2$ to be processed together in order to decode the original data O.

While the program might interface with other programs on the blockchain, in some instances, the program may interface with at least one other program that is not on the blockchain in order to perform operations that have high computational complexity, high memory demands, or are otherwise expensive to run on the blockchain. For example, computer code that performs decoding may be partitioned into low-cost code segments or subroutines configured to run on the DApp, and high-cost code segments or subroutines configured to run in one or more programs that are not on the blockchain.

In some aspects, the program and a party wishing to decode $k_1$ (i.e., the petitioner) may engage in a zero-knowledge proof or zero-knowledge protocol to prove to the program that the petitioner knows something about O, K, and/or other information the keyholder of $k_2$ or originator of O would know. In this case, the petitioner is the prover and the program is the verifier. An interactive or non-interactive zero-knowledge proof may be performed, and it may be performed on or off the blockchain. Once the program (verifier) verifies the prover, the program may proceed to process $k_2$ and $k_1$ to restore (i.e., decode) O. In one aspect, the key and puzzle are gathered: $\{k_1, k_2\}=E_1, E_2, \ldots, E_{N+1}$. An error check may be performed on $E_1, E_2, \ldots, E_{N+1}$. If there are no errors, or the errors can be corrected, processing proceeds.

Figure 5B:
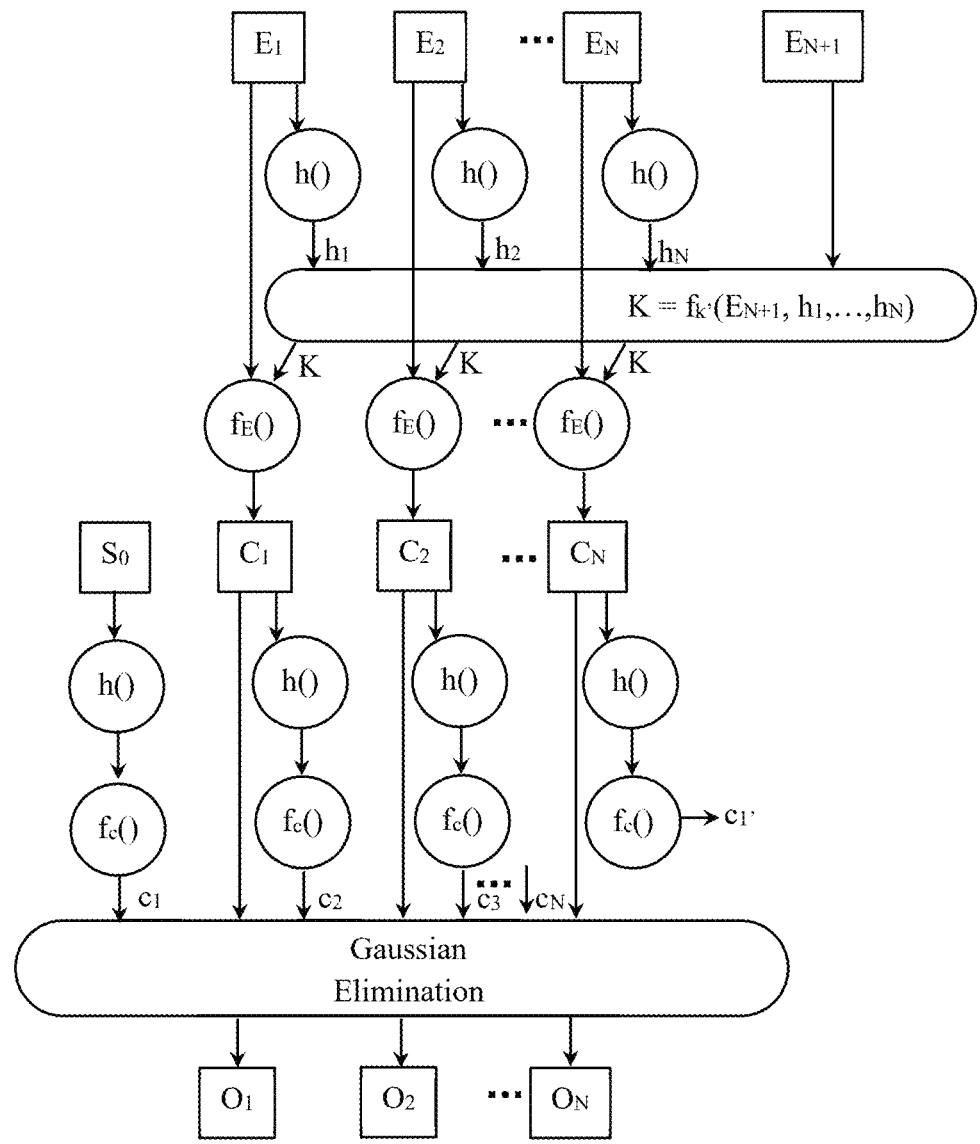
FIG. 5B illustrates decoding relative to coding shown in FIG. 5A, according to some aspects of the disclosure.

FIG. 5B illustrates decoding relative to coding shown in FIG. 5A, according to some aspects of the disclosure. Components of the pseudo-message $E_1, E_2, \ldots, E_{N+1}$ are collected, and a hash h( ) is performed on each of $E_1, E_2, \ldots, E_N$. If the pseudo-message $E_1, E_2, \ldots, E_{N+1}$ was encrypted, then decryption can be performed. The hash h( ) may be performed on the encrypted and/or decrypted $E_1, E_2, \ldots, E_{N+1}$ depending on whether the corresponding transmitter/encoder performed the hash h( ) on the encrypted and/or unencrypted $E_1, E_2, \ldots, E_{N+1}$. A key-transform function $f_{k'}$ processes the hash values $h_1, h_2, \ldots, h_n$ with $E_{N+1}$ to recover key K.

Each pseudo-message vector $E_1, E_2, \ldots, E_N$ is processed by transform function $f_E( )$ which operates on a function of K and i, and $E_i$ to produce $C_i$ (e.g., $C_i=f(K,i)\oplus E_i$). If the $C_i$ values were encrypted on the transmit/encode side, then a corresponding decryption can be performed here. A hash h( ) is performed on each $C_i$, (and $S_0$) and a coefficient function $f_c( )$ operates on each hash value computed from the vectors $C_i$ (and $S_0$) to produce a corresponding coefficient vector $C_i$. The hash h( ) may be performed on the encrypted and/or decrypted $C_i$ values depending on whether the corresponding transmitter/encoder performed the hash h( ) on the encrypted and/or unencrypted $C_i$ values. The coefficient vectors $c_1$ and coded vectors $C_i$ are processed via Gaussian elimination to recover the original data $O_1, \ldots, O_N$. Decryption of the original data $O_1, \ldots, O_N$ can be performed, if necessary.

Figure 6A:
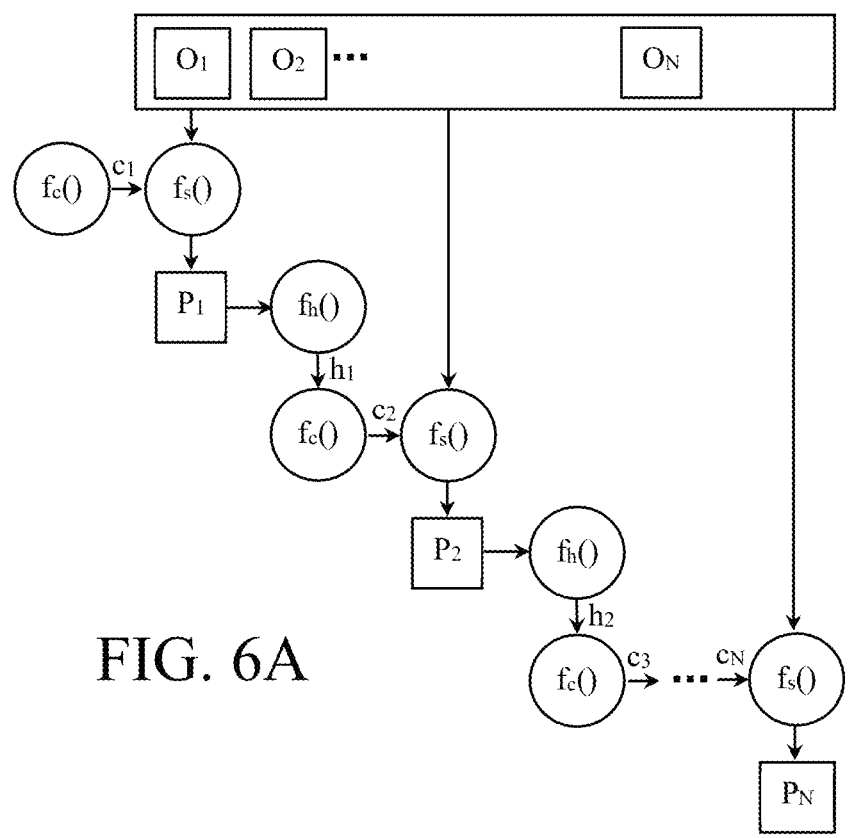
FIG. 6A illustrates a network coding aspect of the disclosure.

FIG. 6A illustrates a network coding aspect of the disclosure. In some aspects, constraints, such as an AONT, may have been provided to the original data $O_1, \ldots, O_N$ before the network coding. In some aspects, constraints, such as an AONT, may be provided to coded data $P_1, \ldots, P_N$ following the network coding.

Original data O can be partitioned into one or more blocks of original data, and each block of original data can be partitioned a number N of original data sets, $O_1, \ldots, O_N$. A process for generating M coded data sets $P_1, \ldots, P_M$ is described, wherein M can be less than N, equal to N, or greater than N. In this example, M=N.

In the following description, $f_h( )$ represents a cryptographic hash function (also referred to as "h( )"), which produces a hash value $h_i$; $f_c( )$ represents a coefficient computation function, which produces a coefficient vector $c_1$ having length N; and $f_s( )$ represents a coding function that produces an inner product of an input coefficient vector $c_1$ with the original data, $O_1, \ldots, O_N$. For example, a first coefficient vector $c_1$ is produced by $f_c( )$ operating on some information that is not shown, but might be a coded data set (e.g., an $M^{th}$ coded data set $P_M$) from a previously generated block of M coded data sets corresponding to a previous block of N of original data. The coded data set $P_N$ might be input to a hash function and coefficient computation function to produce a first coefficient vector that can be used to generate a first coded data set in a next block of coded data corresponding to a next block of original data $O_1, \ldots, O_N$.

Each $i^{th}$ coding function $f_s( )$ computes an inner product of an $i^{th}$ input length-N coefficient vector $c_i$ with the N original data sets $O_1, \ldots, O_N$ to produce an $i^{th}$ coded data set $P_i$. Each $i^{th}$ hash function $f_h( )$ computes the hash value $h_i$ for each $P_i$ (for at least $P_1$ to $P_{N-1}$). Each $(i+1)^{th}$ coefficient computation function $f_c( )$ computes the $(i+1)^{th}$ coefficient vector $c_{i+1}$ from each hash value $h_i$, at least for $i=1, \ldots, N-1$.

The coefficients corresponding to coded data set $P_i$ are generated from the hash value $h_{i-1}$ corresponding to the previous coded data set $P_{i-1}$. In the corresponding receiver (e.g., FIG. 6B), a hash $f_h( )$ is performed on $P_i$ to produce $h_i$, from which the coefficient vector $c_{i+1}$ corresponding to $P_{i+1}$ is computed using the coefficient computation function $f_c( )$.

Figure 6B:
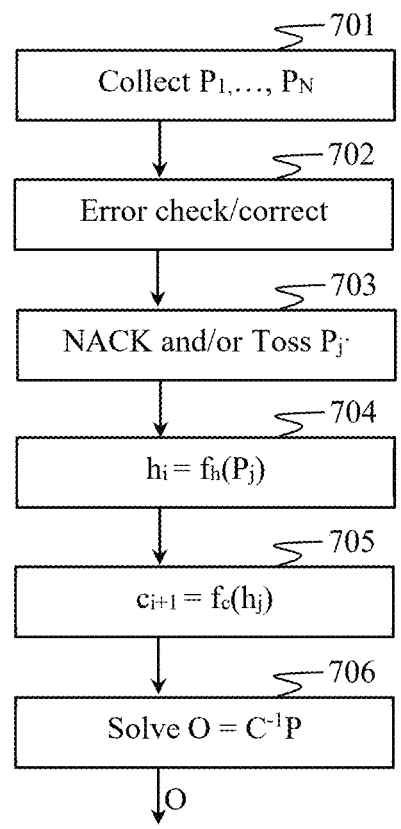
FIG. 6B illustrates a decoding method according to some aspects of the disclosure.

FIG. 6B illustrates a decoding method according to some aspects of the disclosure. Coded data sets $P_1, \ldots, P_N$ are received and collected 701, and may be grouped into blocks of N sets. An error detection and optionally, error correction, may be performed 702. Any coded data sets that fail the error check/current (702) may be discarded 703. This may comprise responding with a NACK or request for retransmission to the transmitter. If a coded data set $P_{j'}$ is found to be corrupted and is not replaced, then it can be discarded. The receiver may send an ACK when it receives a sufficient number of the coded data sets to perform decoding (e.g., 706). A hash function is performed 704 on relevant received coded data sets. For example, if $P_{j'}$ is discarded, then the hash operation for $P_{j'-1}$ can be skipped. Furthermore, while $P_{j'+1}$ cannot be included in the decoding process because its coefficients $c_{j'+1}$ are not known, the hash of $P_{j'+1}$ can be used to compute the coefficients $c_{j'+2}$ for $P_{j'+2}$. In step 705, the coefficient computation function $f_c( )$ is computed for each hash value $h_i$. The coefficients $c_1$ and the relevant coded data sets $P_1, \ldots, P_N$ are processed 706 (such as via a Gaussian elimination process) to recover the original data data sets $O_1, \ldots, O_N$.

Figure 7A:
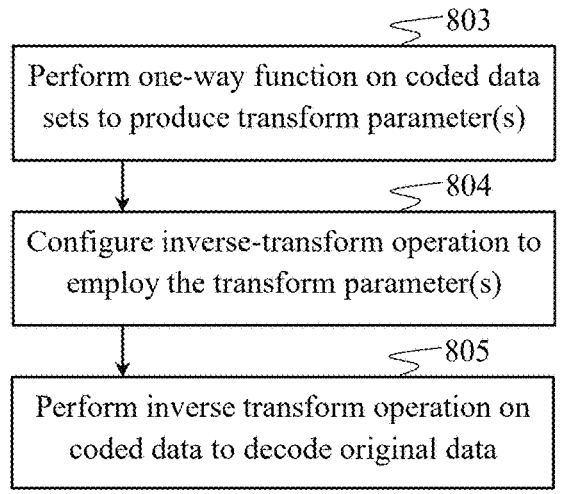
FIG. 7A-7D illustrate decoding methods according to some aspects of the disclosure.

FIG. 7A illustrates a decoding method, wherein once coded data sets are collected, a one-way function (which can be the same a one-way function employed in the corresponding coding method) can be performed 803 on the coded data sets to compute one or more transform parameters. An inverse transform operation can be configured 804 to employ the one or more transform parameters. The inverse transform operation can be an inverse to the transform operation employed in the corresponding coding method. The inverse transform can be performed 805 on the coded data sets to decode original data therefrom.

Figure 7B:
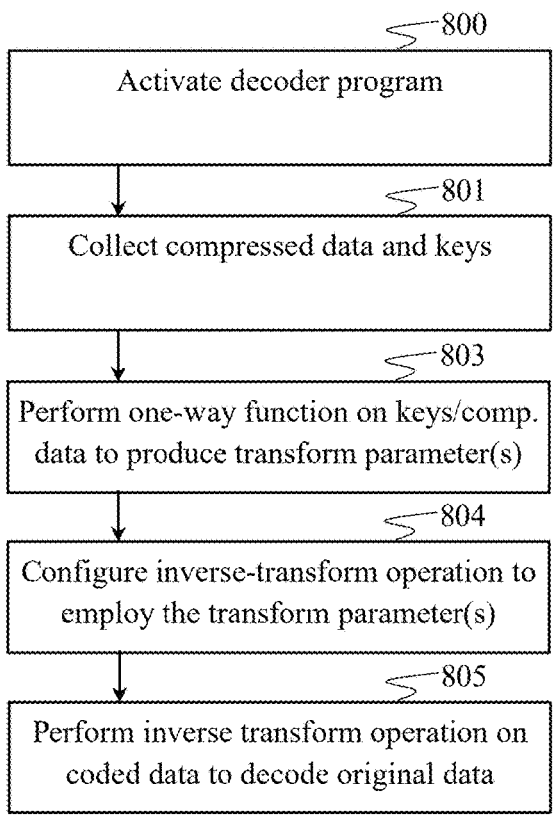

In FIG. 7B, a decoder program that performs decoding is activated 800. For example, the decoder program can comprise at least one smart contract on a blockchain. The program collects 801 coded data residing on the blockchain and one or more corresponding keys. Steps 803-805 are performed.

Figure 7C:
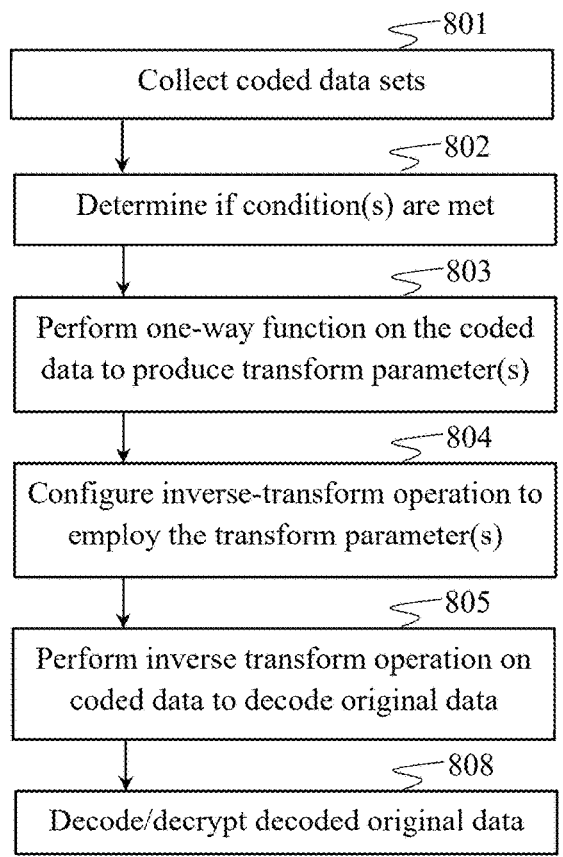

In FIG. 7C, coded data sets are collected 801, and at least one condition corresponding to the coded data and/or the party or parties from which the coded data is collected is determined 802. The condition may be a checksum, a key authentication, a user authentication, or a combination thereof. After steps 803-805 are performed, the original data may be decrypted 808, if necessary.

Figure 7D:
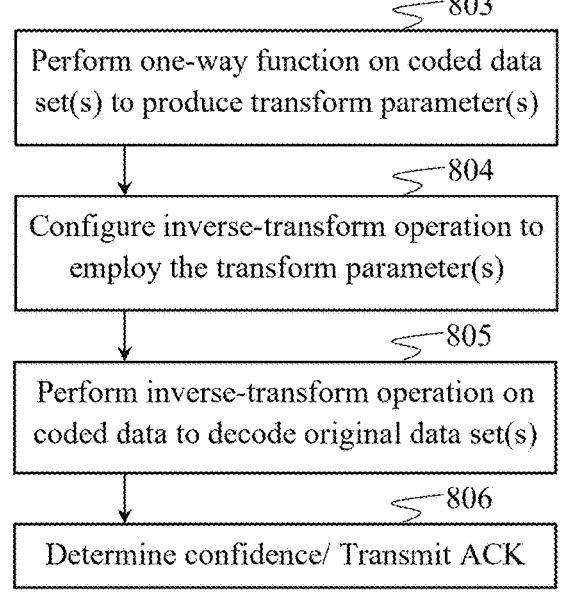

In FIG. 7D, after steps 803-805 are performed, a confidence measure that indicates the authenticity of the original data is determined 806. Some type of acknowledgement or other message pertaining to the confidence measure may be transmitted.

The following pseudo-code illustrates coding and decoding that can be performed according to some disclosed aspects.

Coding Algorithm
Processing by Off-Blockchain Program:
　　Choose N % Group length: N. compression ratio is 1:N
　　% Divide a block of original data into N data sets.
　　Original data sets: $O=O(1), \ldots, O(N)$
　　% Compute length-N (e.g., NX1) code vector from Hash of function of Original data or some other data structure:
　　$c_1=f_h(f[O(1), \ldots, O(N)])$; % The functions $f_h( )$ may include a secret key, indices, other data, etc.
　　$C_1=c_1^T O$; % 1st coded packet formed from linear combination of $O(1), \ldots, O(N)$ using $c_0$
　　$c_2=f_h(C_1,1)$; % length-N code vector formed from hash of $C_1$
　　$C_2=c_2^T O$; % 2nd coded packet
　　...
　　$C_N=f_h(C_{N-1},(N-1))$; % length-N code vector formed from hash of $C_{N-1}$
　　$C_N=c_N^T O$; % Nth coded packet
　　% Send $C_1$ and some or all of the hashes of the $C_i$'s (and their index values) to the smart contract on the blockchain.
　　Deliver $O, C_2, \ldots, C_N$ to the keyholder
Processing by Smart Contract:
　　% Receive and store $C_1$, some or all of the c's
Decoding Algorithm
Processing by Smart Contract:
　　Input: $C_2, \ldots, C_N$ % in function call to contract from petitioner
　　$h_2, \ldots, h_N=f_h(C_2, \ldots, C_N)$; % perform hash function on each $C_i$
　　Compare computed hashes $h_2, \ldots, h_n$ to stored hashes Y?N
　　Y) Smart contract proceeds with decoding
　　N) Smart contract terminates unsuccessfully
　　% Decoding operation possibly performed off-chain, at least in part
　　1) Each coefficient vector $c_1$ is computed from the hash of the preceding coded data set $C_{i-1}$
　　2) Solve N linear equations for N unknowns to recover Original data: $O=O(1), \ldots, O(N)$.

Data and instructions used to execute transactions according to the rules of the smart contract may be included in blocks of the blockchain. Since smart contracts contain scripts, programming language may be included in the smart contract functionalities. The scripts comprising the programming language may then be used to encode arbitrary state transition functions and allow developers to create advanced applications in a decentralized computing platform.

Additionally, Decentralized Applications (DApps) may be added to the blockchain network by including chunks of code into smart contracts of the blockchain. These DApps may include payment applications, peer-to-peer gambling applications, financial trading applications, insurance applications, or any other software program. The DApps may also include blockchain applications for maintenance and access to patient records, medical records, and other records and/or transactions which may be interacted with using the blockchain DApp platform. Typically, the operations of the DApps may be stored within the blockchain.

Smart contracts effectively lie dormant until a transaction triggers execution, either directly or indirectly as part of a chain of contract calls. Smart contracts only run if they are called by a transaction. Smart contracts in Ethereum are executed, ultimately, because of a transaction initiated from an externally owned account (EOA). A contract can call another contract that can call another contract, and so on, but the first contract in such a chain of execution will always have been called by a transaction from an EOA. During the execution of its code, a contract may: send ETH, alter its storage values, create temporary storage (memory) that dies at the end of the function, call any of its own functions, call any public function of a different contract, create a new contract, and query information about the current transaction or the blockchain.

Smart contracts are a type of Ethereum account. This means they have a balance and they can send transactions over the network. However they're not controlled by a user, instead they are deployed to the network and run as programmed. User accounts can then interact with a smart contract by submitting transactions that execute a function defined on the smart contract. Smart contracts can define rules, like a regular contract, and automatically enforce them via the code.

Transactions execute in their entirety, with any changes in the global state (contracts, accounts, etc.) recorded only if all execution terminates successfully. Successful termination means that the program reached the end of execution. If execution fails, all of its effects (changes in state) are "rolled back" as if the transaction never ran. A failed transaction is still recorded as having been attempted, and the ether spent on gas for the execution is deducted from the originating account, but it otherwise has no other effects on contract or account state.

The term "hash function" used herein can be a cryptographic hash function. A cryptographic hash function is a mathematical algorithm that maps data of arbitrary size (often called the "message") to a bit array of a fixed size (the "hash value", "hash", or "message digest"). It is a one-way function, that is, a function which is practically infeasible to invert. Ideally, the only way to find a message that produces a given hash is to attempt a brute-force search of possible inputs to see if they produce a match, or use a rainbow table of matched hashes.

The ideal cryptographic hash function has the following main properties:
　　it is deterministic, meaning that the same message always results in the same hash
　　it is quick to compute the hash value for any given message.
　　it is infeasible to generate a message that yields a given hash value (i.e. to reverse the process that generated the given hash value).
　　it is infeasible to find two different messages with the same hash value
　　a small change to a message should change the hash value so extensively that a new hash value appears uncorrelated with the old hash value (avalanche effect).

Most cryptographic hash functions are designed to take a string of any length as input and produce a fixed-length hash value.

A cryptographic hash function must be able to withstand all known types of cryptanalytic attack. In theoretical cryptography, the security level of a cryptographic hash function has been defined using the following properties:

Pre-image resistance
 Given a hash value h, it should be difficult to find any message m such that h=hash(m). This concept is related to that of a one-way function. Functions that lack this property are vulnerable to preimage attacks.

Second pre-image resistance
 Given an input $m_1$, it should be difficult to find a different input $m_2$ such that hash($m_1$)=hash($m_2$). This property is sometimes referred to as weak collision resistance. Functions that lack this property are vulnerable to second-preimage attacks.

Collision resistance
 It should be difficult to find two different messages $m_1$ and $m_2$ such that hash($m_1$)=hash($m_2$). Such a pair is called a cryptographic hash collision. This property is sometimes referred to as strong collision resistance. It requires a hash value at least twice as long as that required for pre-image resistance; otherwise collisions may be found by a birthday attack.

Collision resistance implies second pre-image resistance but does not imply pre-image resistance.

In some aspects, a hash may be a HMAC. In cryptography, an HMAC (sometimes expanded as either keyed-hash message authentication code or hash-based message authentication code) is a specific type of message authentication code (MAC) involving a cryptographic hash function and a secret cryptographic key.

Any cryptographic hash function, such as SHA-2 or SHA-3, may be used in the calculation of an HMAC; the resulting MAC algorithm is termed HMAC-X, where X is the hash function used (e.g. HMAC-SHA256 or HMAC-SHA3-256). The cryptographic strength of the HMAC depends upon the cryptographic strength of the underlying hash function, the size of its hash output, and the size and quality of the key.

HMAC uses two passes of hash computation. The secret key is first used to derive two keys-inner and outer. The first pass of the algorithm produces an internal hash derived from the message and the inner key. The second pass produces the final HMAC code derived from the inner hash result and the outer key. Thus the algorithm provides better immunity against length extension attacks.

An iterative hash function breaks up a message into blocks of a fixed size and iterates over them with a compression function. For example, SHA-256 operates on 512-bit blocks. The size of the output of HMAC is the same as that of the underlying hash function (e.g., 256 and 512 bits in the case of SHA-256 and SHA-512, respectively), although it can be truncated if desired. Parties with the secret key will hash the message (e.g., a received message) and compare the computed hash with the previously computed message, and if it is authentic, the received and computed hashes will match.

No known extension attacks have been found against the current HMAC specification which is defined as H(key||H(key||message)) because the outer application of the hash function masks the intermediate result of the internal hash.

Keccak doesn't need a nested approach and can be used to generate a MAC by simply prepending the key to the message, as it is not susceptible to length-extension attacks.

In some aspects, a Keccak hash may be used. Keccak is a family of sponge functions that has been standardized in the form of SHAKE128 and SHAKE256 extendable output functions and of SHA3-224 to SHA3-512 hash functions in FIPS 202, as well as cSHAKE128, cSHAKE256 and other functions in NIST SP 800-185.

Keccak is a versatile cryptographic function. Best known as a hash function, it nevertheless can also be used for authentication, (authenticated) encryption and pseudo-random number generation. Its structure is the extremely simple sponge construction and internally it uses the innovative KECCAK-f cryptographic permutation. Other schemes derived from KECCAK the schemes KETJE, KEYAK, KRAVATTE, and KANGAROOTWELVE, In some aspects, one-way functions may be implemented that behave (at least approximately) as random oracles. Random oracles are typically used as an idealized replacement for cryptographic hash functions in schemes where strong randomness assumptions are needed of the hash function's output. Such a proof often shows that a system or a protocol is secure by showing that an attacker must require impossible behavior from the oracle, or solve some mathematical problem believed hard (i.e., NP hard) in order to break it.

In general, if a protocol is proven secure, attacks to that protocol must either be outside what was proven, or break one of the assumptions in the proof; for instance if the proof relies on the hardness of integer factorization, to break this assumption one must discover a fast integer factorization algorithm. Instead, to break the random oracle assumption, one must discover some unknown and undesirable property of the actual hash function; for good hash functions where such properties are believed unlikely, the considered protocol can be considered secure.

In cryptography, a sponge function or sponge construction is any of a class of algorithms with finite internal state that take an input bit stream of any length and produce an output bit stream of any desired length. Sponge functions have both theoretical and practical uses. They can be used to model or implement many cryptographic primitives, including cryptographic hashes, message authentication codes, mask generation functions, stream ciphers, pseudo-random number generators, and authenticated encryption.

The sponge function operates as follows:
 State is initialized to zero
 The input string is padded. This means the input is transformed into blocks of |Bitrate) bits using Pad.
 for each |Bitrate|-bit Block of the padded input:
  Bitrate is replaced with Bitrate XOR Block (using bitwise XOR)
  State is replaced by f(State)
 This process "absorbs" (in the sponge metaphor) all blocks of the padded input string.
 The sponge function output is now ready to be produced ("squeezed out") as follows:
  the Bitrate portion of the state memory is output
  repeat until enough bits are output:
   State is replaced by f(State)
   the Bitrate portion of the state memory is output
  If less than |Bitrate| bits remain to be output, then Bitrate will be truncated (only part of Bitrate will be output).

Note that input bits are never XORed into the Capacity portion of the state memory, nor are any bits of Capacity ever output directly. The extent to which Capacity is altered by the input depends entirely on the transformation function f. In hash applications, resistance to collision or preimage attacks depends on Capacity, and its size (|Capacity|) is typically twice the desired resistance level.

It is also possible to absorb and squeeze in an alternating fashion. This operation is called the duplex construction or duplexing. It can be the basis of a single pass authenticated encryption system.

The following pseudo-code demonstrates possible ways to encode and decode data.

Transmit/Coding Method
1. Choose random number R0
2. Partition Original Data into N original blocks O(1), . . . ,O(N)
3. Calculate hash of each original block: h(1), . . . ,h(N)
4. Compute key K=R0⊕h(1)⊕h(2) . . . ⊕h(N) % alternative ways may be used to choose key. HMAC may be used.
5. Encrypt original blocks with key K to make encrypted blocks: C(i)=O(i)⊕E(K,i)
6. Compute hash of each encrypted block: h'(1), . . . ,h'(N)
7. Create block C(N+1)=K⊕h'(1)⊕h'(2) . . . ⊕h'(N)
8. Make linear network coded blocks (S(1), . . . ,S(N)) of encrypted blocks C(1)-C(N):

$$S(j) = \sum_{n=1}^{N} (h''(j-1))_n C(n)$$

Where j=1, . . . ,N; h"(j−1) is the hash computed from S(j−1), where S(0)=C(N+1).

Note that each block S (j) has size 1/N of the Original Data but is a linear combination of all the Original Data, so it has dimension reduction factor of 1/N.

9. Transmit or store at least one set of S on block chain, and (optionally) keep at least one set of S private.

Receive/Decoding Method
1. Collect all coded blocks S(0), . . . ,S(N)
2. Compute hashes h"(0), . . . ,h"(N−1)
3. Perform Gaussian elimination on S(1), . . . ,S(N) to recover blocks C(1)-C(N)
4. Compute hashes h'(1), . . . ,h'(N)
5. Compute key K=S(0)⊕h'(1)⊕h'(2) . . . ⊕h'(N). Note S(0)=C(N+1).
6. Decode C(1)-C(N) to recover original blocks: O(i)=C(i)⊕K
7. To verify O(i)'s: (If the optional transmit/coding steps 3 and 4 were used)
   a. Compute h(1), . . . ,h(N)
   b. Compute random number R0=K⊕h(1)⊕h(2) . . . ⊕h(N).
   c. Verify that the computed random number is the same as the chosen R0

Figure 8A:
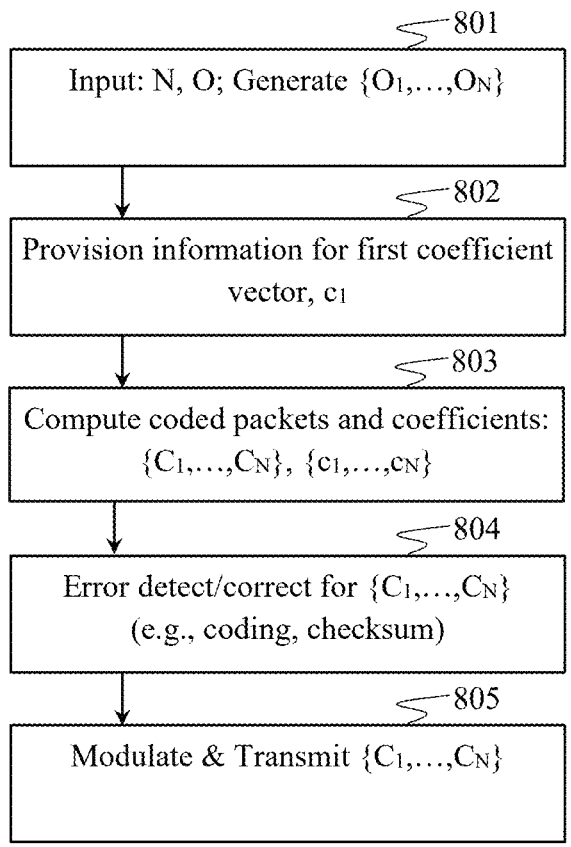
FIG. 8A illustrates functional elements of method and apparatus aspects configured for generating coded data for communication in a network. In one example, a UE or a TRP might transmit the coded data in a wireless communication network.

FIG. 8A illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

In at least one transmitting (e.g., source) node, an original data block (e.g., a vector) O is partitioned 801 into N parts to produce data vector $\{O_1, \ldots, O_N\}$. N may be input, predetermined, or determined from the data O, for example.

A first coefficient vector $c_1$ is provisioned, such as by provisioning 802 information from which the $c_1$ is created. The information can include a cryptographic hash of a coded data part corresponding to a previous (e.g., k−1) original data block (e.g., O(k−1)), a cryptographic hash of the current (k) original data (e.g., O(k)), a cryptographic hash of a previous (e.g., k−1) original data (e.g., O(k−1)), a key used to encrypt or randomize a previous (e.g., k−1) original data (e.g., O(k−1)), a public key corresponding to the transmitting node or receiving node, a private key corresponding to the transmitting node or receiving node, a public key or private key corresponding to previously transmitted data (O and/or C), information encrypted or signed using any of the aforementioned keys, and/or any combination thereof. The information may comprise other information not mentioned here.

Coded packets $\{C_1, \ldots, C_N\}$ and coefficients $\{c_1, \ldots, c_N\}$ are computed 803, wherein each coefficient vector $\{c_2, \ldots, c_N\}$ is computed from the cryptographic hash of at least one previously computed coded packet. For example, an $n^{th}$ hash value is $h_n = h(C_n)$; and an $(n+1)^{th}$ coefficient vector is computed as a function $f_c(\ )$ of $h_n$: $c_{n+1} = f_c(h_n)$. Each coded packet is computed from the dot product: $C_{n+1} = c_{n+1} \cdot O$.

Error detection/correction 804 is computed for the coded packets $\{C_1, \ldots, C_N\}$. For example, error detection coding (possibly providing for error correction) and/or a checksum may be provided with each coded packet or set of coded packets to be transmitted.

The coded packets $\{C_1, \ldots, C_N\}$ are modulated and transmitted 805. Modulation might comprise data modulation (e.g., mapping bits to symbols), baseband modulation (e.g., modulating the symbols onto subcarriers and/or spreading codes) to produce a discrete-time baseband signal, and carrier-frequency (e.g., RF) modulation (e.g., modulating the discrete-time baseband signal onto a carrier frequency, which may comprise digital-to-analog conversion and frequency up-conversion). Transmission can comprise sending the coded packets to a destination, such as directly via one or more network paths, via one or more networks, and/or via one or more intermediate nodes; or indirectly via a file-sharing network, Cloud storage, fog storage, and the like.

Figure 8B:
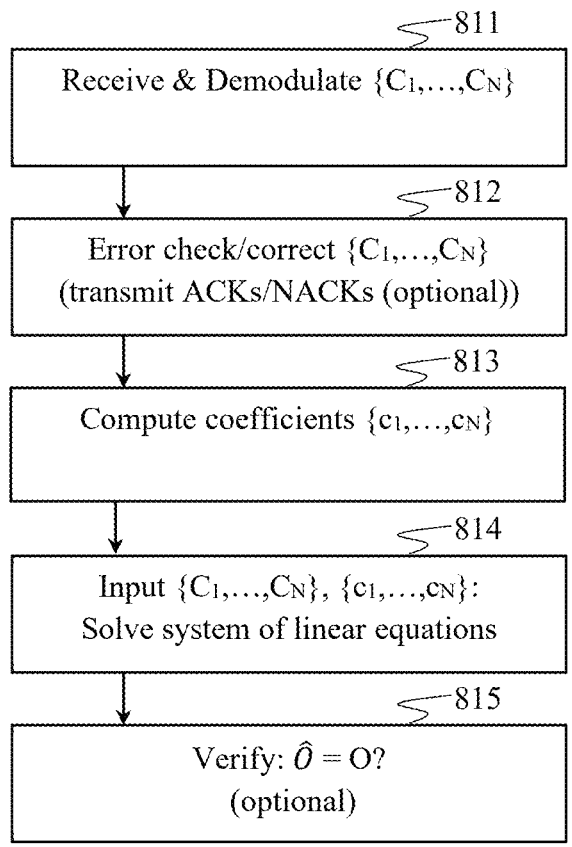
FIG. 8B illustrates functional elements of method and apparatus aspects configured for receiving and decoding coded transmissions in a communication network. In one example, a UE or a TRP might receive the coded data in a wireless communication network.

FIG. 8B illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

At least one receiver node receives and demodulates 811 coded packets $\{C_1, \ldots, C_N\}$. Demodulation can comprise the reverse or inverse of modulation described herein. Error checking (and possibly error correction) is performed 812 on the coded packets $\{C_1, \ldots, C_N\}$. The at least one receiver node might send an ACK to the transmitter (and/or intermediate and/or storage nodes) if errors are not detected, and if detected errors can be corrected. An ACK might be sent upon the receiver collecting a sufficient number of error-free coded packets to permit decoding. The at least one receiver node might send a NACK to the transmitter (and/or intermediate and/or storage nodes) if errors are detected and cannot be corrected. A NACK might be sent to the transmitter (and/or intermediate and/or storage nodes) if a sufficient number of error-free coded packets are not received to permit decoding. In response to a NACK, the transmitter(s) might perform steps 803-805 to provision at least one more coded packet and/or may transmit one or more previously generated coded packets.

The coefficients $\{c_2, \ldots, c_N\}$ are computed 813 from cryptographic hashes performed on the coded packets $\{C_1, \ldots, C_N\}$. The first coefficient vector $c_1$ might be computed using the information provisioned in 802. For example, the information might be acquired from the hash of a coded packet corresponding to a previous (e.g., k−1) original data block (e.g., O(k−1)), from information encoded in a $C_{N+1}$ packet disclosed herein, from other previously transmitted information received by the receiver node(s), from publicly available information, and/or some other information source.

When a sufficient number of the coded packets $\{C_1, \ldots, C_N\}$ are collected, the system of linear equations provided by $\{C_1, \ldots, C_N\}$ and $\{c_1, \ldots, c_N\}$ is solved 814, such as via Gaussian Elimination or some other suitable process. The resulting (estimated) original data, Ô, might optionally be compared with the original data O directly, or via some information (e.g., a key) derived from the original data O.

Figure 8C:
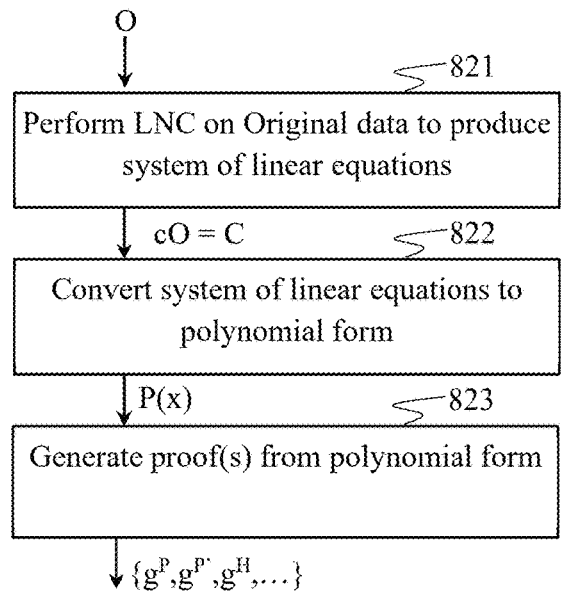
FIG. 8C illustrates method and apparatus aspects configured for generating a cryptographic proof.

FIG. 8C illustrates method and apparatus expects for generating a cryptographic proof. By way of example, but without limitation, one or more of the functional elements might be components of hardware, firmware, and/or software; or might represent configuring hardware, firmware, and/or software to perform one or more disclosed functions associated with one or more of the functional elements. Original data O, such as any type of content (e.g., data, or message), is operated upon by a linear network coding (LNC) operation 821 to produce a system of linear equations, cO=C. This can involve chaining the coefficient vectors by creating at least some of the coefficient vectors (e.g., $c_{n+1}$) as a function of a one-way function (e.g., cryptographic hash) operating on a previous coded packet $C_n$. The system of linear equations, cO=C, is converted 822 to a polynomial form (illustrated here as P(x)). A cryptographic proof is generated 823 from the polynomial form (e.g., P(x)). Aspects of each of these features are disclosed throughout the written description.

Figure 8D:
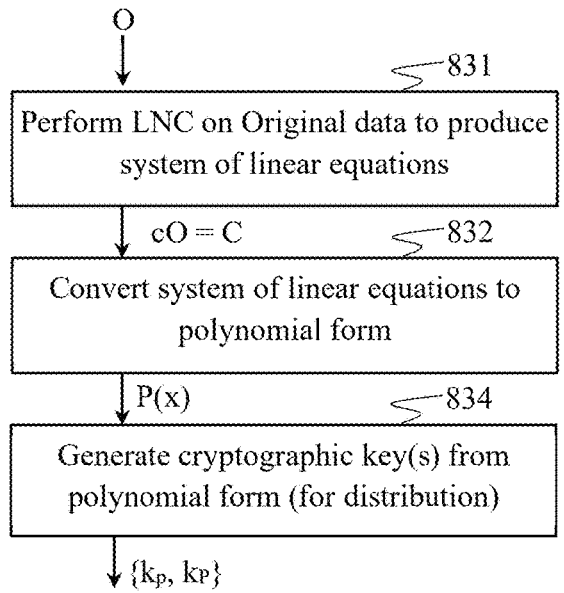
FIG. 8D illustrates method and apparatus aspects configured for generating cryptographic keys.

In FIG. 8D, cryptographic key(s) is (are) generated 834 from the polynomial form. By way of example, but without limitation, one or more of the functional elements might be components of hardware, firmware, and/or software; or might represent configuring hardware, firmware, and/or software to perform one or more disclosed functions associated with one or more of the functional elements.

In one example, a public/private key pair might be produced. The key(s) might be used to encrypt (and decrypt) the coded data C. In one instance, one of the keys (such as the private key of a key pair) may be encrypted in the $C_{N+1}$ packet. In another instance, a key (e.g., the public key of a key pair) might encrypt the $C_{N+1}$ packet. At least one of the keys might be distributed. For example, a private key may be sent to a recipient of the message, encrypted with the recipient's public key or with a public key corresponding to a previously sent message, for example.

In blockchain applications, an off-chain server(s) can provide for method and/or apparatus implementations of linear network coding and/or decoding of the original data. A system of linear equations that represents linear network coded original data vector O is expressed as:

$$C = cO$$

where c is an MXN coefficient matrix, O is the NX1 original data vector, and C is the MX1 coded data vector (typically, M≥N) can be interpreted as an equation over polynomials. Provisioning the polynomials from LNC data structures can be implemented via a proof generator and/or key manager. In some aspects, a private key might be provisioned that comprises polynomial coefficients corresponding to (e.g., equal to or some function of) the linear network coding coefficients in the coefficient matrix c.

$$\begin{bmatrix} C_0 \\ C_1 \\ \vdots \\ C_{M-1} \end{bmatrix} = \begin{bmatrix} c_{0,0} & c_{0,1} & \cdots & c_{0,N-1} \\ c_{1,0} & c_{1,1} & \cdots & c_{1,N-1} \\ \vdots & \vdots & \ddots & \vdots \\ c_{M-1,0} & c_{M-1,1} & \cdots & c_{M-1,N-1} \end{bmatrix} \begin{bmatrix} O_0 \\ O_1 \\ \vdots \\ O_{N-1} \end{bmatrix}$$

For the generalization $x_n = O_n$, n=0, ..., N−1, in the system of linear equations, polynomials $p_n(x)$ of degree <M can be provisioned. For example, $p_0(x)$ is the degree <M polynomial that evaluates to $(c_{0,0}, c_{1,0}, \ldots, c_{M-1,0})$ at the coordinates (0, 1, ..., M−1); $p_1(x)$ is the degree <M polynomial that evaluates to $(c_{0,1}, c_{1,1}, \ldots, c_{M-1,1})$ at the coordinates (0, 1, ..., M−1); ... $p_{N-1}(x)$ is the degree <M polynomial that evaluates to $(c_{0,N-1}, c_{1,N-1}, \ldots, c_{M-1,N-1})$ at the coordinates (0, 1, ..., M−1). q(x) is the degree <M polynomial that evaluates to $(C_0, C_1, \ldots, C_{M-1})$ at the coordinates (0, 1, ..., M−1).

Thus, polynomial $p_0(x)$ expresses the set of (x,y) coordinates $((0, c_{0,0}), (1, c_{1,0}), \ldots, (M-1, c_{M-1,0}))$; polynomial $p_1(x)$ expresses the set of (x,y) coordinates $((0, c_{0,1}), (1, c_{1,1}), \ldots, (M-1, c_{M-1,1}))$; ...; polynomial $p_{N-1}(x)$ expresses the set of (x,y) coordinates $((0, c_{0,N-1}), (1, c_{1,N-1}), \ldots, (M-1, c_{M-1,N-1}))$. Polynomial q(x) expresses the set of (x,y) coordinates $((0, C_0), (1, C_1), \ldots, (M-1, C_{M-1}))$.

In some instances, different ones (or sets) of the aforementioned polynomials may be stored on different nodes (e.g., on-chain; and/or off-chain, such as on one or more server nodes, clients, and/or storage network). Each one (or set) of these polynomials may be provided with a corresponding commitment. Proofs may be employed. In one example, the aforementioned polynomials corresponding to original data O may be verified via an interactive or non-interactive proof by a Verifier prior to gathering corresponding data from each node, and decoding the original data. An on-chain smart contract might be programmed to act as the verifier.

Lagrange Interpolation (or some more computationally efficient algorithm) might convert each set of (x,y) coordinates to its corresponding polynomial $p_n(x)$, n=0, ..., N−1. Other examples include Newton polynomial, Neville's algorithm, or a fast Fourier transform method. Such methods find a polynomial of degree at most d which passes through a set of d+1 points such that for each point $\{x_i, y_i\}_{i \in (d+1)}$, the polynomial evaluated at $x_i$ is equal to $y_i$. This can produce the polynomial equation $$p_0(x)x_0 + p_1(x)x_1 + \ldots + p_{N-1}(x)x_{N-1} = q(x)$$

or variants thereof. In one example, the following polynomial equation can be produced:

$$p_0(x)x_0 + p_1(x)x_1 + \ldots + p_{N-1}(x)x_{N-1} - q(x) = 0$$

In another example, a form of the following polynomial equation can be produced:

$$p_0(x)x_0 + p_1(x)x_1 + \ldots + p_{N-1}(x)x_{N-1} - q(x) = Z(x)H(x)$$

where $Z(x) = (x-0)(x-1) \ldots (x-(M-1))$ is the target polynomial, which has cofactors (x−x(m)), m=0, ..., (M−1). This example can also be expressed as:

$$P(x) = Z(x)H(x)$$

P(x) has all the roots of Z(x). This fact may be the subject of a proof. There is some polynomial H(x) that may be found via division H(x)=P(x)/Z(x).

In another example, $p_0(x)x_0+p_1(x)x_1+\ldots+p_{N-1}(x)x_{N-1}$ is provisioned as $L(x)R(x)$, and the following form of polynomial equation can be produced:

$$L(x)R(x)=Z(x)H(x)+q(x)$$

In another example, $p_0(x)x_0+p_1(x)x_1+\ldots+p_{N-1}(x)x_{N-1}$ is provisioned as $L(x)+R(x)$, and the following form of polynomial equation can be produced:

$$L(x)+R(x)=Z(x)H(x)+q(x)$$

A polynomial evaluation proof may be based on a commitment C' relative to a set of points, $\{G_0, G_1, \ldots, G_{N-1}\}$, wherein C' might be constructed from a linear combination of the coefficients, (e.g., $c_{m,n}$). This may be implemented with a Pedersen commitment scheme, for example. Any of the disclosed aspects may employ bulletproofs, Kate commitments, and/or FRI. Proofs can be made non-interactive, such as by using the Fiat-Shamir heuristic. Other proofs may be provisioned.

The above examples can produce a degree <M polynomial P(x). However, alternative examples may provide for bivariate polynomials. In one example, a polynomial P(x,y) can be generated such that $P(x,y)=P(x,x^a)=P(x)$. This might be done by, for each $k^{th}$-degree term in P(x), where k=(mN+n) corresponding to a particular $c_{m,n}$ (m=0, . . . ,M−1; n=0, . . . , N−1), $x^k=x^{k\ \%\ N}y^{floor(k/N)}$, where $y=x^a=x^N$. A prover may make a commitment (e.g., a Merkle tree or some other commitment) to the evaluation of P(x,y) over the entire resulting M×N matrix. Verification may involve randomly selecting rows and/or columns of the M×N matrix via some source of pseudo-randomness, and the prover provides the corresponding data points and Merkle branches.

A polynomial commitment can be a small object that represents a polynomial, and can enable an evaluator or verifier to verify evaluations of that polynomial without requiring all of the data in the polynomial. A commitment can be implemented by making a Merkle tree of an evaluation, or some other evaluation based on cryptographic hashes may be made, for example, such as any of the techniques disclosed herein. If a prover provides a commitment C' representing P(x), then a proof can verify that the value of p(z) corresponds to a particular value of z. A proof may comprise Merkle branches to verify data with respect to a commitment. Such a proof may be interactive or non-interactive. To perform a zk-SNARK, the above problem can be converted to a quadratic arithmetic program (QAP). The zk-SNARK can then operate on the problem in QAP form. Along with the process for converting code of a function into a QAP, another process can be run alongside that provides an input to the problem and produces a corresponding solution (sometimes called "witness" to the QAP). Then a "zero knowledge proof" can be created for the witness, and a separate process may be performed for verifying a proof that the verifier receives from an external source.

The mathematics described herein can be advantageously employed over a prime field. Some aspects may employ a Galois field. In the following examples, "g" is a generator of a finite field group. A key holder (i.e., prover) may wish to prove knowledge of polynomial P, which connotes knowledge of the linear network coded coefficients (i.e., matrix c). A proof might comprise receiving encrypted powers of a secret value s $(E(s^i)=g^{s^i})$ and using those encrypted powers (e.g., $g^1, g^s, g^{s^2}, g^{s^3} \ldots$) to calculate $g^P$ and $g^H$. A knowledge of exponent assumption (KEA) may be implemented whereby the encrypted powers comprise shifted versions (e.g., $\alpha s^i$) of the encrypted powers. The prover might apply some random coefficient $\delta$ to the encrypted powers (e.g., $(g^P)^\delta, (g^{P'})^\delta, (g^H)^\delta$) before computing $g^P$, $g^{P'}$, and $g^H$ values. The verifier checks if P=ZH in encrypted space: e.g., $(g^P)^\delta=((g^H)^\delta)^{Z(s)}$ and $((g^P)^\delta)^\alpha=(g^{P'})^\delta$.

The shifts, $\alpha$, and all necessary powers of s with corresponding α-shifts can be encrypted ($g^\alpha$, $g^{s^i}$, $g^{\alpha s^i}$ for i in 0, 1, . . . , d) via a common reference string, or CRS, or composite CRS method; and may further include encrypted evaluation of the target polynomial, $g^{Z(s)}$. The following keys can be produced:

Proving Key: $g^{s^i}$, $g^{\alpha s^i}$

Verifying key: $g^\alpha$, $g^{t(s)}$

In some aspects, an interactive protocol can be made into a non-interactive one by using a hash function to pick the challenge.

Figure 8E:
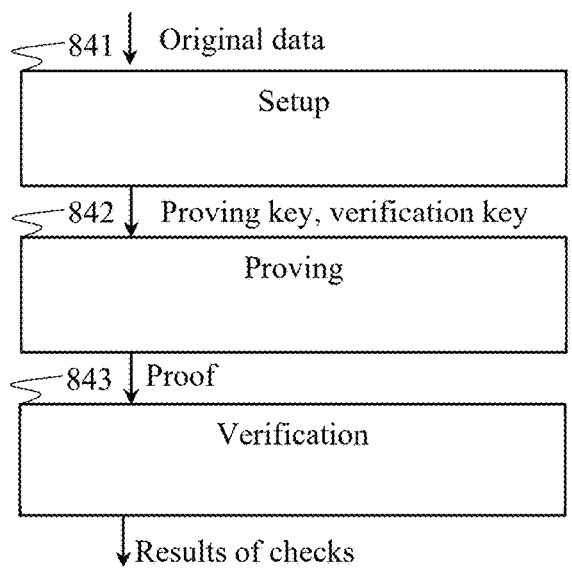
FIG. 8E illustrates method and apparatus aspects configured for provisioning a cryptographic proof.

FIG. 8E illustrates method and apparatus aspects of a proving protocol. By way of example, but without limitation, one or more of the functional elements might be components of hardware, firmware, and/or software; or might represent configuring hardware, firmware, and/or software to perform one or more disclosed functions associated with one or more of the functional elements.

A setup 841, proving 842, and verification 843 functional elements are shown. In the setup 841, a generator g and cryptographic pairing e are selected. Also, linear network coding is performed on original data O to produce a system of linear equations (which can be a function of the form f(u)=y with n total variables, of which m are input/output variables) converted into polynomial form, $(\{l_i(x), r_i(x), o_i(x)\}_{i \in \{0,\ldots,n\}}, t(x))$ of degree d and size n+1, where here, n corresponds to a total number of variables in the function that is converted to polynomial form. Random samples, s, $\rho_l$, $\rho_r$, $\alpha_l$, $\alpha_r$, $\alpha_o$, $\beta$, $\gamma$ can be generated. Next, compute $\rho_o=\rho_l\rho_r$ and the operand generators, $g_l=g^{\rho_l}$, $g_r=g^{\rho_r}$, $g_o=g^{\rho_o}$. Then the proving key is set as follows:

$$\left(\left\{g^{s^k}\right\}_{k\in[d]}, g_l^{l_i(s)}, g_r^{r_i(s)}, g_o^{o_i(s)}\right\}_{i\in\{0,\ldots,n\}},$$

$$\left\{g_l^{\alpha_l l_i(s)}, g_r^{\alpha_r r_i(s)}, g_o^{\alpha_o o_i(s)}, g_l^{\beta_l l_i(s)}, g_r^{\beta_r r_i(s)}, g_o^{\beta_o o_i(s)}\right\}_{i\in\{m+1,\ldots,n\}}\right)$$

Optionally, for a zero-knowledge proof, the following proving key is set in addition to the proving key shown above:

$$g_l^{t(s)}, g_r^{t(s)}, g_o^{t(s)}, g_l^{\alpha_l(s)}, g_r^{\alpha_r(s)}, g_o^{\alpha_o(s)}, g_l^{\beta_l t(s)}, g_r^{\beta_l t(s)}, g_o^{\beta_l t(s)}$$

The verification key can be set as follows:

$$g^l, g_o^{t(s)}, \{G_l^{l_i(s)}, g_r^{r_i(s)}, g_o^{o_i(s)}\}_{i\in\{0,\ldots,n\}}, g^{\alpha_l}, g^{\alpha_r}, g^{\alpha_o}, g^\gamma, g^{\beta\gamma}$$

Proving 842 can comprise the following. For input u, compute f(u) to obtain values $\{v_i\}_{i\in\{m+1,\ldots,n\}}$ for all intermediary variables. All the values are then assigned to unencrypted variable polynomials $$L(x) = l_o(x) + \sum_{i=1}^n v_i \cdot l_i(x),$$

and similarly for R(x), O(x). Determine h(x) from:

$$h(x) = \frac{L(x)R(x) - O(x)}{t(x)}$$

assign the prover's variable values to the encrypted variable polynomials:

$$g_l^{L_p(s)} = \prod_{i=m+1}^{n} \left(g_l^{l_i(s)}\right)^{v_i}$$

and similarly for $$g_r^{R_p(s)} \text{ and } g_o^{O_p(s)};$$

assign α-shifted pairs:

$$g_l^{L'_p(s)} = \prod_{i=m+1}^{n} \left(g_l^{\alpha_l l_i(s)}\right)^{v_i}$$

and similarly for $$g_r^{R'_p(s)} \text{ and } g_o^{O'_p(s)};$$

assign the variable values consistency polynomials:

$$g^{Z(s)} = \prod_{i=m+1}^{n} \left(g_l^{\beta l_i(s)} g_r^{\beta r_i(s)} g_o^{\beta o_i(s)}\right)^{v_i}$$

and compute the proof:

$$G = \left(g_l^{L_p(s)}, g_r^{R_p(s)}, g_o^{O_p(s)}, g^{h(s)}, g_l^{L'_p(s)}, g_r^{R'_p(s)}, g_o^{O'_p(s)}, g^{Z(s)}\right)$$

In the case of a zero-knowledge proof, proving 612 is adapted as follows. Random sample values $\delta_l$, $\delta_r$, $\delta_o$ are produced, and h(x) is computed from:

$$h(x) = \frac{L(x)R(x) - O(x)}{t(x)} + \delta_r L(x) + \delta_l R(x) + \delta_l \delta_r t(x) - \delta_o$$

The zero-knowledge δ-shift is applied as follows:

$$g_l^{L_p(s)} = \left(g_l^{t(s)}\right)^{\delta_l} \prod_{i=m+1}^{n} \left(g_l^{l_i(s)}\right)^{v_i}$$

and similarly for $$g_r^{R_p(s)} \text{ and } g_o^{O_p(s)};$$

$$g_l^{L'_p(s)} = \left(g_l^{\alpha_l t(s)}\right)^{\delta_l} \prod_{i=m+1}^{n} \left(g_l^{\alpha_l l_i(s)}\right)^{v_i}$$

and similarly for $$g_r^{R'_p(s)} \text{ and } g_o^{O'_p(s)};$$

and $$g^{Z(s)} = \left(g_l^{\beta t(s)}\right)^{\delta_l} \left(g_r^{\beta t(s)}\right)^{\delta_r} \left(g_o^{\beta t(s)}\right)^{\delta_o} \prod_{i=m+1}^{n} \left(g_l^{\beta l_i(s)} g_r^{\beta r_i(s)} g_o^{\beta o_i(s)}\right)^{v_i}$$

Verification 843 might be performed as follows. A provided proof is parsed as $$\left(g_l^{L_p}, g_r^{R_p}, g_o^{O_p}, g^h, g_l^{L'_p}, g_r^{R'_p}, g_o^{O'_p}, g^Z\right)$$

The next step assigns input/output values to the verifier's encrypted polynomials and add to 1:

$$g_l^{L_v(s)} = g_l^{i_0(s)} \prod_{i=m+1}^{n} \left(g_l^{l_i(s)}\right)^{v_i}$$

and similarly for $$g_r^{R_p} \text{ and } g_o^{O_p(s)};$$

The next step provides for a variable polynomials restriction check:

$$e\left(g_l^{L_p}, g^{\alpha_l}\right) = e\left(g_l^{L'_p}, g\right)$$

and similarly for $$g_r^{R_p} \text{ and } g_o^{O_p};$$

The next step provides for a variable values consistency check:

$$e\left(g_l^{L_p} g_r^{R_p} g_o^{O_p}, g^{\beta \gamma}\right) = e\left(g^Z, g^\gamma\right)$$

and a valid operations check:

$$e\left(g_l^{L_p} g_l^{L_v(s)}, g_r^{R_p} g_r^{R_v(s)}\right) = e\left(g_o^{t(s)}, g^h\right) \cdot e\left(g_o^{O_p} g_o^{O_v(s)}, g\right)$$

Figure 8F:
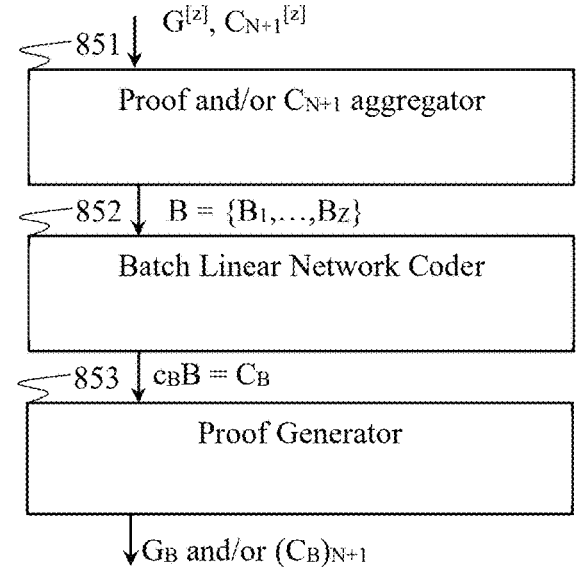
FIG. 8F illustrates method and apparatus aspects configured for generating a cryptographic proof.

FIG. 8F illustrates method and apparatus aspects for batching data (e.g., NFTs, blockchain records, data packets transmitted over a network, etc.). By way of example, but without limitation, one or more of the functional elements might be components of hardware, firmware, and/or software; or might represent configuring hardware, firmware, and/or software to perform one or more disclosed functions associated with one or more of the functional elements.

An aggregator 851 collects a plurality Z of proofs $G^{[z]}$, polynomials, and/or (small) key data structures $C_{N+1}{}^{[z]}$, z=1, . . . ,Z, produced for each of up to Z original data files (e.g., blockchain records, NFTs, rollups, etc.). Each of the proofs $G^{[z]}$ and/or key data structures $C_{N+1}{}^{[z]}$ might be stored off-chain or on a Layer 2 blockchain. For each original data file, a user (e.g., data owner) might have a (big) key that contains or corresponds to the system of linear equations (cO=C) computed from the original data file. Each batch B={$B_1$, . . . ,$B_Z$} produced by the aggregator 851 comprises Z elements (e.g., proofs $G^{[z]}$, polynomials, key data structures $C_{N+1}{}^{[z]}$, or sets thereof). The aggregator 851 might produce multiple batches.

A batch linear network coder 852 can produce a system of linear equations ($c_B B = C_B$), comprising linear combinations of the batch elements {$B_1$, . . . ,$B_Z$} according to LNC techniques disclosed herein. The coder 852 might send a (big) batch key that contains or corresponds to the system of linear equations for the batch {$B_1$, . . . ,$B_Z$} to each data owner, and/or to some data storage, such as a Cloud or file-sharing network. Thus, each data owner might have the same (big) batch key and a (different) original data key. A batch may be referred to as a rollup, a block, or some other terminology. Such terminology might be used to refer to a batch. The coder 852 might chain the multiple (e.g., a sequence) of batches together.

A proof generator 853 might convert the system of linear equations ($c_B B = C_B$) into a proof $G_B$ and/or key data structure $(C_B)_{N+1}$ corresponding to the batch B. The proof generator 853 might send the proof $G_B$ and/or key data structure $(C_B)_{N+1}$ to each data owner for each original data file in the batch. Thus, each data owner might have the same batch proof $G_B$ and/or (small) batch key data structure $(C_B)_{N+1}$ and at least one original data key that is specific to their original data. In some aspects, the proof generator 853 might store the proof $G_B$ and/or key data structure $(C_B)_{N+1}$ on a blockchain, such as a Layer 1 or Layer 2 blockchain.

It should be appreciated that the above techniques might be applied to batch multiple batches together into a block, and produce proofs, systems of equations, and/or key data structures therefrom. Such operations may be performed recursively to create multiple batches of batches for any number of recursion layers.

FIG. 9A illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

In at least one transmitting (e.g., source) node, an original data block O is partitioned 801 into N parts to produce data vector {$O_1$, . . . ,$O_N$}. N may be input, predetermined, or determined from the data O, for example. A first coefficient vector $c_1$ is provisioned, which can comprise receiving, determining, selecting, or otherwise provisioning 802 information from which the $c_1$ is created.

Coded packets {$C_1$, . . . ,$C_N$} and coefficients {$c_1$, . . . ,$c_N$} are computed 803, such as via any of the techniques disclosed herein. For example, each coefficient vector {$c_2$, . . . ,$c_N$} might be computed from the cryptographic hash or content identifier (CID) of at least one previously computed coded packet. A CID is an address in a content addressable system (CAS). A CID comprises a hash, but it can contain additional information, such as version number, how the data encoding (e.g., CBOR, JSON, etc.), hash function, hash length, etc. One example is IPFS content identifiers. Using the hash $h_n$ of a coded packet $C_n$, a device might compute the coded packet's CID.

The system of linear equations (e.g., C=cO, expressed by vectors C and O, and coefficient matrix c) is converted 904 to polynomial form. In one example, a system of linear equations that represents linear network coded original data vector O is:

$$C = cO$$

where c is an MXN coefficient matrix, O is the NX1 original data vector, and C is the MX1 coded data vector (typically, M≥N) can be interpreted as an equation over polynomials. Provisioning 904 of polynomials from LNC data structures can be implemented via a proof generator and/or key manager.

In message key generation 905, a private key $p_k$ might be provisioned that comprises the coefficient matrix c.

$$\begin{bmatrix} C_0 \\ C_1 \\ \vdots \\ C_{M-1} \end{bmatrix} = \begin{bmatrix} c_{0,0} & c_{0,1} & \cdots & c_{0,N-1} \\ c_{1,0} & c_{1,1} & \cdots & c_{1,N-1} \\ \vdots & \vdots & \ddots & \vdots \\ c_{M-1,0} & c_{M-1,1} & \cdots & c_{M-1,N-1} \end{bmatrix} \begin{bmatrix} O_0 \\ O_1 \\ \vdots \\ O_{N-1} \end{bmatrix}$$

For the generalization $x_n = O_n$, n=0, . . . , N−1, in the system of linear equations, polynomials $p_n(x)$ of degree <M can be provisioned. For example, $p_0(x)$ is the degree <M polynomial that evaluates to ($c_{0,0}$, $c_{1,0}$, . . . , $c_{M-1,0}$) at the coordinates (0, 1, . . . , M−1); $p_1(x)$ is the degree <M polynomial that evaluates to ($c_{0,1}$, $c_{1,1}$, . . . , $c_{M-1,1}$) at the coordinates (0, 1, . . . , M−1); . . . $p_{N-1}(x)$ is the degree <M polynomial that evaluates to ($c_{0,N-1}$, $c_{1,N-1}$, . . . , $c_{M-1,N-1}$) at the coordinates (0, 1, . . . , M−1). q(x) is the degree <M polynomial that evaluates to ($C_0$, $C_1$, . . . , $C_{M-1}$) at the coordinates (0, 1, . . . , M−1).

Thus, polynomial $p_0(x)$ expresses the set of (x,y) coordinates ((0,$c_{0,0}$), (1,$c_{1,0}$), . . . , (M−1,$c_{M-1,0}$)); polynomial $p_1(x)$ expresses the set of (x,y) coordinates ((0,$c_{0,1}$), (1,$c_{1,1}$), . . . , (M−1,$c_{M-1,1}$)); . . . ; polynomial $p_{N-1}(x)$ expresses the set of (x,y) coordinates ((0,$c_{0,N-1}$), (1,$c_{1,N-1}$), . . . , (M−1,$c_{M-1,N-1}$)). Polynomial q(x) expresses the set of (x,y) coordinates ((0, $C_0$), (1, $C_1$), . . . , (M−1, $C_{M-1}$)).

In some instances, different ones (or sets) of the polynomials may be provided with a corresponding commitment. Proofs of knowledge of $p_k$ may be provisioned. In one example, the aforementioned polynomials corresponding to original data O may be verified via an interactive or non-interactive proof by a Verifier. In one instance, an on-chain smart contract or off-chain computing resource might be programmed to act as the Verifier.

Lagrange Interpolation (or some more computationally efficient algorithm) can be used to convert 904 each set of (x,y) coordinates to its corresponding polynomial $p_n(x)$, n=0, . . . , N−1. Other examples include Newton polynomial, Neville's algorithm, or a fast Fourier transform method. Such methods find a polynomial of degree at most d which passes through a set of d+1 points such that for each point $\{x_i, y_i\}_{i \in (d+1)}$, the polynomial evaluated at $x_i$ is equal to $y_i$. This can produce the polynomial equation $$p_0(x)x_0 + p_1(x)x_1 + \ldots + p_{N-1}(x)x_{N-1} = q(x)$$

or variants thereof. In one example, the following polynomial equation can be produced:

$$p_0(x)x_0 + p_1(x)x_1 + \ldots + p_{N-1}(x)x_{N-1} - q(x) = 0$$

In another example, a form of the following polynomial equation can be produced:

$$p_0(x)x_0 + p_1(x)x_1 + \ldots + p_{N-1}(x)x_{N-1} - q(x) = Z(x)H(x)$$

where $Z(x) = (x-0)(x-1) \ldots (x-(M-1))$ is the target polynomial, which has cofactors $(x-x(m))$, $m = 0, \ldots, (M-1)$. This example can also be expressed as:

$$P(x) = Z(x)H(x)$$

P(x) has all the roots of Z(x). This fact may be the subject of a proof. There is some polynomial H(x) that may be found via division $H(x) = P(x)/Z(x)$.

In another example, $p_0(x)x_0 + p_1(x)x_1 + \ldots + p_{N-1}(x)x_{N-1}$ is provisioned as $L(x)R(x)$, and the following form of polynomial equation can be produced:

$$L(x)R(x) = Z(x)H(x) + q(x)$$

In another example, $p_0(x)x_0 + p_1(x)x_1 + \ldots + p_{N-1}(x)x_{N-1}$ is provisioned as $L(x) + R(x)$, and the following form of polynomial equation can be produced:

$$L(x) + R(x) = Z(x)H(x) + q(x)$$

The form of the polynomial equation provisioned in 904 can be any polynomial equation and is not limited to those disclosed herein.

A polynomial evaluation proof may be based on a commitment C' relative to a set of points, $\{G_0, G_1, \ldots, G_{N-1}\}$, such as wherein C' was constructed from a linear combination of the coefficients, (e.g., $c_{m,n}$). This may be implemented with a Pedersen commitment scheme, for example. Any of the disclosed aspects may employ bulletproofs, Kate commitments, FRI, and/or other techniques. Proofs can be made non-interactive, such as by using the Fiat-Shamir heuristic or other techniques.

In one aspect, the polynomial form may be used to make 905 a public key $P_k$. For example, message key pair(s) $\{p_k, P_k\}$ may be provisioned 905 from the polynomial form, the polynomial form being derived 904 from hashes $\{h_n\}$ of the coded packets $\{C_n\}$. Thus, the private key $p_k$ can be a function of the CIDs of the coded packets $\{C_n\}$.

The private key $p_k$ can be communicated 906 to the destination node(s). In one instance, the key $p_k$ can be communicated directly to the destination, possibly encrypted or inside an all-or-nothing (AON) package, such as disclosed in patent applications incorporated by reference herein. In another instance, the destination node(s), upon receiving the coded packets $\{C_n\}$, derives the key $p_k$ using the system of linear equations C=cO. The destination node(s) might then operate as a Prover, and the source node(s) can operate as the Verifier to verify the prover's knowledge of the key $p_k$.

The public key $P_k$ might be published 907 (e.g., by the source or destination) or kept secret. Optionally, the coded packets $\{C_n\}$ are communicated 908 to the destination node(s) or to some intermediary system, such as a decentralized storage system. In one aspect, the coded packets $\{C_n\}$ are stored in a CAS using CIDs based on their hashes. The destination node(s) might employ a key (e.g., $p_k$) to retrieve the coded packets $\{C_n\}$ from the CAS. In another aspect, the coded packets $\{C_n\}$ are communicated to the destination(s), which derives a key (e.g., $p_k$) therefrom, such as using techniques disclosed herein. The source(s) may verify the destination's proof of knowledge of the key, such as via an interactive or non-interactive proof. Alternatively, the destination might derive the key (e.g., $p_k$) if it knows the original data O, and the source(s) can verify the key (e.g., $p_k$), and thus, the destination's claim that it knows the original data O. In another aspect, the source(s) might operate on a proffered data file O offered by a Prover. The source(s) can perform operations 801-803 and 904-905 on the proffered data file Õ to produce at least one of the keys therefrom, and then use the at least one key to determine if the proffered data Õ is the original data O.

FIG. 9B illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

A destination node converts 911 a message key (e.g., $p_k$) to polynomial form, converts 912 the polynomial form to coefficients $\{c_1, \ldots, c_N\}$ of the system of linear equations C=cO, and converts 913 the coefficients $\{C_n\}$ to CIDs of the coded packets $\{C_1, \ldots, C_N\}$. Steps 911-913 might be depicted as a single step of converting the message key into the CIDs. The destination node can use the CIDs to retrieve 914 the coded packets $\{C_1, \ldots, C_N\}$ from decentralized storage. When a sufficient number of the coded packets is retrieved, the destination node can solve the system of linear equations to recover the original data O.

Figures 10A, 10B:
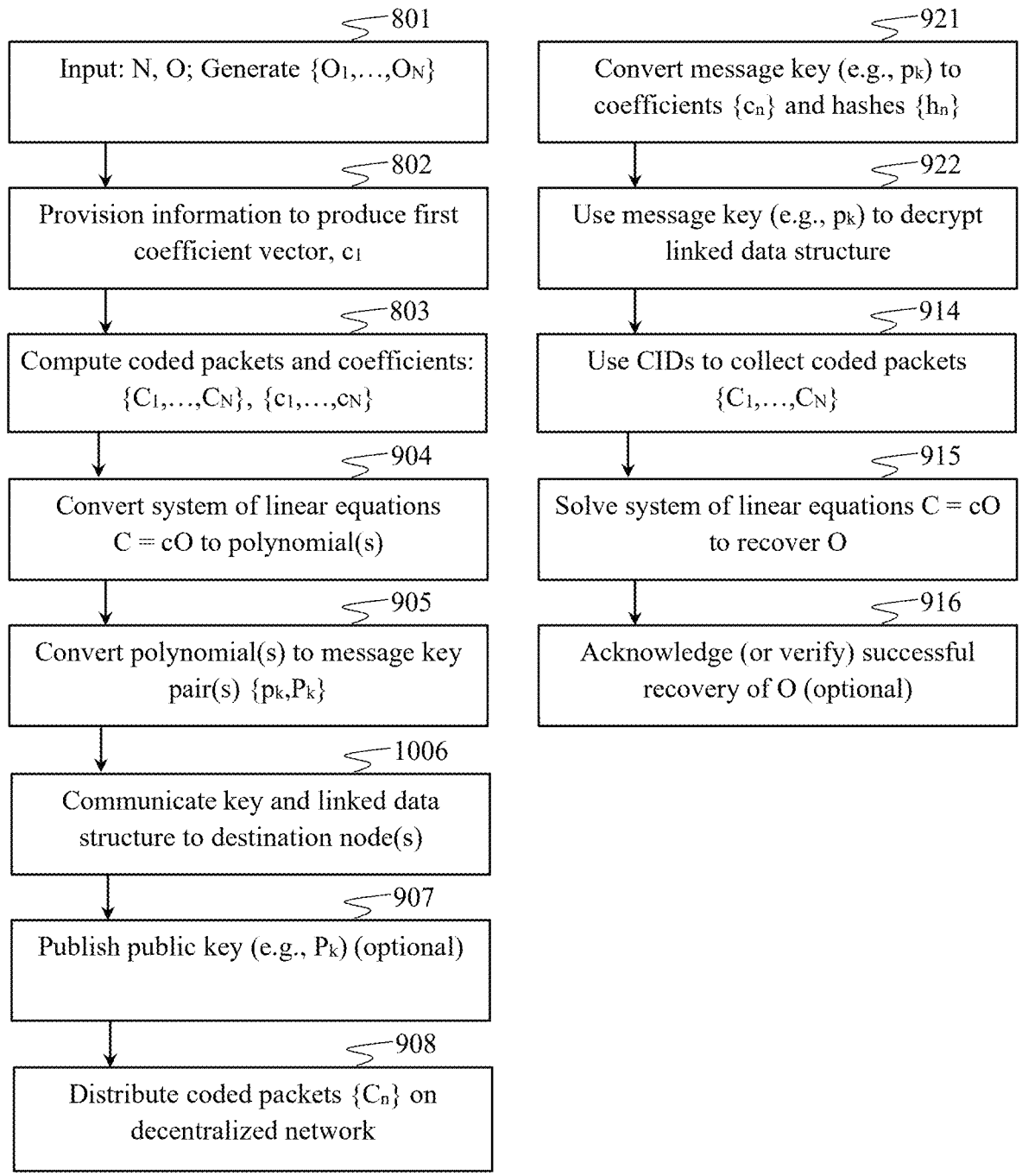
FIG. 10A illustrates method and apparatus aspects that can be configured for communicating data in a decentralized communication network. A linked data structure can link each ($n^{th}$) coded data's cryptographic hash to a next (e.g., $(n+1)^{th}$) coded data's address (e.g., a content identifier, CID, which points to data on a CAS network). In one aspect, a function (such as scrambling, encryption, appending a nonce, or performing some other function) might be applied to each coded data part so that the coded data part's CID is not easily derived from the coded data part's hash. Thus, in order to decode the coded data, a device might reverse the function of (e.g., descrambling, decrypting, removing the nonce, or otherwise "cleaning") a received coded data part $C_n$, compute the hash $h_n$ of the cleaned coded data part $C_n$, use the linked data structure to find the CID ($CID_{n+1}$) of the next coded data part $C_{n+1}$ based on the hash $h_n$, and use the $CID_{n+1}$ to retrieve the next coded data part $C_{n+1}$ from the CAS network. Once a sufficient number of coded data parts are collected, the system of linear equations can be solved to recover the original data.
FIG. 10B illustrates method and apparatus aspects that can be configured for receiving data in a decentralized communication network. A message key (such as for the current message or a previous message) or some other key might be used to decrypt the linked data structure.

FIG. 10A illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

A source node performs steps 801-803 to generate coded data $\{C_1, \ldots, C_N\}$ and coefficients $\{c_1, \ldots, c_N\}$, and performs steps 904-905 to convert the system of linear equations to message key pair(s) $\{p_k, P_k\}$.

At least one message key (e.g., $p_k$) and a linked data structure is communicated 1006 to the destination node(s). Step 1006 can include generating the linked data structure, which can be encrypted and/or encoded in an AONP (e.g., a $C_{N+1}$ packet), such as by XOR-ing the linked data structure with hashes $\{h_n\}$ of the coded data packets $\{C_n\}$. In one example, each link in the linked data structure connects (i.e., links) the hash $h_n$ of a coded data packet $C_n$ to the CID of the next coded data packet, $C_{n+1}$, e.g., $h_n \rightarrow CID_{n+1}$. Thus, the linked data structure can denote an ordered list of CIDs corresponding to the sequence of coded packets $\{C_n\}$. In some instances, the linked data structure comprises the CIDs (without the hashes) linked together. In some instances, instead of the linked data structure, just the CIDs without links are communicated in a data structure. In one example, the data in the linked data structure is encrypted, such as using public key $P_k$; e.g., each link might be expressed as $P_k(h_n) \rightarrow P_k(CID_{n+1})$. The source(s) then communicates the encrypted linked data structure to the destination(s).

The message private key $p_k$ can be encrypted by the source(s) and sent to the destination(s). In one example, the source(s) employs at least one of a source's private key $p_{k(s)}$ or a destination's public key $P_{k(d)}$ to encrypt the message key (e.g., $p_k$). The source(s) might sign (using its own private key) and encrypt (using the destination's public key) the message key (e.g.: $p_{k(s)}(P_{k(d)}(p_k))$). The destination(s), as part of step 921, can receive and decrypt the message key; e.g., via operations $p_{k(d)}(P_{k(s)}(\cdot))$ performed on the encrypted message key:

$$p_k = p_{k(d)}(P_{k(s)}(p_{k(d)}(p_k)))$$

In some instances, the message private key $p_k$ can be encrypted using a previous message key (e.g., $p_{k-1}$ or $P_{k-1}$). In one example, the destination's public key $P_{k(d)}$ might be a public key (e.g., $P_{k-1}$) corresponding to a previous private message key (e.g., $p_{k-1}$) or a session key.

FIG. 10B shows functional elements (e.g., operations) performed by one or more destination nodes, which converts 921 the message key(s) (e.g., $p_k$) to coefficients $\{C_n\}$ and hashes $\{h_n\}$. The hashes $\{h_n\}$ might be determined from the coefficients $\{C_n\}$. The destination(s) might use the message key to decrypt 922 an encrypted (linked) data structure. In the data structure, an (each) $n^{th}$ hash ($h_n$) can link to the $(n+1)^{th}$ CID ($CID_{n+1}$): $h_n \rightarrow CID_{n+1}$. Either or both the hashes $\{h_n\}$ and the CIDs $\{CID_n\}$ might be encrypted with a message key (e.g., public key $P_k$).

The destination node(s) decrypt the encrypted hashes and/or encrypted CIDs (e.g., $p_k(P_k(h_n))$, $p_k(P_k(CID_{n+1}))$), and can employ the hashes $\{h_n\}$ (e.g., derived from the message key $p_k$ or obtained from the data structure) to find the ordered CIDs. If the (linked) data structure is encoded in an AONP (e.g., a $C_{N+1}$ packet), the destination(s) employs the hashes $\{h_n\}$ derived from the message key $p_k$ to decode (e.g., regarded here as decrypting 922) the (linked) data structure, such as by XOR-ing the $C_{N+1}$ packet with the hashes $\{h_n\}$.

The CIDs can be used to collect 914 the coded packets $\{C_n\}$ from the decentralized network (such as a CAS). The hashes of the collected coded packets $\{C_n\}$ may be compared to the hashes derived 921 from the message key, such as to verify the collected data. Using coefficients $\{C_n\}$ derived from hashes $\{h_n\}$ or the message key, and the coded packets $\{C_n\}$, the system of linear equations is solved 915 to recover O. An acknowledgement and/or verification 916 might follow.

Figure 11A:
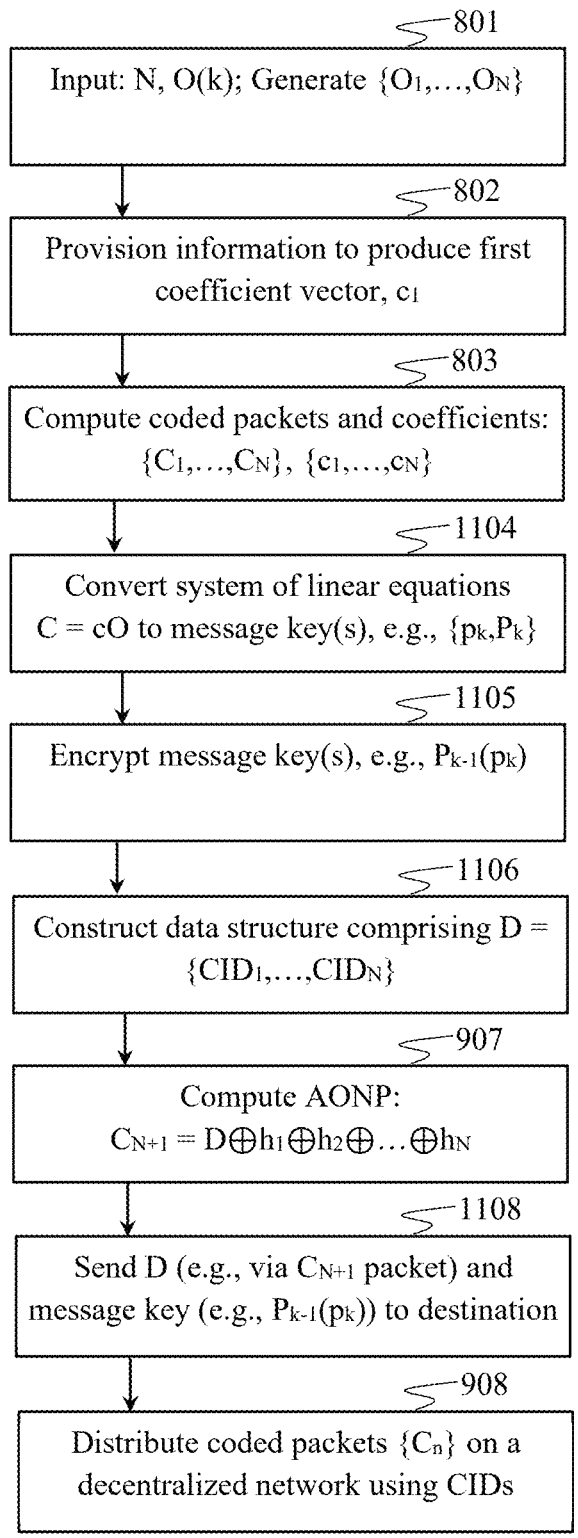
FIG. 11A illustrates method and apparatus aspects that can be configured for communicating data in a decentralized communication network. A linked data structure might be communicated in an all-or-nothing package (AONP). Polynomial coefficients in a message key might be used to make the AONP.

FIG. 11A illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

A source node performs steps 801-803 (e.g., operating on a $k^{th}$ original data structure O) to generate coded data structures $\{C_1, \ldots, C_N\}$ and coefficients $\{c_1, \ldots, c_N\}$, and converts 1104 the system of linear equations to a $k^{th}$ message key pair(s) $\{p_k, P_k\}$. The message key pair(s) $\{p_k, P_k\}$ is (are) particular to (e.g., associated with) the $k^{th}$ original data structure (i.e., message) O(k). In this disclosure, the terms "original data" and "message" may be used interchangeably.

At least one message key (e.g., $p_k$) might be encrypted 1105. In one example, the encryption 1105 might employ a key corresponding to a previous (e.g., $(k-1)^{th}$) message (e.g., that was processed for delivery to the same destination as the current message), such as public key $P_{k-1}$ corresponding to message $O_{k-1}$. Alternatively, some other key might be used, such as the destination's public key Pa and/or the source's private key $p_s$. Additionally, or alternatively, the at least one message key might be encoded in an AONP, such as a $C_{N+1}$ packet computed in 907.

If the destination(s) is to be configured to retrieve the coded data structures $\{C_1, \ldots, C_N\}$ from a CAS (such as a file-sharing network, a mesh network, a Cloud, a fog, or some other decentralized network), data structure D might be constructed 1106 that comprises CIDs $\{CID_1, \ldots, CID_N\}$ of the coded data $\{C_1, \ldots, C_N\}$. D might comprise a list, a linked list, a table, a tree, or some other data structure. A linked data structure, such as disclosed herein, may be used.

An AONP (e.g., a $C_{N+1}$ packet) might be used to encode 907 D. In one example, encoding 907 comprises XOR-ing hash values of the coded data with D (e.g., $C_{N+1} = D \oplus h_1 \oplus h_2 \oplus \ldots \oplus h_N$). In addition to, or alternative to encoding 907, at least one message key (e.g., public message key $P_k$) might encrypt D. Previous message key(s) and/or previous hashes of the coded packets may be employed in the disclosed techniques. The at least one (encrypted and/or encoded) D and the at least one message key can be sent 1108 (directly or indirectly) to the destination(s). The coded packets $\{C_n\}$ can be distributed 908 on a decentralized CAS network using their CIDs.

In one aspect, the destination(s) is configured by the source(s) to retrieve the coded data (and thus, recover the original data therefrom) by constructing 1106 the data structure D and constructing 907 the at least one message key (e.g., 801-803 and 1104) according to the disclosed functions; and sending D and the AON packet to the destination(s).

In another aspect, the source(s) configures the destination(s) to retrieve the coded data (and thus, recover the original data therefrom) by sending the data structure D and the at least one message key to the destination(s). This can include encrypting 1105 and making 907 the $C_{N+1}$ packet.

Figure 11B:
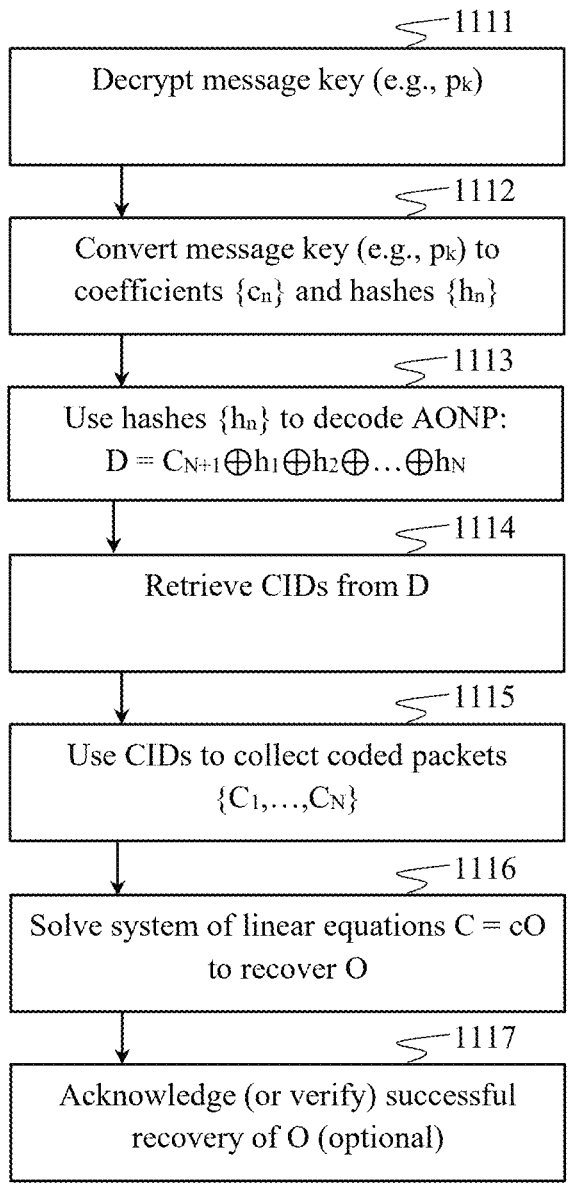
FIG. 11B illustrates method and apparatus aspects that can be configured for receiving data in a decentralized communication network. The message key might contain information used to decode the AONP.

FIG. 11B illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

The destination(s) retrieves the message key(s), such as by decrypting 1111 a received encrypted key. The key might be decrypted using the destination(s) private key(s) and/or a previous message key. The message key is converted 1112 to the coefficients $\{C_n\}$ and hashes $\{h_n\}$. The hashes $\{h_n\}$ are used to decode 1113 the AONP (e.g., $C_{N+1}$) to recover D. The CIDs of the coded data are retrieved 1114 from D and used to collect 1115 the coded packets from the CAS network. The system of linear equations is solved 1116 to recover the original data O. Upon recovery of the original data O, the destination(s) might send 1117 an acknowledgement to the source(s) and/or might verify the authenticity of the recovered O.

Figure 12A:
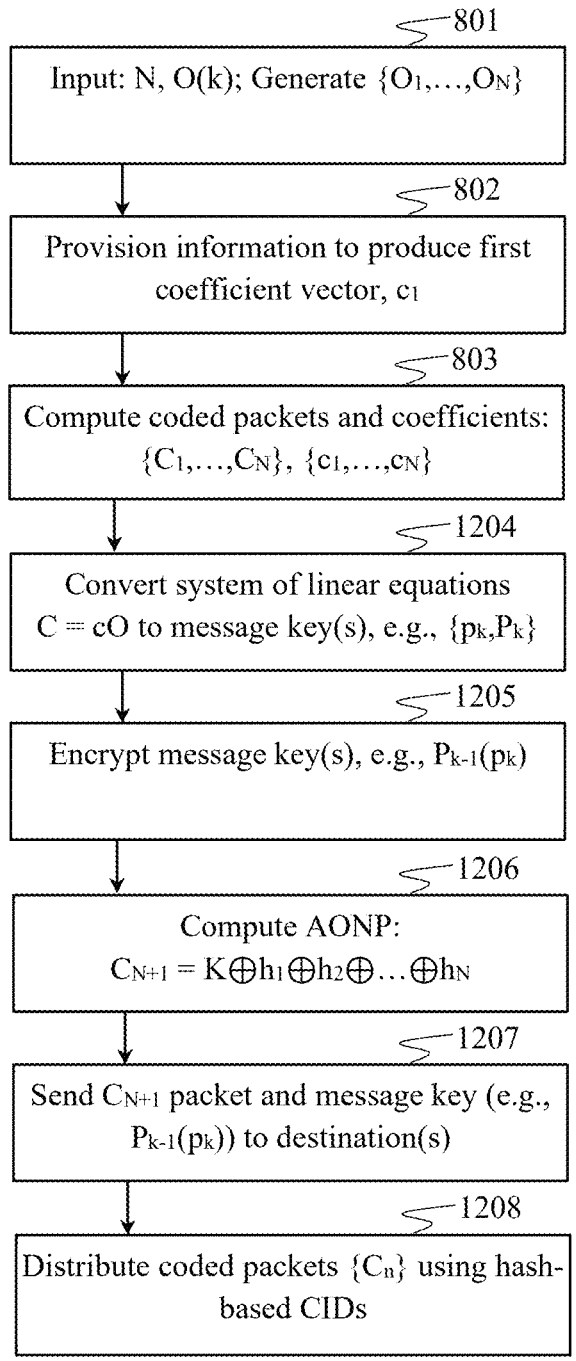
FIG. 12A illustrates method and apparatus aspects that can be configured for communicating data in a decentralized communication network. A cryptographic key (e.g., a public key $P_{k-1}$) corresponding to a previous message might be used to encrypt information to be sent in or with the current message.

FIG. 12A illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

A source node performs steps 801-803 (e.g., operating on a $k^{th}$ original data structure O) to generate coded data structures $\{C_1, \ldots, C_N\}$ and coefficients $\{c_1, \ldots, c_N\}$, and converts 1204 the system of linear equations to a $k^{th}$ message key pair(s) $\{p_k, P_k\}$. The message key pair(s) $\{p_k, P_k\}$ is (are) particular to (e.g., associated with) the $k^{th}$ original data structure (i.e., message) O(k). In this disclosure, the terms "original data" and "message" may be used interchangeably.

At least one message key (e.g., $p_k$) might be encrypted 1205. Previous message key(s) and/or previous hashes of the coded packets may be employed in the disclosed techniques. An AONP (e.g., a $C_{N+1}$ packet) might be used to encode 1206 data K. In one example, encoding 1206 comprises XOR-ing hash values of the coded data with K (e.g., $C_{N+1}=K \oplus h_1 \oplus h_2 \oplus \ldots \oplus h_N$). Data K might comprise information about the first coefficient vector $c_1$, a random key used to spread or scramble O, and/or some other information about O and/or the coded data. K or $C_{N+1}$ might be encrypted (not shown) using one of the message keys (e.g., $P_k$). The encrypted key AONP can be sent 1207 (directly or indirectly) to the destination(s). The coded packets $\{C_n\}$ can be distributed 1208 on a decentralized CAS network using CIDs derived from their hashes $\{h_1, \ldots, h_N\} = h\{C_1, \ldots, C_N\}$.

Figure 12B:
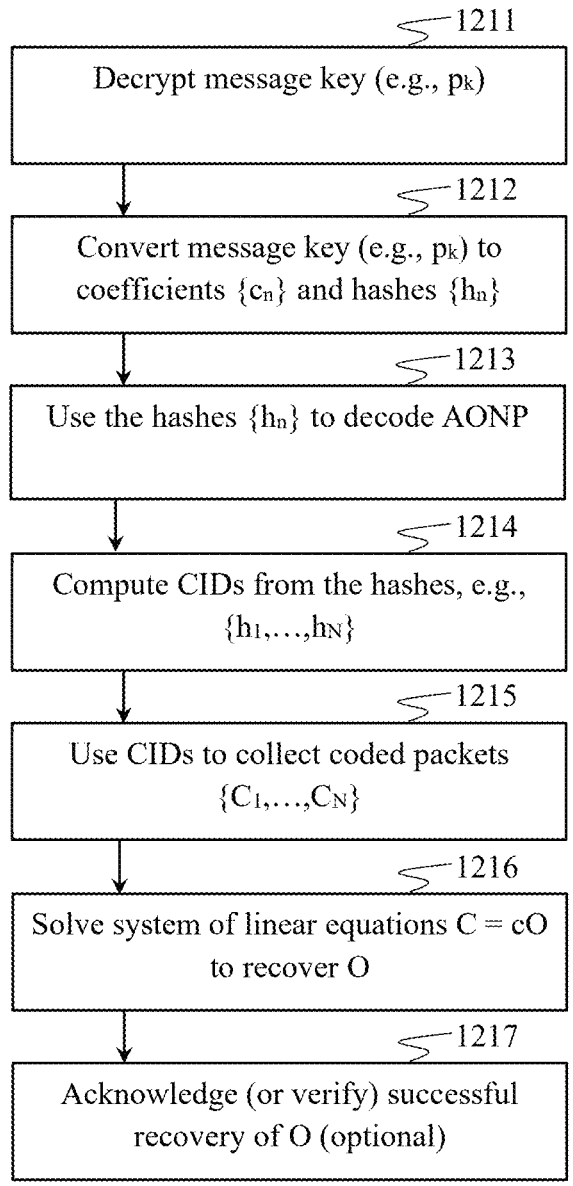
FIG. 12B illustrates method and apparatus aspects that can be configured for receiving data in a decentralized communication network. In one example, a previous message key (e.g., private key $p_{k-1}$) is used to decrypt the current message key (e.g., private key $p_k$).

FIG. 12B illustrates functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

The destination(s) decrypts 1211 the encrypted message key, e.g., $p_k = p_{k-1}(P_{k-1}(p_k))$. The message key is converted 1212 to the coefficients $\{C_n\}$ and hashes $\{h_n\}$. The hashes are used to decode 1213 the AONP to recover K, which may comprise information needed for solving 1216 the system of linear equations, or otherwise recovering O. The destination can convert 1214 the hashes $\{h_n\}$ to CIDs and use the CIDs to collect 1215 their corresponding coded packets from a decentralized network, for example. The system of linear equations is solved 1216 to recover O, and acknowledgment and/or verification 1217 may be performed.

FIGS. 13A-13E illustrate functional elements according to method and apparatus aspects disclosed herein. By way of example, but without limitation, one or more of the functional elements might be components of hardware, firmware, and/or software; or might represent configuring hardware, firmware, and/or software to perform one or more disclosed functions associated with one or more of the functional elements.

The source(s) generates 1301 a set of original data structures $\{O_1, \ldots, O_N\}$ by partitioning an input data structure O(k) into N parts. The O(k) might be input or selected by a destination node. The source(s) produces 1302 the first coefficient vector, $c_1$, and computes 1303 coded packets $\{C_1, \ldots, C_N\}$ and hash-based coefficients $\{c_1, \ldots, c_N\}$ according to aspects disclosed herein. The system of linear equation C=cO is converted 1304 to a message key pair $\{p_k, P_k\}$ of the elliptical-curve type. The private key $p_k$ might be sent 1305 to the destination(s). The public key $P_k$ may be published 1305.

Figure 13A:
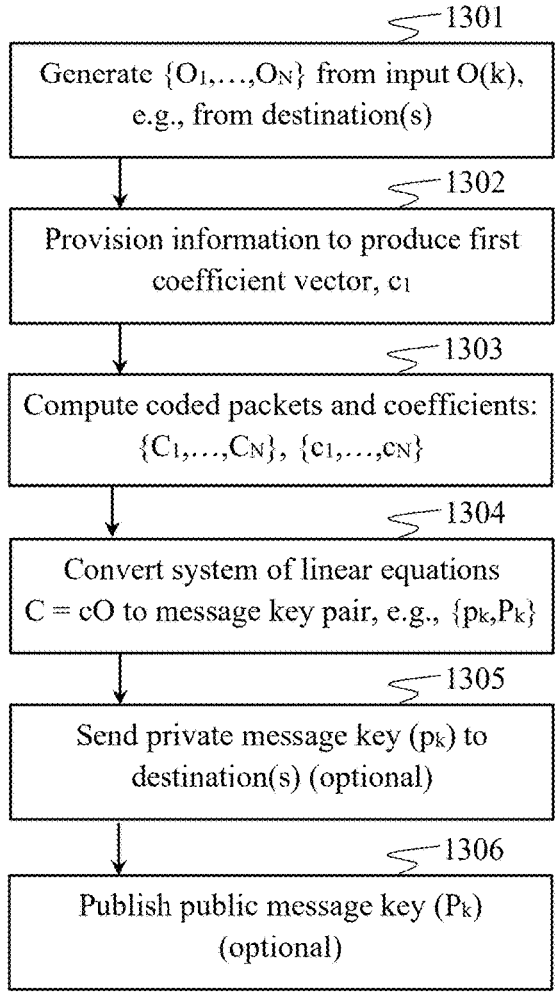
FIG. 13A illustrates method and apparatus aspects that can be configured for performing an encryption-as-a-service. A cryptographic key pair can be generated from an input message. Thus, the cryptographic key pair can be provisioned to be particular to (e.g., the same messages will have the same key pairs), or unique to (e.g., messages are unique even if their content is the same), the message. Unique key pairs might be provisioned by applying a function (such as scrambling, encryption, appending a nonce, or performing some other function) to the message before generating the cryptographic key(s). The private message key can be configured to be employed as a proof of knowledge of the message.
Figure 13B:
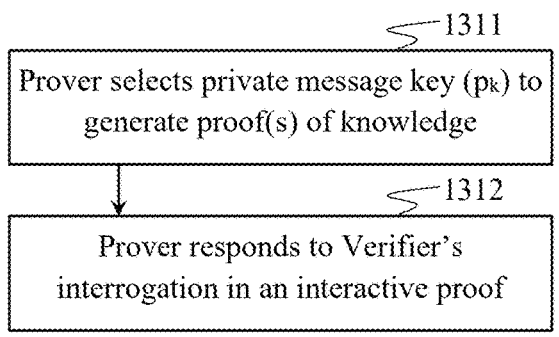
FIGS. 13B-13E illustrate method and apparatus aspects that can be configured for performing an interactive proof of knowledge.

A prover may prove knowledge of the private message key $p_k$. As shown in FIG. 13B, the prover can generate 1311 one or more proofs of knowledge of the private message key $p_k$. In an interactive proof, the prover responds 1312 to the verifier's interrogation(s) by employing the private message key $p_k$ in computations of values provided by the verifier.

Figure 13C:
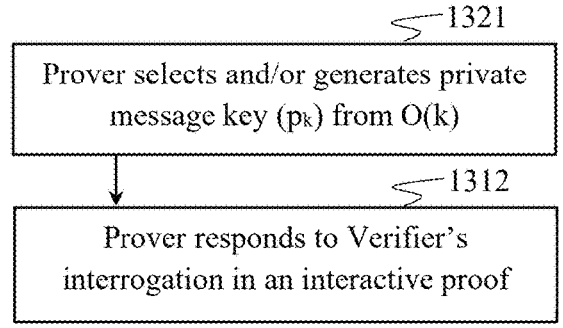

A prover can prove knowledge of a message by proving knowledge of a cryptographic key derived from the message (wherein the key uniquely identifies the message). In FIG. 13C, a prover can employ the message O(k) to derive 1321 at least one message key (e.g., private message key $p_k$) therefrom. In one example, the prover responds 1312 to the verifier's interrogation(s) in an interactive proof, thus proving knowledge of the key $p_k$ to the verifier.

Figure 13D:
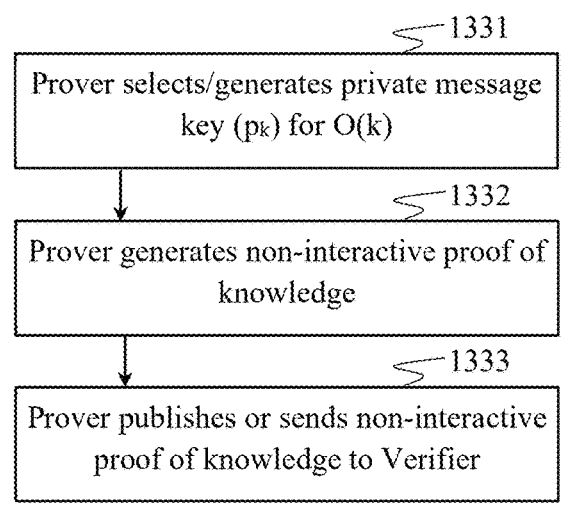

In FIG. 13D, the prover selects and/or generates 1331 a key from the message O(k), wherein the key uniquely identifies the message. For example, private message key $p_k$ might be generated from the message O(k). The prover generates 1332 a non-interactive proof of knowledge from the message and publishes or sends 1333 the proof of knowledge to a verifier.

Figure 13E:
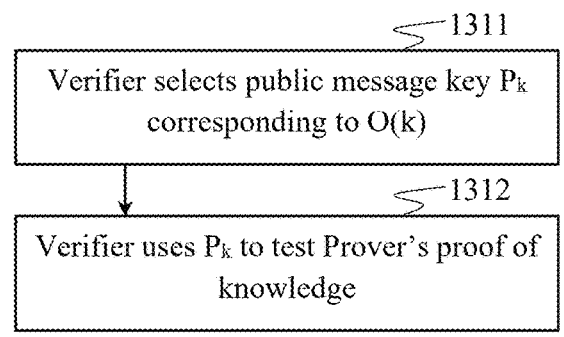

In FIG. 13E, the verifier selects 1311 a public message key $P_k$ corresponding to a message O(k) for which a prover offers to provide a proof of knowledge. The verifier uses $P_k$ to test 1312 the Prover's proof of knowledge of the corresponding private key $p_k$. In one example, the verifier offers interrogation values for the prover to sign with the message's private key $p_k$. The verifier can use $P_k$ to verify the signature.

In FIG. 14A, a device is configured to function as a verifier, as follows. The verifier operates on a candidate original data Ô by partitioning 1401 Ô into a plurality (N) of original data parts $\{\hat{O}_1, \ldots, \hat{O}_N\}$. N may be input, determined based on the candidate original data size, determined from other information, or predetermined. The original data parts $\{\hat{O}_1, \ldots, \hat{O}_N\}$ can be used to generate 1402 candidate coefficient vectors $\{\hat{c}_1, \ldots, \hat{c}_N\}$ and candidate coded data parts $\{\hat{C}_1, \ldots, \hat{C}_N\}$. A system of linear equations, such as represented by $\hat{C} = \hat{c}\hat{O}$, is transformed 1403 into at least one candidate key, such as private key $\hat{p}_k$. The candidate key $\hat{p}_k$ can be tested 1404 to determine if it is the authentic key $\hat{p}_k$. In one example, the candidate key $\hat{p}_k$ might be tested 1404 using the $p_k$'s corresponding authentic public key, $P_k$. Depending on whether the test (e.g., $\hat{p}_k=? p_k$) in 1404 succeeds or not (Y/N), the device might perform some action 1405, such as granting a prover access to a resource, executing a set of instructions (in at least one computer processor) provided by the prover, and/or executing a predetermined set of instructions (in at least one computer processor).

In FIG. 14B, a destination node is configured as follows. The destination node receives (e.g., decrypts 1411) a private key $p_k$, such as by employing another key (e.g., a previous key $p_{k-1}$) to decrypt the encrypted key, $P_{k-1}(p_k)$). The private key $p_k$ is converted 1412 to coefficient vectors ĉ. For example, polynomial coefficients in the private key $p_k$ can be converted 1412 to linear network coding coefficients of the system of linear equations $\hat{C} = \hat{c}\hat{O}$. The coefficients ĉ are converted 1413 to their corresponding hash values h. For example, to make the system of linear equations C=cO from which the private key $p_k$ was derived, the coefficient matrix c was derived from hashes of the coded data parts C, whereas conversion 1413 reverses that process. The hash values $h_n$ corresponding to each coded data part $C_n$ are transformed 1414 to CIDs, each of the CIDs $\{CID_1, \ldots, CID_N\}$ corresponding to a respective coded data part $\{C_1, \ldots, C_N\}$. The CIDs can be used to collect 1415 the coded data parts $\{C_1, \ldots, C_N\}$, such as from a CAS or other network. For example, the destination node queries the network using the content identifiers $\{CID_1, \ldots, CID_N\}$, and the network returns the corresponding data files $\{C_1, \ldots, C_N\}$. The destination node might employ the linear network coding coefficients to decode the coded data in order to recover the original data (i.e., message).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. .sctn. 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1A), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray.R™. disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 20.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for transmitting data from one or more mobile devices to one or more other mobile devices in a wireless network, comprising:

configuring a processor of the one or more mobile devices to employ vector network coding to compute a plurality of coded data parts from original data; wherein each of at least some of the plurality of coded data parts is computed from at least one previous coded data part of the plurality of coded data parts by applying a one-way function to the at least one previous coded data part for generating a set of vector network coding coefficients, and using the set of vector network coding coefficients to linearly combine a plurality of original data parts to produce a next coded data part; and configuring the processor to provide for transmitting the at least one previous coded data part and the next coded data part to the one or more other mobile devices; and wherein the one or more other mobile devices are configured to employ an inverse transform on the coded data to decode the original data.

2. The method of claim 1, further comprising:

configuring the processor to compute a first coded data part from the plurality of original data parts;

wherein the first coded data part is computed from at least one of a function of the original data parts, coded data from a previous operation, a cryptographic key, or a random key; and configuring the processor to provide for distributing the first coded data part to the one or more receivers.

3. The method of claim 1, further comprising:

configuring the processor to compute an all-or-nothing transform (AONT) and generate a last coded data part therefrom; and configuring the processor to provide for distributing the last coded data part to the one or more receivers.

4. The method of claim 1, wherein the one-way function is a cryptographic hash.

5. The method of claim 1, further comprising configuring the processor to perform an invertible randomizing operation on original data such that the plurality of original data parts are randomized original data parts.

6. The method of claim 1, further comprising configuring the processor to generate a cryptographic key that employs a polynomial over a finite field, wherein coefficients of the polynomial comprise a function of the set of vector network coding coefficients.

7. The method of claim 1, wherein the processor resides on an intermediate node, and configuring the processor to use the set of vector network coding coefficients to linearly combine the plurality of original data further comprises linearly combining incoming coded data parts to generate the next coded data part.

8. An apparatus for transmitting data from one or more mobile devices to one or more other mobile devices in a wireless network, the apparatus comprising at least one processor; and at least one computer-readable memory in electronic communication with the at least one processor, and instructions stored in the at least one computer-readable memory, the instructions executable by the at least one processor to configure a processor of the one or more mobile devices to:

employ vector network coding to compute a plurality of coded data parts from original data; wherein each of at least some of the plurality of coded data parts is computed from at least one previous coded data part of the plurality of coded data parts by applying a one-way function to the at least one previous coded data part for generating a set of vector network coding coefficients, and to using the set of vector network coding coefficients to linearly combine a plurality of original data parts to produce a next coded data part; and provide for transmitting the at least one previous coded data part and the next coded data part parts to the one or more other mobile devices; and wherein the one or more other mobile devices are configured to employ an inverse transform on the coded data to decode the original data.

9. The apparatus of claim 8, further comprising instructions executable by the at least one processor to:

compute a first coded data part from the plurality of original data parts;

wherein the first coded data part is computed from at least one of a function of the original data parts, coded data from a previous operation, a cryptographic key, or a random key; and provide for distributing the first coded data part to the one or more receivers.

10. The apparatus of claim 8, further comprising instructions executable by the at least one processor to:

compute an all-or-nothing transform (AONT) and generate a last coded data part therefrom; and provide for distributing the last coded data part to the one or more receivers.

11. The apparatus of claim 8, wherein the one-way function is a cryptographic hash.

12. The apparatus of claim 8, further comprising instructions executable by the at least one processor to perform an invertible randomizing operation on original data such that the plurality of original data parts are randomized original data parts.

13. The apparatus of claim 8, further comprising instructions executable by the at least one processor to generate a cryptographic key that employs a polynomial over a finite field, wherein coefficients of the polynomial comprise a function of the set of vector network coding coefficients.

14. The apparatus of claim 8, wherein the at least one processor resides on an intermediate node, and the instructions executable by the at least one processor to employ vector network coding provides for linearly combining incoming coded data parts to generate the plurality of coded data parts.

15. A computer program product, comprising: a non-transitory computer-readable memory having computer-readable program code stored thereon, the computer-readable program code containing instructions executable by at least one processor to:

employ a plurality of vector network coding coefficients to compute a plurality of coded data parts from a plurality of original data parts; wherein each of at least some of the plurality of coded data parts is computed from at least one previous coded data part of the plurality of coded data parts by applying a one-way function to the at least one previous coded data part for generating a set of vector network coding coefficients and using the set of vector network coding coefficients to linearly combine a plurality of original data parts to produce a next coded data part;

provide for transmitting the plurality of coded data parts to the one or more mobile devices; and and wherein the one or more mobile devices are configured to employ an inverse transform on the coded data to decode the original data.

16. The computer program product of claim 15, further comprising instructions executable by the at least one processor to:

compute a first coded data part from the plurality of original data parts;

wherein the first coded data part is computed from at least one of a function of the original data parts, coded data from a previous operation, a cryptographic key, or a random key; and provide for distributing the first coded data part to at least one of the multiple network nodes.

17. The computer program product of claim 15, further comprising instructions executable by the at least one processor to:

compute an all-or-nothing transform (AONT) and generate a last coded data part therefrom; and provide for distributing the last coded data part to at least one of the multiple network nodes.

18. The computer program product of claim 15, wherein the vector network coding comprises a one-way function performed on the previous one of the plurality of coded data parts to generate ones of the plurality of vector network coding coefficients for combining the plurality of original data parts to produce a next one of the plurality of coded data parts.

19. The computer program product of claim 15, further comprising instructions executable by the at least one processor to perform an invertible randomizing operation on the original data parts before configuring the processor to employ vector network coding.

20. The computer program product of claim 15, further comprising instructions executable by the at least one processor to generate a cryptographic key that employs a polynomial over a finite field, wherein coefficients of the polynomial comprise a function of the plurality of vector network coding coefficients.

* * * * *